United States Patent
Nishikawa et al.

(10) Patent No.: US 12,353,092 B2
(45) Date of Patent: Jul. 8, 2025

(54) DIFFUSING MEMBER, MANUFACTURING METHOD OF DIFFUSING MEMBER, PLANAR LIGHT SOURCE DEVICE, DISPLAY DEVICE, AND DIELECTRIC MULTILAYER FILM

(71) Applicant: DAI NIPPON PRINTING CO., LTD., Tokyo-to (JP)

(72) Inventors: Marii Nishikawa, Tokyo-to (JP); Yasuyuki Oyagi, Tokyo-to (JP); Yukio Taniguchi, Tokyo-to (JP); Masahiro Goto, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/916,319

(22) PCT Filed: Mar. 31, 2021

(86) PCT No.: PCT/JP2021/014012
§ 371 (c)(1),
(2) Date: Sep. 30, 2022

(87) PCT Pub. No.: WO2021/201164
PCT Pub. Date: Oct. 7, 2021

(65) Prior Publication Data
US 2023/0152626 A1    May 18, 2023

(30) Foreign Application Priority Data

Mar. 31, 2020  (JP) .................. 2020-063498
Oct. 20, 2020  (JP) .................. 2020-176216
Dec. 25, 2020  (JP) .................. 2020-217710

(51) Int. Cl.
*G02F 1/1335*    (2006.01)
*F21Y 113/13*    (2016.01)

(52) U.S. Cl.
CPC .. *G02F 1/133607* (2021.01); *G02F 1/133507* (2021.01); *G02F 1/133526* (2013.01); *F21Y 2113/13* (2016.08)

(58) Field of Classification Search
CPC ............. G02F 1/1347; G02F 1/133548; G02F 1/133536; G02F 1/1368; G02F 2201/50;
(Continued)

(56) References Cited

U.S. PATENT DOCUMENTS

2006/0290843 A1 * 12/2006 Epstein ................ G02B 5/0242
                                                                 349/113
2006/0291238 A1    12/2006 Epstein et al.
(Continued)

FOREIGN PATENT DOCUMENTS

CN          1892301 A *  1/2007 ........... G02B 6/0043
CN        101243354 A    8/2008
(Continued)

OTHER PUBLICATIONS

Dec. 10, 2021 Office Action issued in Japanese Patent Application No. 2021-061458.
(Continued)

*Primary Examiner* — Hoan C Nguyen
(74) *Attorney, Agent, or Firm* — Oliff PLC

(57) ABSTRACT

A planar light source device includes a light diffusing portion and a light reflecting portion in this order. The light diffusing portion has light transmissivity and light diffusivity. Reflectance of the light reflecting portion with respect to light of a particular wavelength entering at an angle of incidence of 0° is 80% or higher. The reflectance of the light reflecting portion with respect to at least part of light of the particular wavelength entering at an angle of incidence of which an absolute value is greater than 45° is less than 50%.

5 Claims, 32 Drawing Sheets

(58) Field of Classification Search
CPC ......... G02F 2202/022; G02F 1/133607; G02F 1/133611; G02F 1/133507; G02F 1/133605; G02F 1/133526; G02F 1/133553; G02F 1/1335; G02F 1/133606; C09D 1/00; C09D 5/002; C09D 163/00; C09D 179/08; F21V 5/02; F21V 5/00; F21V 9/14; F21V 5/04; F21V 3/00; F21V 9/20; F21V 7/28; F21V 5/002; G02B 5/02; G02B 3/00; G02B 5/124; G02B 5/201; G02B 6/0053; G02B 6/0065; G02B 5/045; B32B 27/18; B32B 3/30; B32B 7/023; F21S 2/00; F21Y 2105/16; F21Y 2113/13; F21Y 2115/10; B81C 1/00547; H01L 21/30621

See application file for complete search history.

(56) References Cited

U.S. PATENT DOCUMENTS

| | | | | |
|---|---|---|---|---|
| 2007/0159573 | A1* | 7/2007 | Lee | G02F 1/133606 349/65 |
| 2007/0291510 | A1* | 12/2007 | Chen | G02B 5/045 362/618 |
| 2010/0110675 | A1* | 5/2010 | Van Herpen | B32B 17/10532 349/193 |
| 2010/0134724 | A1* | 6/2010 | Arakawa | G02F 1/133533 359/485.02 |
| 2016/0195651 | A1* | 7/2016 | Yoshioka | B32B 7/00 359/359 |
| 2017/0039960 | A1* | 2/2017 | Jepsen | G02B 27/0172 |
| 2017/0062674 | A1* | 3/2017 | Kwon | H01L 25/0753 |
| 2020/0110309 | A1* | 4/2020 | Masuda | G02F 1/133611 |
| 2022/0228722 | A1* | 7/2022 | Nishikawa | G02B 5/0215 |

FOREIGN PATENT DOCUMENTS

| | | | |
|---|---|---|---|
| JP | H07-186195 A | | 7/1995 |
| JP | H0968605 A | * | 3/1997 |
| JP | 2001-262776 A | | 9/2001 |
| JP | 2006-208610 A | | 8/2006 |
| JP | 2008-547173 A | | 12/2008 |
| JP | 2009-258666 A | | 11/2009 |
| JP | 2011-216271 A | | 10/2011 |
| JP | 2011-243518 A | | 12/2011 |
| JP | 2012-123147 A | | 6/2012 |
| JP | 2012-143318 A | | 8/2012 |
| JP | 2012-195220 A | | 10/2012 |
| JP | 2017-016859 A | | 1/2017 |
| JP | 2017-016870 A | | 1/2017 |
| JP | 6299811 B2 | | 3/2018 |
| KR | 10-0786118 B1 | | 12/2007 |
| KR | 20210037979 A | * | 4/2021 |
| WO | 2007049584 A1 | | 5/2007 |
| WO | 2011/030594 A1 | | 3/2011 |
| WO | 2016/186158 A1 | | 11/2016 |
| WO | 2019/146941 A1 | | 8/2019 |
| WO | WO-2020004641 A1 | * | 1/2020 |

OTHER PUBLICATIONS

Feb. 4, 2022 Office Action issued in Japanese Patent Application No. 2021-061458.
Jun. 24, 2022 Office Action issued in Japanese Patent Application No. 2022-033913.
Aug. 12, 2022 Office Action issued in Japanese Patent Application No. 2022-033913.
Sep. 9, 2022 Office Action issued in Japanese Patent Application No. 2022-033913.
Jul. 1, 2022 Office Action issued in Japanese Patent Application No. 2022-091883.
Aug. 16, 2022 Office Action issued in Japanese Patent Application No. 2022-091883.
May 25, 2021 International Search Report issued in International Patent Application No. PCT/JP2021/014012.
Sep. 29, 2022 International Preliminary Report on Patentability issued in International Patent Application No. PCT/JP2021/014012.
Jan. 31, 2023 Reconsideration Report issued in Japanese Patent Application No. 2022-091883.
May 29, 2024 Office Action issued in Chinese Patent Application No. 202180012824.9.
Jan. 8, 2025 Office Action issued in Taiwanese Patent Application No. 110111973.
May 9, 2025 Office Action issued in Japanese Patent Application No. 2022-189488.

* cited by examiner

DIFFUSING MEMBER, MANUFACTURING METHOD OF DIFFUSING MEMBER, PLANAR LIGHT SOURCE DEVICE, DISPLAY DEVICE, AND DIELECTRIC MULTILAYER FILM

TECHNICAL FIELD

The present disclosure relates to a diffusing member, a manufacturing method of a diffusing member, a planar light source device, a display device, and a dielectric multilayer film.

BACKGROUND ART

Background Art

Patent Document 1 (JP 6299811 B) discloses a planar light source device that emits light in a planar manner. The planar light source device may be used as a backlight for a liquid crystal display device. The planar light source device in Patent Document 1 is a direct-type, in which a light source confronts a diffusing member. Unevenness in brightness occurs in direct-type planar light source devices, due to the light source layout. The unevenness in brightness becomes pronounced in thinner planar light source devices.

DISCLOSURE OF THE INVENTION

The related art has not been able to sufficiently achieve uniform in-plane distribution of brightness while making planar light source devices thinner. It is an object of the present disclosure to make in-plane distribution of brightness sufficiently uniform while making the planar light source device thinner.

A first diffusing member according to the present disclosure includes a light diffusing portion that has light transmissivity and light diffusivity, and a light reflecting portion of which reflectance with respect to light of a particular wavelength entering at an angle of incidence of 0° is 80% or higher, and also of which reflectance with respect to at least part of light of the particular wavelength entering at an angle of incidence of which the absolute value is greater than 45° is lower than 50%, in this order.

A second diffusing member according to the present disclosure includes a light diffusing portion that has light transmissivity and light diffusivity, and a light reflecting portion of which transmittance with respect to light of a particular wavelength entering at an angle of incidence of 0° is smaller than transmittance with respect to light of the particular wavelength entering at a certain angle of incidence greater than 0°, in this order.

In the first and second diffusing members according to the present disclosure, the light diffusing portion may be formed as an uneven face making up a surface of the light reflecting portion.

In the first and second diffusing members according to the present disclosure, the light diffusing portion may have an uneven face facing an opposite side from the light reflecting portion side, and may be joined to the light reflecting portion.

In the first and second diffusing members according to the present disclosure, the light diffusing portion may include an optical sheet that has, on the light reflecting portion side thereof in a stacking direction in which the light diffusing portion and the light reflecting portion are stacked, an uneven face having light diffusivity.

In the first and second diffusing members according to the present disclosure, the light diffusing portion may include an optical sheet that has, on a side thereof opposite to the light reflecting portion side in the stacking direction in which the light diffusing portion and the light reflecting portion are stacked, an uneven face having light diffusivity.

In the first and second diffusing members according to the present disclosure, the light diffusing portion may include an optical sheet that has, on both sides thereof in the stacking direction in which the light diffusing portion and the light reflecting portion are stacked, an uneven face having light diffusivity.

In the first and second diffusing members according to the present disclosure, the light diffusing portion may include a plurality of optical sheets having light diffusivity.

In the first and second diffusing members according to the present disclosure, the light diffusing portion may include a microlens array that has a plurality of unit optical elements. The unit optical elements may include element faces of which a normal direction is inclined with respect to the stacking direction in which the light diffusing portion and the light reflecting portion are stacked by an angle that is greater than 45°. The unit optical elements may include element faces of which the normal direction is inclined with respect to the stacking direction in which the light diffusing portion and the light reflecting portion are stacked by an angle that is smaller than 45°.

In the first and second diffusing members according to the present disclosure, an indicator that indicates a direction in which the light diffusing portion is to be disposed may be provided.

The first and second diffusing members according to the present disclosure may further include an optical element portion that is disposed on a side of the light reflecting portion opposite to the light diffusing portion, and that has an uneven face on a side thereof opposite to the light reflecting portion.

A third diffusing member according to the present disclosure includes a light diffusing portion that has light transmissivity and light diffusivity, a light reflecting portion of which transmittance with respect to light of the particular wavelength entering at an angle of incidence of 0° is smaller than transmittance with respect to light of the particular wavelength entering at a certain angle of incidence greater than 0°, and an optical element portion that has an uneven face on a side opposite to the light reflecting portion, in this order.

In the first to third diffusing members according to the present disclosure, the uneven face may include an element face having a normal direction that is inclined by an angle of 25° or smaller with respect to the stacking direction in which the light reflecting portion and the optical element portion are stacked.

In the first to third diffusing members according to the present disclosure, the optical element portion may be joined to the light reflecting portion.

In the first to third diffusing members according to the present disclosure, the optical element portion may include a microlens array that has a plurality of unit optical elements.

In the first to third diffusing members according to the present disclosure, the optical element portion may include a microlens array that has a plurality of unit optical elements, and the unit optical elements may be convex portions protruding to an opposite side from the light reflecting portion.

In the first to third diffusing members according to the present disclosure, the optical element portion may include a microlens array that has a plurality of unit optical elements, the unit optical elements may include an element face having a normal direction that is inclined by an angle of 25° or smaller with respect to the stacking direction in which the light reflecting portion and the optical element portion are stacked, and the element face may form the uneven face.

In the first to third diffusing members according to the present disclosure, the optical element portion may include a microlens array that has a plurality of unit optical elements, the unit optical elements may include a curved element face, and the element face may form the uneven face.

In the first to third diffusing members according to the present disclosure, the optical element portion may include a microlens array that has a plurality of unit optical elements, and the unit optical elements may have dimensions smaller than a square that is 1.5 mm square, in observation from the stacking direction in which the optical element portion and the light reflecting portion are stacked.

In the first to third diffusing members according to the present disclosure, the optical element portion may include a microlens array that has a plurality of unit optical elements, the unit optical elements may include an element face formed as a matte face, and the element face may form the uneven face.

In the first to third diffusing members according to the present disclosure, the optical element portion may have a plurality of unit optical elements arrayed in one direction, and the unit optical elements may linearly extend in another direction that is non-parallel to the one direction.

In the first to third diffusing members according to the present disclosure, the optical element portion may have a plurality of unit optical elements arrayed in one direction, the unit optical elements may linearly extend in another direction that is non-parallel to the one direction, and the unit optical elements may be convex portions protruding to the opposite side from the light reflecting portion.

In the first to third diffusing members according to the present disclosure, the optical element portion may have a plurality of unit optical elements arrayed in one direction, the unit optical elements may linearly extend in another direction that is non-parallel to the one direction, and the unit optical elements may include an element face having a normal direction that is inclined by an angle of 25° or smaller with respect to the stacking direction in which the light reflecting portion and the optical element portion are stacked.

In the first to third diffusing members according to the present disclosure, the optical element portion may have a plurality of unit optical elements arrayed in one direction, the unit optical elements may linearly extend in another direction that is non-parallel to the one direction, the unit optical elements may include a curved element face, and the element face may form the uneven face.

In the first to third diffusing members according to the present disclosure, the optical element portion may have a plurality of unit optical elements arrayed in one direction, the unit optical elements may linearly extend in another direction that is non-parallel to the one direction, the unit optical elements may include an element face formed as a matte face, and the element face may form the uneven face.

A planar light source device according to the present disclosure includes any one of the above first to third diffusing members according to the present disclosure, and a light source that outputs light that enters the diffusing member.

In the planar light source device according to the present disclosure, light output from the light source may be P-polarized.

In the planar light source device according to the present disclosure, the light source may include a plurality of light sources that are orderly arrayed, and at least one of the light diffusing portion and the optical element portion may include a microlens array that has a plurality of unit optical elements that are arrayed in a direction non-parallel to an array direction of the plurality of light sources.

In the planar light source device according to the present disclosure, the light source may include a plurality of light sources that are orderly arrayed, at least one of the light diffusing portion and the optical element portion may include a microlens array that has a plurality of unit optical elements, and the unit optical elements may include an element face having a normal direction that is non-parallel to the array direction of the plurality of light sources in observation from a stacking direction in which the light diffusing portion and the light reflecting portion are stacked.

The planar light source device according to the present disclosure may further include a support substrate that supports the light source from an opposite side to the diffusing member, and the diffusing member may further have a thermoplastic resin layer provided on the support substrate side of the light diffusing portion.

The planar light source device according to the present disclosure may further include a support substrate that supports the light source from an opposite side to the diffusing member, and the diffusing member may further have a thermoplastic resin layer provided on the support substrate side of the light diffusing portion.

A display device according to the present disclosure includes any one of the above planar light source devices according to the present disclosure.

A first dielectric multilayer film according to the present disclosure is a dielectric multilayer film used in combination with at least one of a diffractive optical element and a microlens array, of which reflectance with respect to light of a particular wavelength entering at an angle of incidence of 0° is 80% or higher, and also of which reflectance with respect to at least part of light of the particular wavelength entering at an angle of incidence of which the absolute value is greater than 45° is lower than 50%.

A second dielectric multilayer film according to the present disclosure is a dielectric multilayer film used in combination with at least one of a diffractive optical element and a microlens array, of which transmittance with respect to light of a particular wavelength entering at an angle of incidence of 0° is smaller than transmittance with respect to light of the particular wavelength entering at a certain angle of incidence greater than 0°.

A first manufacturing method of the diffusing member according to the present disclosure includes a process of irradiating a resin composition situated between a mold and a light reflecting portion by ionizing radiation to cure the resin component, and a process of peeling the mold away from a light diffusing portion that is made of cured matter of the resin composition and that is stacked on the light reflecting portion.

A second manufacturing method of the diffusing member according to the present disclosure includes a process of irradiating a resin composition situated between a mold and a dielectric multilayer film by ionizing radiation to cure the resin component, and a process of peeling the mold away from a microlens array or a diffractive optical element that is made of cured matter of the resin composition and that is stacked on the dielectric multilayer film.

A third manufacturing method of the diffusing member according to the present disclosure includes a process of curing a resin composition coated on one face of a dielectric multilayer film to form a light diffusing portion having an uneven face upon the dielectric multilayer film, and a process of curing a resin composition coated on another face of a dielectric multilayer film to form an optical element portion having an uneven face upon the dielectric multilayer film.

According to the present invention, in-plane distribution of brightness can be made sufficiently uniform while making the planar light source device thinner.

BRIEF DESCRIPTION OF THE DRAWINGS

FIG. 29 is a diagram for describing an example in which the planar light source device includes an air gap formation layer.

MODE FOR CARRYING OUT THE INVENTION

Figure 1:
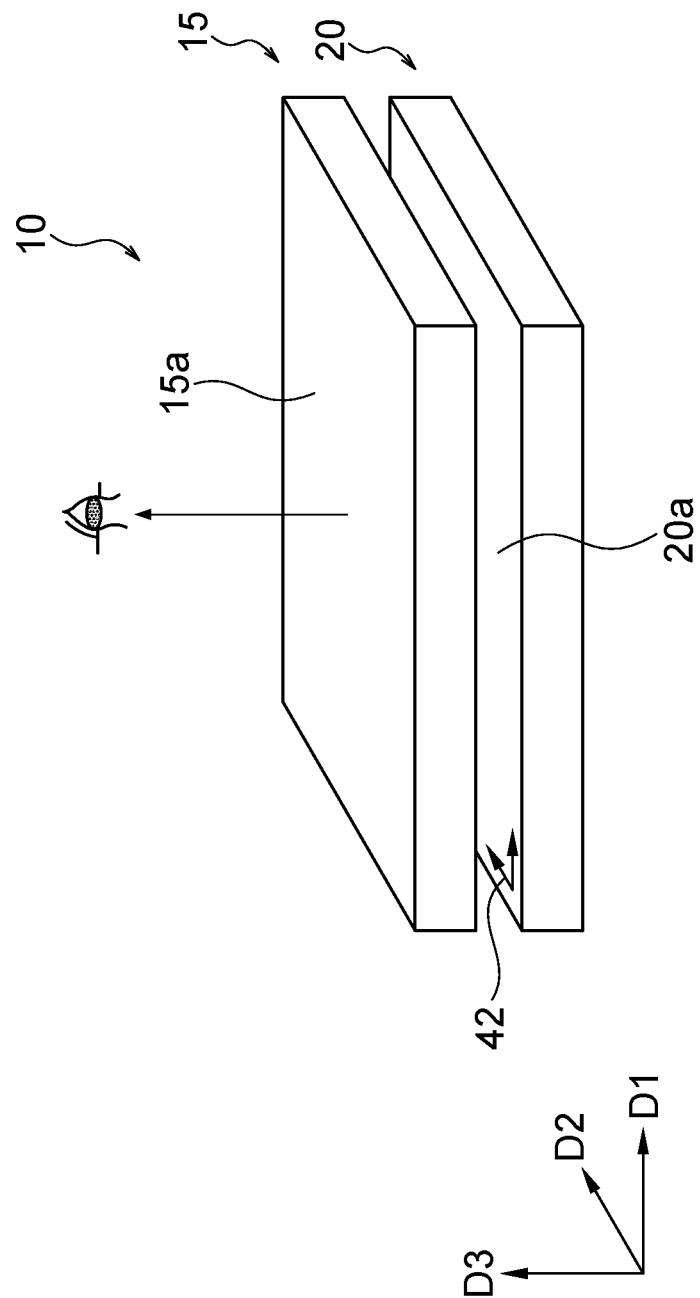
FIG. 1 is a diagram for describing a first specific example of an embodiment, and is a perspective view showing a display device and a planar light source device.

An embodiment of the present disclosure will be described below with reference to the drawings. Note that in the drawings attached to the present specification, the scale, the vertical-to-horizontal dimensional ratio, and so forth, have been changed from each of the actual items and exaggerated as appropriate, for the sake of convenience in illustrating and facilitating understanding. Also, configurations and so forth shown in some of the drawings are omitted from other drawings.

In the present specification, the terms "sheet", "film", and "plate" are not distinguished from each other on the basis of difference in naming alone. For example, "sheet" is a concept that includes members referred to as "film" or "plate", and distinguishment thereof is not made by difference in naming alone.

Also, in the present specification, the normal direction of a sheet-like (film-like, plate-like) member indicates the normal direction to a sheet plane of the sheet-like (film-like, plate-like) member that is the object. Also, "sheet plane (film face, plate face)" indicates a plane that matches a planar direction of the sheet-like member (film-like member, plate-like member) that is the object, when observing the sheet-like (film-like, plate-like) member that is the object in entirety and comprehensively.

Further, length and angle values and so forth, regarding terms such as "parallel", "perpendicular", "same", and so forth, for example, used to identify shapes and geometric conditions and the extent thereof in the present specification, are to be interpreted including a range of an extent in which similar functions can be anticipated, without being bound by the strict meaning thereof.

Figure 2:
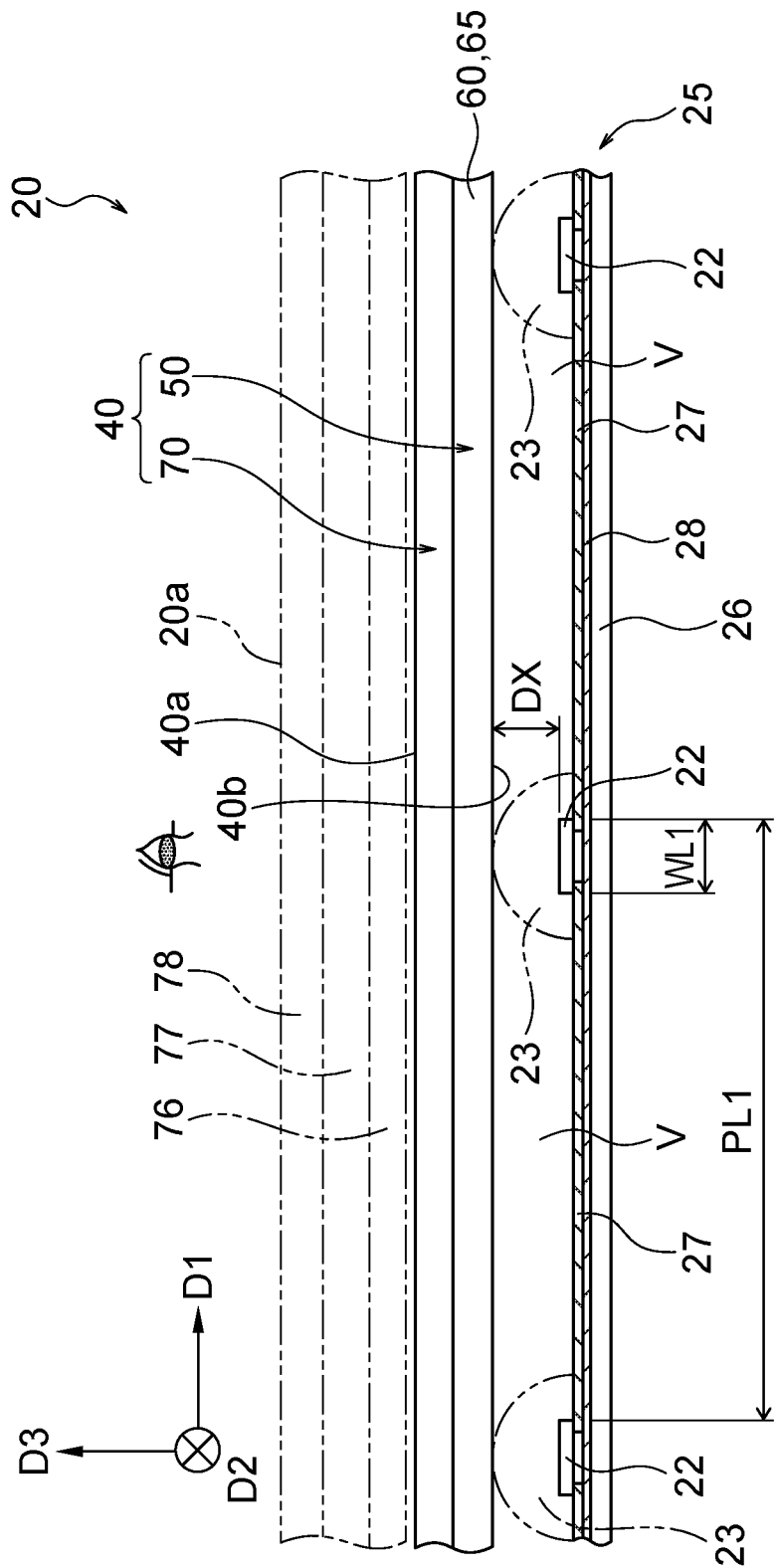
FIG. 2 is a longitudinal-sectional view of the planar light source device in FIG. 1.
Figure 3:
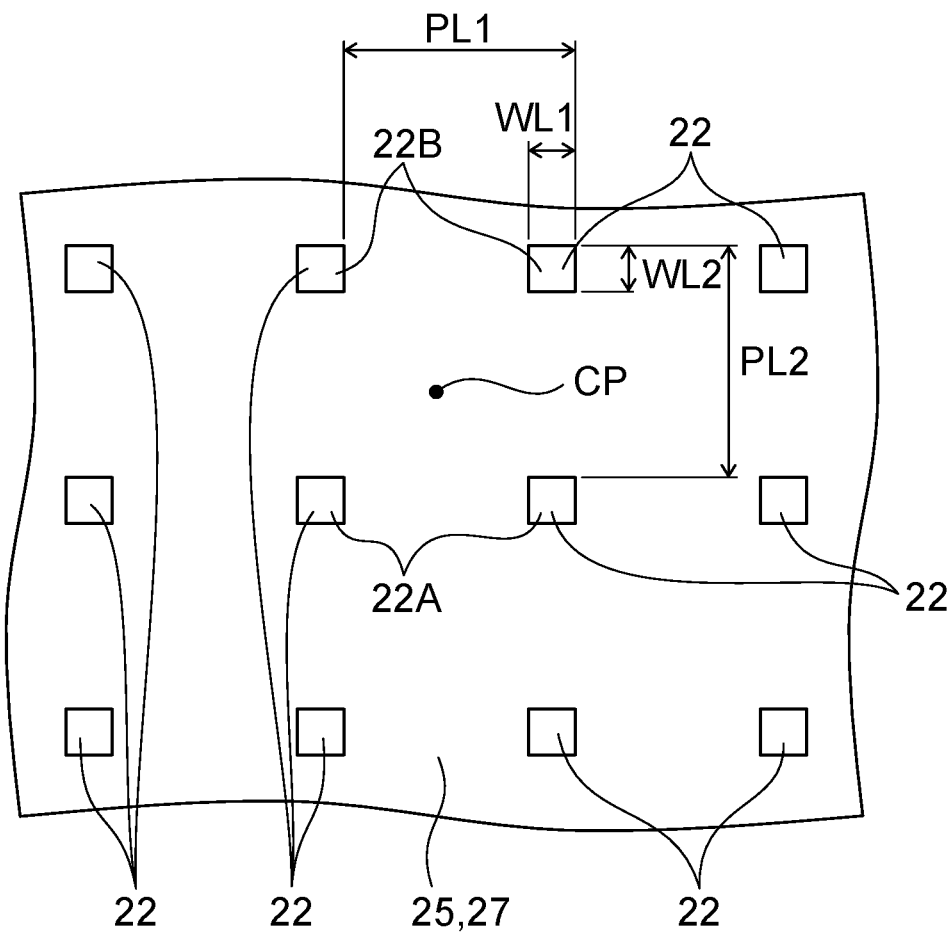
FIG. 3 is a plan view showing a plurality of light sources of the planar light source device in FIG. 2.

Note that in some of the drawings, a first direction D1, a second direction D2, and a stacking direction D3 are indicated by arrows as directions held in common among the drawings, in order to clarify the directional relation among the drawings. Tip end sides of the arrows are one side in the directions D1, D2, and D3. For example, as shown in FIG. 2, an arrow in a direction that is perpendicular to the plane of the drawing and heads toward the far side from the plane of the drawing is indicated by a symbol with an X inside of a circle. For example, as shown in FIG. 3, an arrow in a direction that is perpendicular to the plane of the drawing and heads toward the near side from the plane of the drawing is indicated by a symbol with a dot inside of a circle.

FIG. 1 to FIG. 40 are diagrams for describing an embodiment. Of these, FIG. 1 is a perspective view schematically showing a display device 10 as an application example of a planar light source device 20 and a diffusing member 40. The display device 10 displays pictures made up of, for example, moving images, still images, text information, or combinations thereof. The display device 10 can be used as an onboard liquid crystal display device, for example. That display device 10 can also be used in various usages, such as indoor or outdoor advertisements, presentations, television pictures, display of various types of information, and so forth. The display device 10 shown in FIG. 1 has the planar light source device 20 that has a light-emitting face 20a, and a display panel 15 disposed while facing the light-emitting face 20a.

FIG. 2 is a longitudinal-sectional view showing the planar light source device 20 as a first specific example. As shown in FIG. 2, the planar light source device 20 has, as primary components, light sources 22, and the diffusing member 40 that adjusts optical paths of light output from the light sources 22. The diffusing member 40 is disposed while confronting the light sources 22. That is to say, the diffusing member 40 is a sheet-like member, and faces the light sources 22 in the normal direction thereof. The diffusing member 40 is capable of effectively resolving unevenness in brightness due to the presence of the light sources 22, by diffusing the light output from the light sources 22. Accordingly, the illuminance at each position on a light-exiting side face 40b of the diffusing member 40, or the illuminance at each position on a virtual light-receiving face that is situated in the vicinity of the light-exiting side face 40b and is parallel to the light-exiting side face 40b, can be made to be uniform. In particular, measures are implemented in the diffusing member 40 described in the present embodiment to make the in-plane distribution of brightness sufficiently uniform while making the planar light source device 20 thinner.

The "illuminance at the light-exiting side face 40b" which will be used in the description below means "illuminance on the light-exiting side face 40b" or the aforementioned "illuminance on the light-receiving face".

The display device 10, the planar light source device 20, and the diffusing member 40 according to the embodiment will be described below with reference to the first specific example that is shown.

First, the display panel 15 of the display device 10 will be described. As shown in FIG. 1, the display panel 15 is stacked with the planar light source device 20 in the stacking direction D3. The display panel 15 is disposed while facing the light-emitting face 20a of the planar light source device 20. The display panel 15 has a display face 15a on which pictures are displayed, as a face facing the opposite side from the planar light source device 20 in the stacking direction D3. In the example that is shown, the display panel 15 is formed with a rectangular shape as observed from the stacking direction D3, i.e., in plan view from the front direction.

The display panel 15 is configured as a transmissive-type liquid crystal display panel, for example. Part of incident light from the planar light source device 20 passes through the display panel 15 serving as the liquid crystal display panel, thereby displaying a picture on the display face 15a. The display panel 15 includes a liquid crystal layer that has a liquid crystal material. Light transmittance of the display panel 15 changes in accordance with the strength of an electric field applied to the liquid crystal layer.

As an example of the display panel 15, a liquid crystal display panel that has a pair of polarizing plates, and a liquid crystal cell (liquid crystal layer) disposed between the pair of polarizing plates can be used. The polarizing plates have polarizers. The polarizers split incident light into two perpendicular polarized light components. The polarized light component of one direction is transmitted through the polarizer. The polarized light component of the other direction that is perpendicular to the one direction is absorbed by the polarizer. The liquid crystal cell has a pair of support plates, and liquid crystal disposed between the pair of support plates. The liquid crystal cell is configured such that an electric field is applied to each region making up one pixel. As an example, the orientation of the liquid crystal in the liquid crystal cell to which the electric field is applied changes. As an example, the polarized light component of a particular direction, which exits from the planar light source device 20 and passes through the polarizing plate disposed on the planar light source device 20 side of the liquid crystal cell, is rotated 90° in polarization direction thereof when passing through a liquid crystal cell to which no electric field is applied. The polarized light component of the particular direction maintains the polarization direction when passing through a liquid crystal cell to which the electric field is applied. Whether the polarized light component of the particular direction that has been transmitted through one polarizing plate is further transmitted through the other polarizing plate, or is absorbed by the other polarizing plate and is shielded, can be controlled by whether or not the electric field is applied to the liquid crystal cell.

Next, the planar light source device 20 will be described. The planar light source device 20 has the light-emitting face 20a from which planar light exits. The planar light source device 20 is configured as a direct-type backlight. The light sources 22 are provided in regions overlaying the light-emitting face 20a in projection in the stacking direction D3. In the shown example, the normal direction of the display panel 15, the normal direction of the display face 15a, the normal direction of the light-emitting face 20a, the normal direction of the diffusing member 40, the normal directions of a light diffusing portion 50, a light reflecting portion 70, and an optical element portion 110, which are included in the diffusing member 40 and which are to be described later, and the normal directions of a support substrate 25 that supports the light sources 22 and that is to be described later, are parallel to each other. In the shown example, these normal directions match the stacking direction D3, and are also referred to as front direction.

The light sources 22 have light-emitting elements that output light. Light-emitting diodes are an example of the light-emitting elements. Light-emitting diodes are also written as LEDs. The dimensions of the light-emitting diodes used as the light sources 22 are not limited in particular. Small-sized light-emitting diodes, such as mini LEDs or micro LEDs for example, may be used from the perspective of making images of the light sources 22 inconspicuous. Specifically, lengths WL1 and WL2 of each side of the light sources 22 having square shapes in observation from the stacking direction D3, shown in FIG. 3, preferably may be 0.5 mm or less, and more preferably may be 0.2 mm or less.

The light emission wavelength of the light sources 22 can be selected as appropriate, in accordance with the usage of the planar light source device 20. For example, the planar light source device 20 may have light-emitting elements that emit blue light and light-emitting elements that emit yellow light, and generate white light. Also, the planar light source device 20 may have light-emitting elements that emit blue light, light-emitting elements that emit green light, and light-emitting elements that emit red light, and generate white light. In a case in which a plurality of light-emitting elements are provided, one light source 22 may include a plurality of types of the light-emitting elements disposed in close proximity, or may include only a single light-emitting element. That is to say, a plurality of types of the light sources 22 having different light emission wavelengths may be used.

In the shown specific example, the light sources 22 may include light-emitting diodes that output blue light of a wavelength of 450 nm, as the light-emitting elements. According to this example, light-emitting diodes with great output can be used as the light sources 22. On the other hand, elements which can change the wavelength, such as fluorescent material, can be used to generate white light.

The light sources 22 may be made up of light-emitting elements alone, as an example. As another example, the light sources 22 may include optical elements such as covers, lenses, and so forth, to adjust light distribution from the light-emitting elements, and may include fluorescent material that absorbs light from the light-emitting elements and outputs light of a different wavelength, in addition to the light-emitting elements.

The light distribution properties of the light sources 22 are not limited in particular. The light distribution properties of the light sources 22 may be Lambertian light distribution. In Lambertian light distribution, in the light emission intensity distribution from the light sources 22 directed in the stacking direction D3, the highest peak intensity is obtained in the stacking direction D3 that is the optical axis, and an intensity of half of the peak intensity is obtained at a direction inclined 60° from the optical axis. As another example, the peak intensity may be obtained in a direction other than the stacking direction D3. For example, batwing light distribution that is disclosed in Patent Document 1 (JP 6299811 B) may be used as the light distribution properties of the light sources 22.

The planar light source device 20 may have a plurality of light sources 22, or may have a single light source 22 alone. The number of the light sources 22 is selected as appropriate in accordance with the usage of the planar light source device 20, the area of the light-emitting face 20a, and so forth. The plurality of light sources 22 included in the planar light source device 20 are preferably orderly laid out on a plane perpendicular to the stacking direction D3, from the perspective of resolving unevenness in brightness due to the layout of the light sources 22. For example, the plurality of light sources 22 may be laid out in a honeycomb layout which is a layout at constant pitches in each of three directions that are inclined by 60° from each other, or a square layout which is a layout at constant pitches in each of two directions that are perpendicular each other.

In the example shown in FIG. 3, the plurality of light sources 22 are laid out at constant pitches in each of the first direction D1 and the second direction D2 that are perpendicular each other. In the shown example, an array pitch PL1 in the first direction D1 and an array pitch PL2 of the light sources 22 in the second direction D2 are the same. Note however, that the shown example is not limiting, and the array pitch PL1 and the array pitch PL2 may be different. In the shown example, the first direction D1 and the second direction D2 are each parallel to side edges of the planar light source device 20 and the diffusing member 40 that are rectangular in shape. The array pitch PL1 and the array pitch PL2 of the light sources 22 may each be 0.2 mm or more, and 10 mm or less.

Also, the light sources 22 may output only P-polarized light at the time of entering the diffusing member 40. P-polarized light is light that oscillates on a plane including the direction of travel of the light at the time of incidence to the diffusing member 40 and the normal direction of a light-entering side face 40a of the diffusing member 40. Output of P-polarized light alone by the light sources 22 enables the transmittance with respect to light entering at a great angle of incidence to be sufficiently high, and the diffusing member 40 can be imparted with desired optical properties, when using a later-described dielectric multilayer film for the light reflecting portion 70. Accordingly, the in-plane distribution of illuminance at the light-exiting side face 40b of the diffusing member 40 can be effectively made uniform.

Now, the shown planar light source device 20 further has, in addition to the light sources 22 and the diffusing member 40, the support substrate 25 that supports the light sources 22. The support substrate 25 supports the plurality of light sources 22 from the side thereof opposite to the diffusing member 40 in the stacking direction D3. The support substrate 25 includes a circuit that supplies electric power to the light sources 22. The support substrate 25 is a sheet-like member. The support substrate 25 has light reflectivity that reflects light toward the diffusing member 40. The light reflectivity at the support substrate 25 is not limited in particular, as long as the light reflectivity is exhibited with respect to light output from the light sources 22 or light used for light emission by the planar light source device 20. Light used for light emission by the planar light source device 20 may include light that is output from the light sources 22 and subjected to wavelength conversion, and so forth.

A specific configuration has, as shown in FIG. 2, a substrate main body 26 that is sheet-like, a reflecting layer 27 that is stacked on the substrate main body 26 on the diffusing member 40 side thereof in the stacking direction D3, and wiring 28 that electrically connects the light sources 22. The substrate main body 26 extends in a direction perpendicular to the stacking direction D3, and the substrate main body 26 is insulative. The reflecting layer 27 has reflectivity with respect to light output from the light sources 22 or light used for light emission by the planar light source device 20. The reflectivity at the reflecting layer 27 may be regular reflection, which is also referred to as mirror reflection, or may be diffused reflection, or further may be anisotropic diffused reflection. The substrate main body 26 may be resin film containing diffusing particles, such as white polyethylene terephthalate film containing diffusing particles, for example. The reflecting layer 27 may be a metal layer stacked on the substrate main body 26, or may be a reflecting-type diffractive optical element. The wiring 28 is electrically connected to terminals of the light sources 22 that are omitted from illustration, by solder or the like. In a case in which the substrate main body 26 and the reflecting layer 27 are insulative, the wiring 28 preferably is situated between the substrate main body 26 and the reflecting layer 27.

Note that the light sources 22 may be covered by a sealing material 23, as indicated by chain double-dashed lines in FIG. 2. The sealing material 23 is provided corresponding to each light source 22. In the example shown in FIG. 2 and FIG. 3, the sealing material 23 is two-dimensionally arrayed, in the same way as the light sources 22. In the shown example, the faces of the light sources 22 facing the diffusing member 40 side, and the side faces thereof, are covered by the sealing material 23. The sealing material 23 is fixed to the support substrate 25. Portions where the light sources 22 and the wiring 28 are electrically connected may also be covered by the sealing material 23. Examples of materials that can be used to serve as the sealing material 23 include thermosetting resins such as silicone-based resins, epoxy-based resins, and so forth, and thermoplastic resins such as olefin-based resins, and so forth.

Note that in the example shown in FIG. 2, the diffusing member 40 is disposed upon the sealing material 23. That is to say, the diffusing member 40 is distanced from the light sources 22 and the support substrate 25 in the stacking direction D3 by being supported by the sealing material 23. The sealing material 23 may be joined to the diffusing member 40 by bonding, adhesion, fusing, or the like. Note that a distance DX shown in FIG. 2 is the distance by which the light sources 22 and the diffusing member 40 are distanced in the stacking direction D3. In other words, the distance DX indicates the distance between the faces of the light sources 22 facing the diffusing member 40 side and the light-entering side face 40a of the diffusing member 40 in the stacking direction D3.

Next, the diffusing member 40 will be described. The diffusing member 40 has the light diffusing portion 50 and the light reflecting portion 70, in this order. The light diffusing portion 50 is situated at the side of the diffusing member 40 at which light to be diffused thereby enters, with respect to the light reflecting portion 70 as a reference. The light reflecting portion 70 is situated at the light-exiting side of light to be diffused at the diffusing member 40, with respect to the light diffusing portion 50 as a reference. The diffusing member 40 is sheet-like in the example shown in FIG. 2. The diffusing member 40 extends in the first direction D1 and the second direction D2 that are perpendicular to the stacking direction D3. The light diffusing portion 50 forms the light-entering side face 40a of the diffusing member 40. The light reflecting portion 70 forms the light-exiting side face 40b of the diffusing member 40. Note that the light diffusing portion 50 and the light reflecting portion 70 may be joined to each other, or may be simply in contact without being joined, or further may be distanced from each other.

First, the light diffusing portion 50 will be described. The light diffusing portion 50 has light transmissivity and light diffusivity with respect to light output from the light sources 22 or light used for light emission by the planar light source device 20. The light diffusing portion 50 has light transmissivity and light diffusivity with respect to visible light. The light diffusing portion 50 may include an optical sheet 55 obtained by simply overlaying with another member or joined by bonding or adhesions to another member. The light diffusing portion 50 may be the optical sheet 55. The light diffusing portion 50 may be part of the optical sheet 55, member, and a structure or the like. The light diffusing portion 50 further may be a face of the optical sheet, member, and structure or the like.

Regarding the light transmissivity that the light diffusing portion 50 has, for example, the total light transmittance of the light diffusing portion 50 is preferably 50% or higher, more preferably is 70% or higher, and further preferably is 90% or higher. Setting the total light transmittance of the light diffusing portion 50 to the above range improves the usage efficiency of light from the light sources 22. In addition, the in-plane distribution of illuminance on the light-exiting side face 40b of the diffusing member 40 when applying the light diffusing portion 50 to the planar light source device 20 can be effectively made uniform. Accordingly, the light diffusing portion 50 is fabricated using a material that has high light transmissivity with respect to light output from the light sources 22 or light used for light emission by the planar light source device 20. Note that the total light transmittance is a value measured by a method conforming to JIS K7361-1:1997, with the angle of incidence set to 0 degrees. The total light transmittance is a value measured using an ultraviolet/visible/near-infrared spectrophotometer V-7200, manufactured by JASCO Corporation.

The light diffusivity at the light diffusing portion 50 may be isotropic diffusion or may be anisotropic diffusion. The light diffusing portion 50 may diffuse light in a direction within a certain particular angular range. The particular angular range may be one, or may be a plurality that are distanced from each other. Also, the diffusion by the light diffusing portion 50 is not limited to diffusion of transmitted light, and reflected light may be diffused.

With regard to the light diffusivity at the light diffusing portion 50, an angle of diffusion $\alpha$ of light incident to the light diffusing portion 50 preferably is 10° or greater, more preferably is 15° or greater, and further preferably is 20° or greater. Also, the angle of diffusion of light incident to the light diffusing portion 50 preferably is 85° or smaller, more preferably is 60° or smaller, and further preferably is 50° or smaller. Setting the angle of diffusion of the light diffusing portion 50 within such a range enables the in-plane distribution of illuminance on the light-exiting side face 40b of the diffusing member 40 to effectively be made uniform, when applying the diffusing member 40 to the planar light source device 20.

Figure 4:
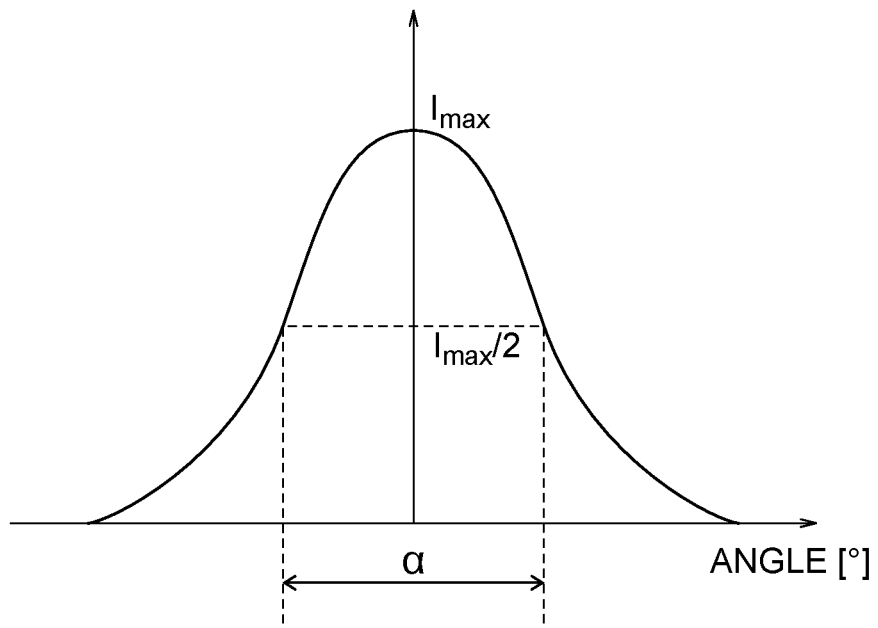
FIG. 4 is a graph for describing diffusing properties of a light diffusing portion of a diffusing member that can be included in the planar light source device in FIG. 2, showing angular distribution of radiant intensity.

The angle of diffusion $\alpha$ is full width at half maximum (FWHM) in angular distribution of radiant intensity (watt/steradian) obtained in a case of incidence of light at an angle of incidence of 0° to the light-entering side face of the light diffusing portion 50. FIG. 4 is a graph showing the angular distribution of radiant intensity on the light-exiting side face of the light diffusing portion 50 in a case of incidence of a parallel light bundle at an angle of incidence of 0° to the light-entering side face of the light diffusing portion 50. The vertical axis in the graph in FIG. 4 is the value of radiant intensity, and the horizontal axis is the angle of exit. The full width at half maximum in the angular distribution of radiant intensity corresponding to the angle of diffusion $\alpha$ is the range width)(° of the angle of exit at which radiant intensity that is half or more of the maximum intensity of transmitted light Imax at the angular distribution of radiant intensity is obtained.

The angular distribution of radiant intensity can be measured using a goniophotometer or a gonio spectrophotocolormeter. Measurement of the angle of diffusion $\alpha$ can be performed using a goniophotometer GP-200 manufactured by Murakami Color Research Laboratory, for example.

The angle of incidence means an angle)(°) formed by the direction of travel of incident light as to the normal direction of a member that is sheet-like or the like, to which light enters. The angle of exit means an angle)(° formed by the direction of travel of exiting light as to the normal direction of the member that is sheet-like or the like from which light exits.

Figure 5:
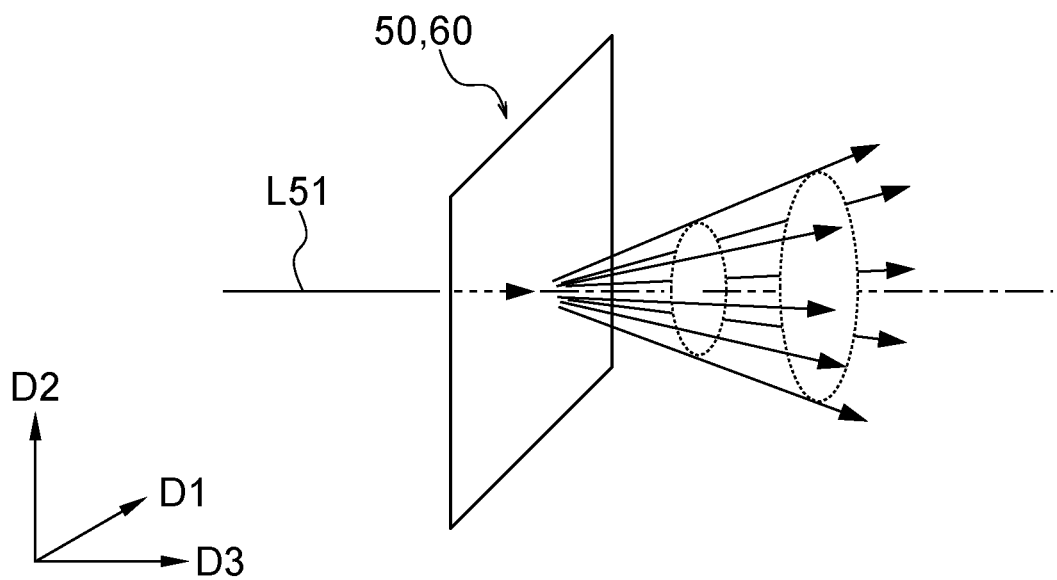
FIG. 5 is a perspective view showing the light diffusing portion of the diffusing member that can be included in the planar light source device in FIG. 2, and is a diagram for describing light diffusing properties of a diffractive optical element making up the light diffusing portion.

Further, FIG. 5 is a perspective view for describing other preferable light diffusing properties of the light diffusing portion 50 that are different from the light diffusivity in FIG. 4. In FIG. 5, a light ray L51 is incident to the light diffusing portion 50 at an angle of incidence of 0°. That is to say, the light ray L51 is perpendicularly incident to the light diffusing portion 50. The light ray L51 is diffused by optical effects of the light diffusing portion 50 such as refraction, reflection, diffraction, and so forth. According to the light diffusing portion 50 shown in FIG. 5, the light ray L51 primarily travels along optical paths from an apex of a cone of which the apex is situated on the light diffusing portion 50 and the bottom face is arranged parallel to the light diffusing portion 50, toward positions on the circumference of the bottom face thereof. In this example, the radiant intensity, at the side of the light diffusing portion 50 that faces the light reflecting portion 70 in a case of the light ray entering the light diffusing portion 50 at an angle of incidence of 0°, has a peak at an angle of exit that is other than 0°. More preferably, the radiant intensity, at the side of the light diffusing portion 50 that faces the light reflecting portion 70 in a case of the light ray entering the light diffusing portion 50 at an angle of incidence of 0°, has a peak at an angle of exit that is other than 0° in an angular distribution in any plane that includes a direction of exit of which the angle of exit is 0°. The absolute value of the angle of exit having the peak of radiant intensity preferably may be 30° or greater and 60° or smaller, more preferably may be 30° or greater and 50° or smaller, even more preferably may be 30° or greater and 45° or smaller. Also, the absolute value of the angle of exit of 90% or more light out of the light incident to the light diffusing portion 50 at an angle of incidence of 0° may be 30° or greater and 60° or smaller. The absolute value of the angle of exit of 95% or more light out of the light incident to the light diffusing portion 50 at an angle of incidence of 0° may be 30° or greater and 60° or smaller. The absolute value of the angle of exit of 98% or more light out of the light incident to the light diffusing portion 50 at an angle of incidence of 0° may be 30° or greater and 60° or smaller.

By imparting the light diffusivity described with reference to FIG. 5 to the light diffusing portion 50, the diffusing member 40 can suppress the illuminance from being excessively high at regions directly above the light sources 22, and can raise the illuminance of regions distanced from the light sources 22 in directions perpendicular to the stacking direction D3. Thus, in-plane distribution of illuminance can be effectively made uniform. In particular, from the perspective of uniform in-plane distribution of illuminance, the reflectance of the later-described light reflecting portion 70 regarding light entering the light reflecting portion 70 at an angle of incidence of which the absolute value is 0° or greater and the peak angle or smaller preferably is 80% or higher. More preferably, this is 85% or higher, and even more preferably is 90% or higher. The peak angle here means the absolute value of the angle of exit having the peak of radiant intensity.

Figure 6:
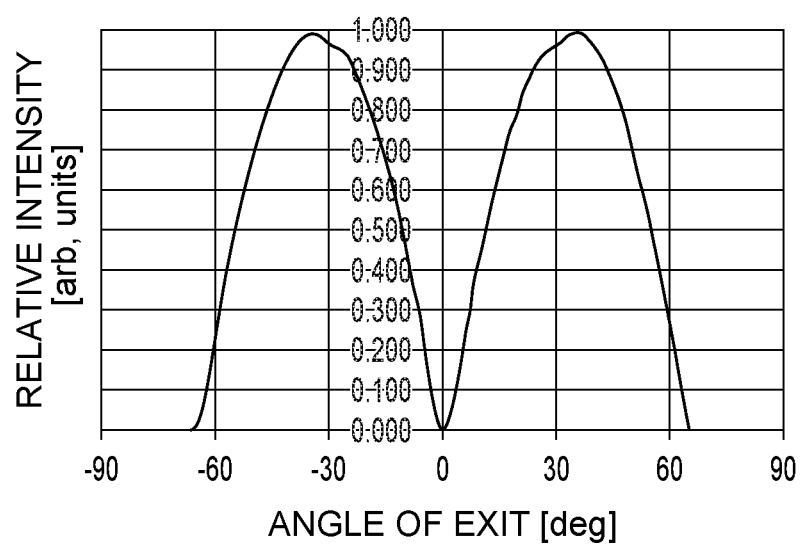
FIG. 6 is a graph for describing light diffusing properties of the diffractive optical element in FIG. 5, showing angular distribution of radiant intensity.

The solid line in FIG. 6 is a graph showing the angular distribution of the radiant intensity on the light-exiting side face of the light diffusing portion 50 shown in FIG. 5, in a case in which the angle of incidence of the incident light is 0°.

The light diffusing portion 50 is not limited in particular, and various configurations that have light transmissivity and light diffusivity may be employed. The light diffusing portion 50 may include at least one of a transmissive-type diffractive optical element 60 and a microlens array 65.

The diffractive optical element 60 is an element that has diffracting effects on incident light. The diffractive optical element 60 may be a holographic element. Diffractive optical elements having diffracting properties to realize desired light diffusivity can be designed relatively easily. For example, the diffractive optical element 60 can have the diffusing properties shown in FIG. 6.

The microlens array 65 has a plurality of unit optical elements 66. As shown in FIG. 7 to FIG. 10, the unit optical elements 66 are elements that change the direction of travel of light by refraction, reflection, and so forth. The unit optical elements 66 are a concept including elements referred to as unit form elements, unit prisms, and unit lenses. The unit optical elements 66 are configured as convex portions 68 or concave portions 69. In the examples shown in FIG. 7 to FIG. 10, the light diffusing portion 50 has a main unit portion 58, with unit optical elements 66 serving as convex portions 68 formed upon the main unit portion 58. Note however, that the light diffusing portion 50 may have the main unit portion 58 and unit optical elements 66 serving as concave portions 69 provided upon the main unit portion 58, which will be described later. The main unit portion 58 is sheet-like. The main unit portion 58 extends in the first direction D1 and the second direction D2 which are perpendicular to the stacking direction D3. In the example shown in FIG. 2, the main unit portion 58 is joined to the light reflecting portion 70.

As shown in FIG. 7 to FIG. 10, the unit optical elements 66 have element faces 67 inclined with respect to the stacking direction D3. The unit optical elements 66 are defined by the element faces 67. The microlens array 65 has an uneven face 52 formed by the element faces 67 of the unit optical elements 66. The microlens array 65 is capable of bending the direction of travel of incident light by this uneven face 52.

Figure 7:
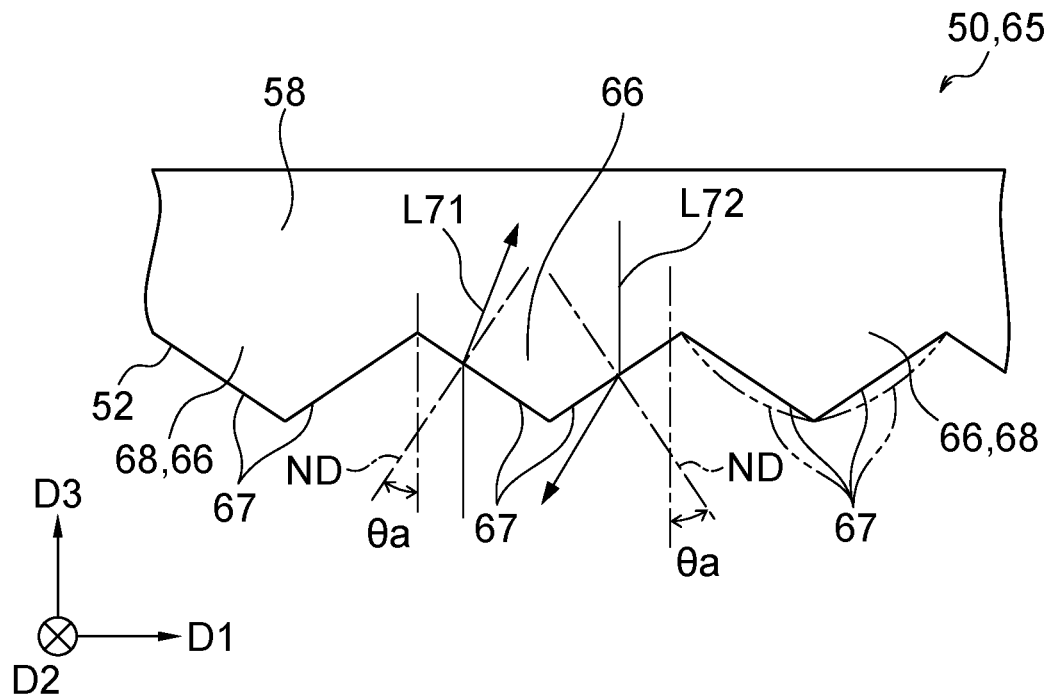
FIG. 7 is a longitudinal-sectional view showing an example of a microlens array that can be included in the planar light source device in FIG. 2.
Figure 8:
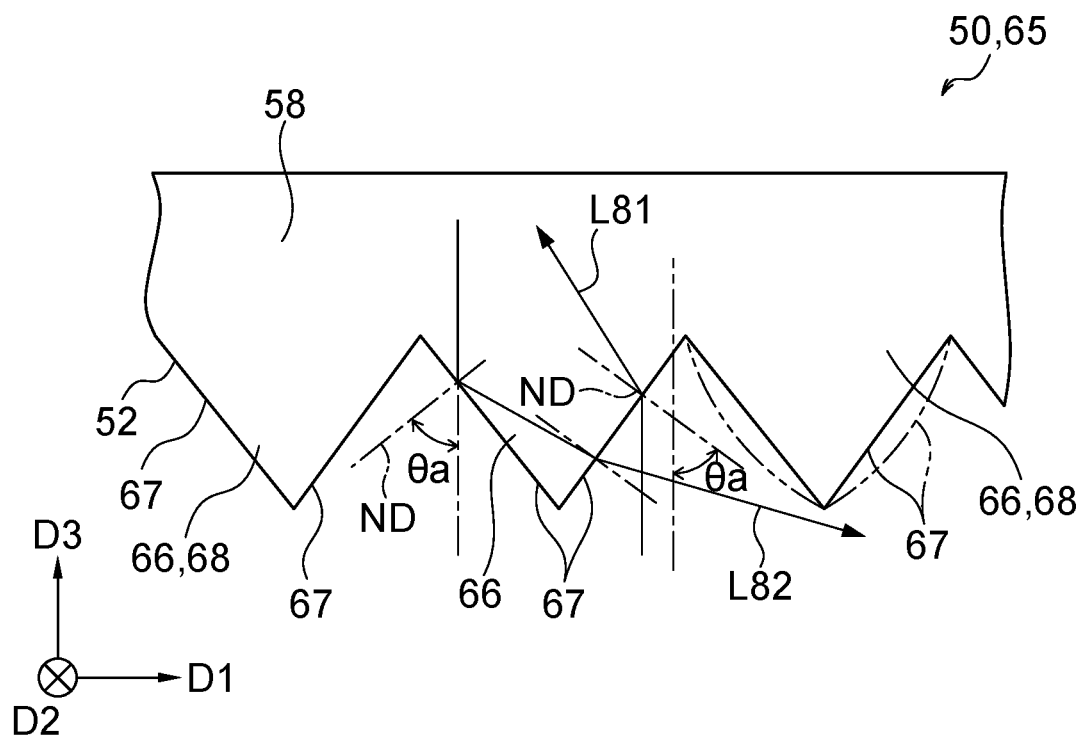
FIG. 8 is a longitudinal-sectional view showing another example of the microlens array that can be included in the planar light source device in FIG. 2.
Figure 9:
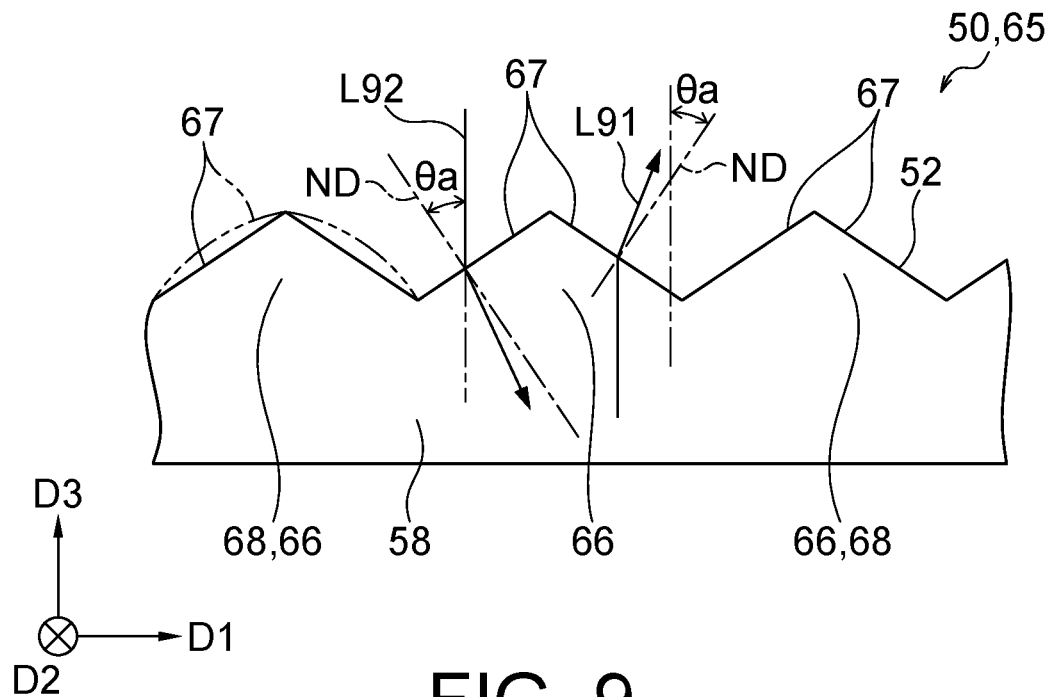
FIG. 9 is a longitudinal-sectional view showing yet another example of the microlens array that can be included in the planar light source device in FIG. 2.
Figure 10:
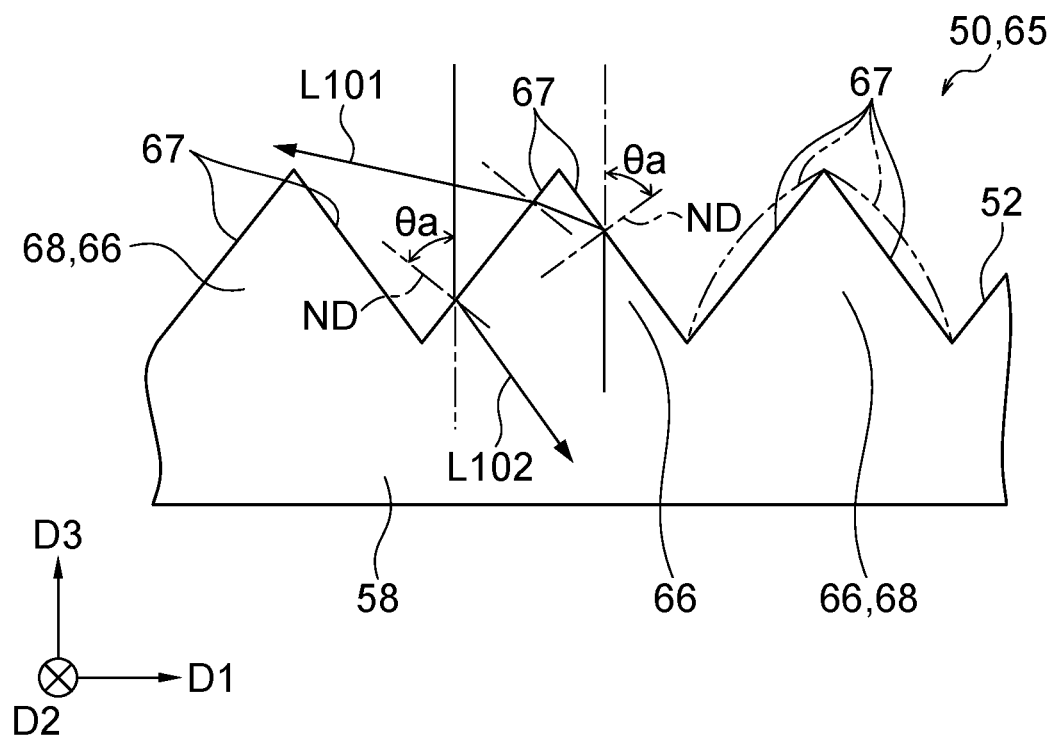
FIG. 10 is a longitudinal-sectional view showing yet another example of the microlens array that can be included in the planar light source device in FIG. 2.

The uneven face 52 may be facing either way in the stacking direction D3. In FIG. 7 and FIG. 8, the uneven face 52 is facing the light source 22 side in the stacking direction D3. In FIG. 9 and FIG. 10, the uneven face 52 is facing the light reflecting portion 70 side in the stacking direction D3. The uneven face 52 is capable of bending the directions of travel of light L71, L81, L91, and L101, entering from the light source 22 side, and also is capable of bending the directions of travel of light L72, L82, L92, and L102, entering from the light reflecting portion 70 side. In particular, as shown in FIG. 7 to FIG. 10, the microlens array 65 is capable of bending the direction of travel of light entering from directions with a small inclination angle as to the stacking direction D3, so that the inclination angle with respect to the stacking direction D3 is greater than at the time of incidence. That is to say, the inclination angle that the direction of travel of exiting light from the light diffusing portion 50 forms with respect to the stacking direction D3 can be made to be greater than the inclination angle that the direction of travel of incident light to the light diffusing portion 50 forms with respect to the stacking direction D3.

In the examples shown in FIG. 7 and FIG. 9, refraction of the light L71, L72, L91, and L92 occurs at the element faces 67, thereby changing the direction of travel of the light. In the examples shown in FIG. 8 and FIG. 10, reflection of the light L82 and L101 occurs at the element faces 67, preferably total reflection, thereby changing the direction of travel of the light. The change in the direction of travel by reflection that is shown in FIG. 8 and FIG. 10 tends to be greater than the change in the direction of travel by refraction that is shown in FIG. 7 and FIG. 9. The greater a normal direction ND of the element faces 67 is inclined with respect to the stacking direction D3, in other words the more the element faces 67 are erected in the stacking direction D3, the more readily reflection of light occurs at the element faces 67. More specifically, in a case in which the normal direction ND of the element faces 67 forms an inclination angle θa that is greater than 45° with respect to the stacking direction D3, there is a tendency for light that is not greatly inclined with respect to the stacking direction D3 to be reflected at the element faces 67, and the direction of travel of this light to become greatly inclined with respect to the stacking direction D3.

From this point, the unit optical elements 66 may include element faces 67 of which the normal direction ND is inclined with respect to the stacking direction D3 by the inclination angle θa that is greater than 45°, as shown in FIG. 8 and FIG. 10. These element faces 67 are erected in the stacking direction D3, and accordingly reflection, preferably total reflection, occurs more readily. That is to say, according to the unit optical elements 66 including these element faces 67, the optical paths of light transmitted through the microlens array 65 can be greatly bent through reflection, preferably total reflection. Greatly adjusting the direction of travel of light enables the in-plane distribution of illuminance to be made uniform more effectively.

The diffusing properties of the microlens array 65 are affected by the inclination angle θa of the element faces 67 of the unit optical elements 66. Accordingly, cross-sectional shapes of the microlens array 65 can be adjusted as appropriate on the basis of optical properties required of the planar light source device 20 and the diffusing member 40. For example, the inclination angle θa of the plurality of element faces 67 included in a single unit optical element 66 may be different from each other, or may be the same. The configurations of the plurality of unit optical elements 66 included in the microlens array 65, such as shapes, orientations, sizes, and so forth, may be different from each other. The plurality of unit optical elements 66 included in the microlens array 65 may have the same configurations as each other.

Note that from the perspective of making the illuminance uniform by combining with reflection properties of the light reflecting portion 70, making the inclination angle θa to be greater may be preferable, or making the inclination angle θa to be smaller may be preferable, in accordance with the array of the unit optical elements 66, and further optical properties of other parts, and so forth. For example, in a case of a combination with the optical element portion 110 as in a later-described second specific example, the inclination angle θa preferably is 25° or smaller, more preferably is 20° or smaller, and even more preferably is 15° or smaller.

Further, the element faces 67 may be somewhat curved, as indicated by the chain double-dashed lines in FIG. 7 to FIG. 10. The unit optical elements 66 may have an external shape that is part of a sphere, such as a hemispherical shape or the like, or may have an external shape that is part of a spheroid. In a case in which the unit optical elements 66 include curved element faces 67, the optical paths of light that is transmitted through the microlens array 65 are bent in various directions by reflection and refraction. Accordingly, the in-plane distribution of illuminance can be more effectively made uniform. Also, the change in angular distribution of radiant intensity can be made smooth effectively.

From generally the same reason as the curved element faces 67, the unit optical elements 66 may include element faces 67 formed as matte faces. Element faces 67 serving as matte faces scatter light in various directions. Accordingly, the in-plane distribution of illuminance can be more effectively made uniform. Also, the change in angular distribution of radiant intensity can be made smooth effectively.

The plurality of unit optical elements 66 included in the microlens array 65 are two-dimensionally arrayed. Accordingly, the element faces 67 of the unit optical elements 66 included in the microlens array 65 face in various directions. As a result, the microlens array 65 is capable of guiding light in various directions, by the unit optical elements 66 that are two-dimensionally arrayed. The plurality of unit optical elements 66 may be irregularly arrayed, or may be orderly arrayed. Orderly arraying the plurality of unit optical elements 66 facilitates design of the microlens array 65, and also the unit optical elements 66 can be easily laid out with no spaces therebetween.

Now, a plurality of specific examples of the microlens array 65 will be described with reference to FIG. 11A to FIG. 14B. In particular, the microlens arrays 65 shown in these drawings were the objects of later-described simulation.

Figure 11A:
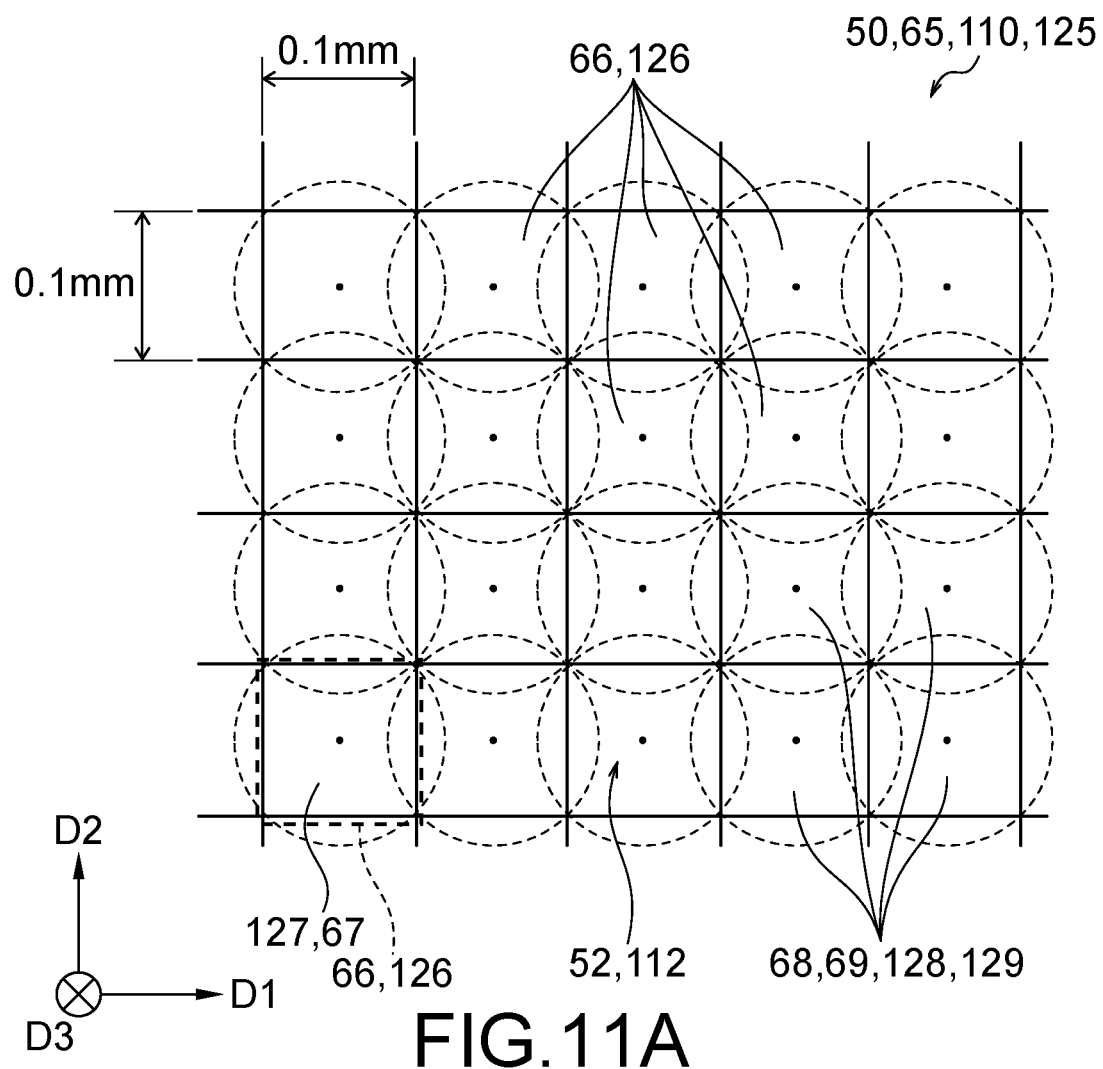
FIG. 11A is a plan view showing an example of a specific configuration of the microlens array that can be included in the planar light source device in FIG. 2.
Figure 11B:
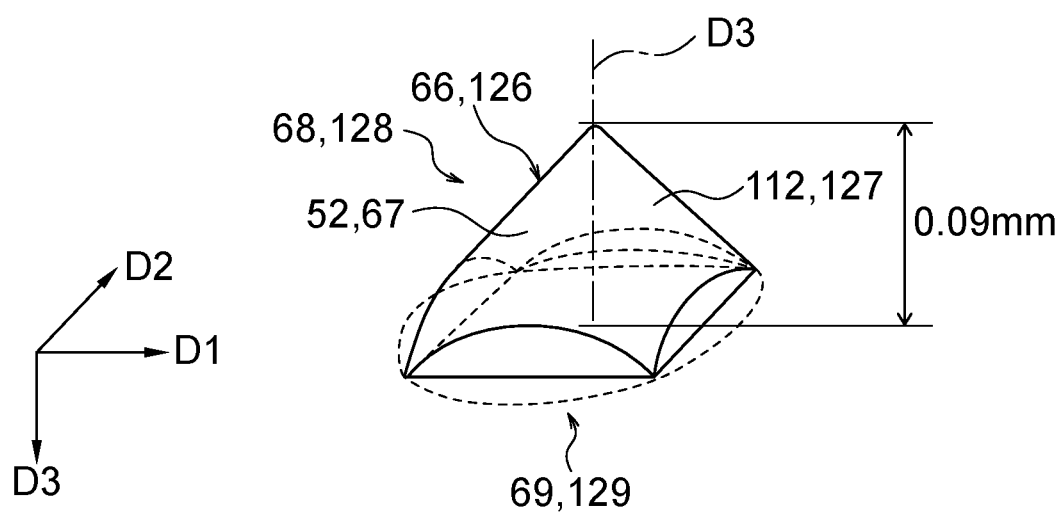
FIG. 11B is a perspective view showing a unit optical element of the microlens array in FIG. 11A.

First, in an example shown in FIG. 11A and FIG. 11B, the array of the plurality of unit optical elements 66 is a square array. The plurality of unit optical elements 66 are arrayed in the first direction D1 at constant pitches. The plurality of unit optical elements 66 are arrayed in the second direction D2 at constant pitches as well. The array pitch in the first direction D1 and the array pitch in the second direction D2 may be the same or may be different. In the shown example, the array pitch in the first direction D1 and array pitch in the second direction D2 are the same as each other, and are 0.1 mm. As shown in FIG. 11B, the unit optical elements 66 each have a shape of the base of a cone being cut away from four sides. The cones are laid out at a layout pitch that is shorter than the diameter of the bottom face of the cones indicated by dotted lines in FIG. 11A, with the overlapping portions of cones that are adjacent in the first direction D1 and the second direction D2 being cut away, thereby fabricating the microlens array 65. Thus, according to the example shown in FIG. 11A and FIG. 11B, the plurality of unit optical elements 66 are laid out with no spaces therebetween. The height of each unit optical element 66 in the stacking direction D3 is, in an example, 0.09 mm. The shown unit optical elements 66 have element faces 67 that are equivalent to the side faces of the cones. The unit optical elements 66 are capable of radially diffusing light in observation from the stacking direction D3.

Figure 12A:
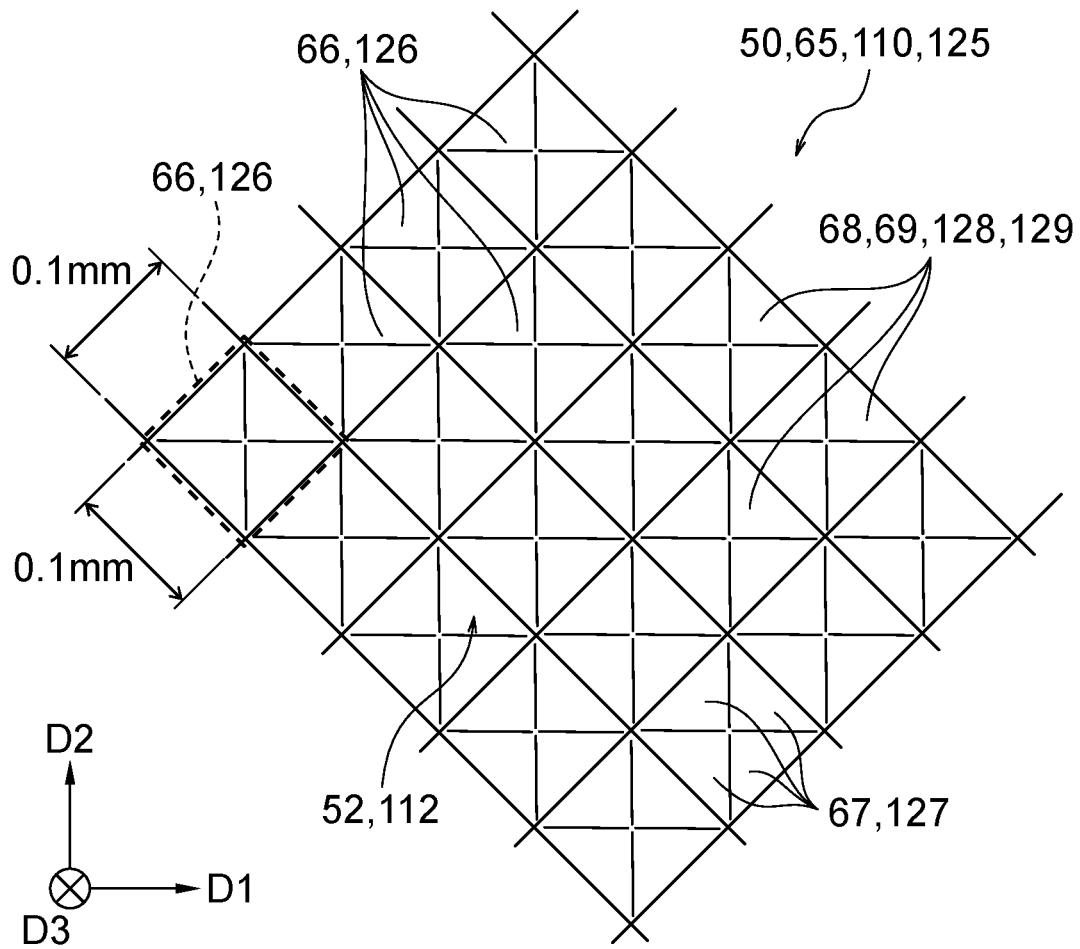
FIG. 12A is a plan view showing another example of a specific configuration of the microlens array that can be included in the planar light source device in FIG. 2.
Figure 12B:
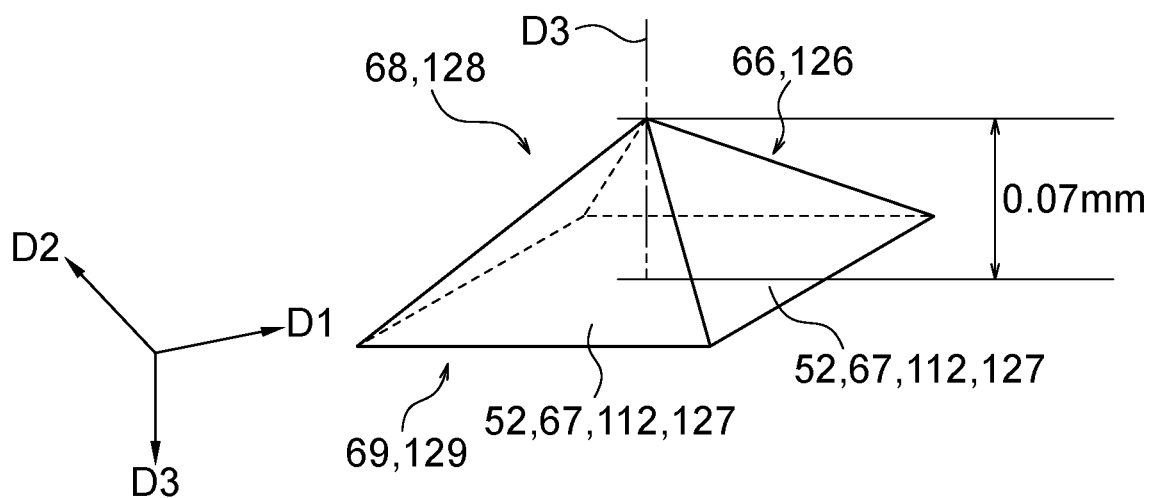
FIG. 12B is a perspective view showing a unit optical element of the microlens array in FIG. 12A.

Next, in an example shown in FIG. 12A and FIG. 12B, the array of the plurality of unit optical elements 66 is a square array. The plurality of unit optical elements 66 are arrayed at constant pitches in two directions that are inclined by ±45° as to the first direction D1. The array pitches in the directions may be the same or may be different. In the shown example, the array pitches of the unit optical elements 66 in two directions are the same as each other, and are 0.1 mm. As shown in FIG. 12A and FIG. 12B, the unit optical elements 66 each have a shape of a square pyramid of which the bottom face is a square. The height of each unit optical element 66 in the stacking direction D3 is, in an example, 0.07 mm.

Figure 13A:
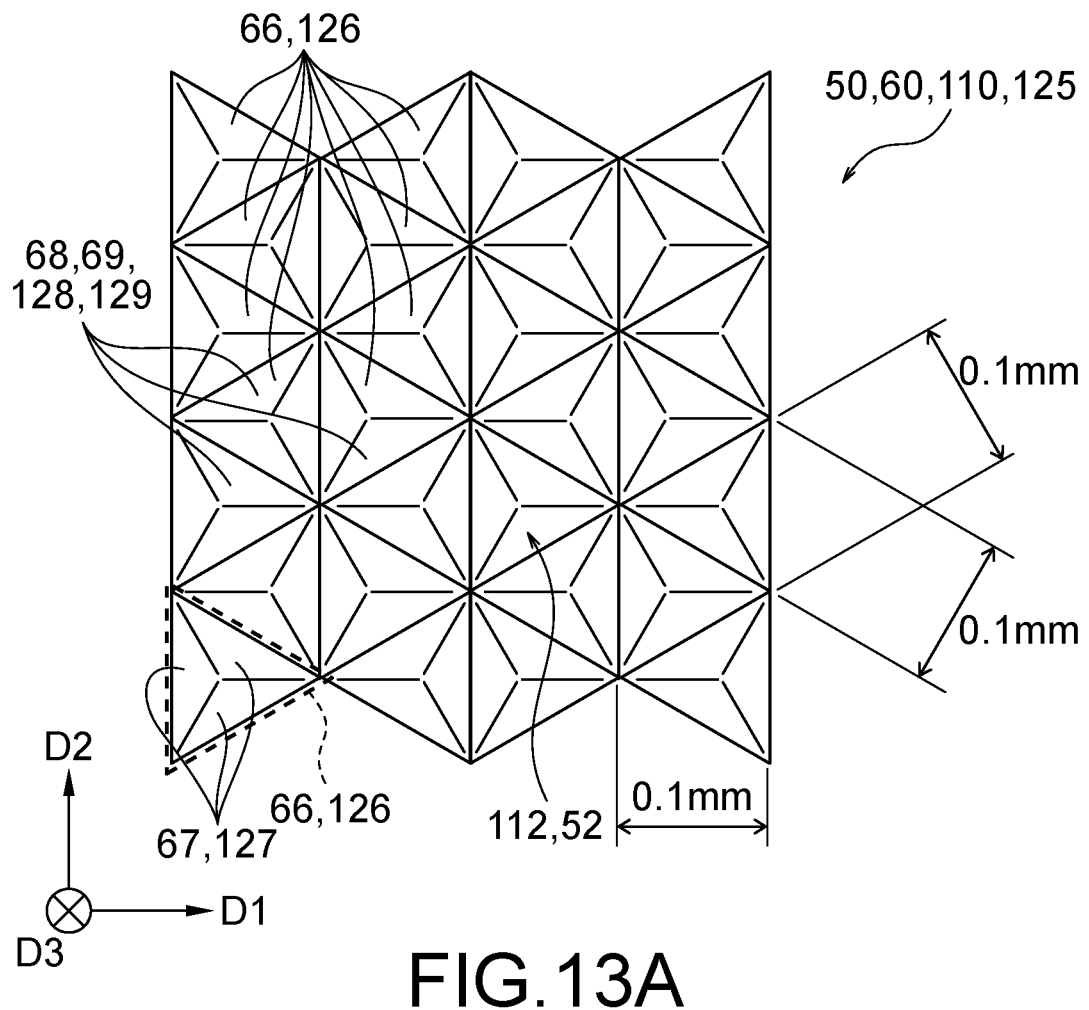
FIG. 13A is a plan view showing an example of a specific configuration of the microlens array that can be included in the planar light source device in FIG. 2.
Figure 13B:
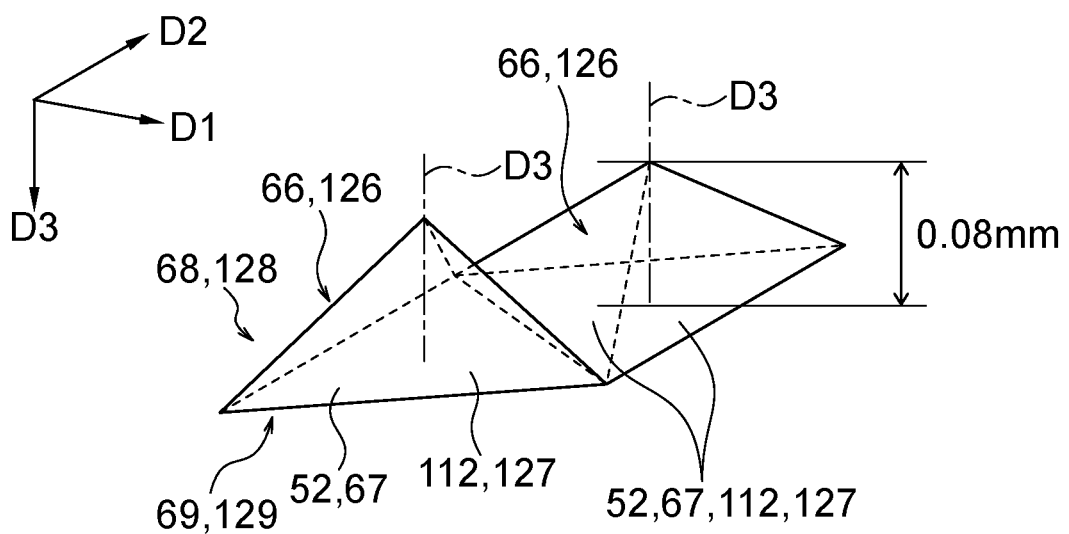
FIG. 13B is a perspective view showing a unit optical element of the microlens array in FIG. 13A.

In an example shown in FIG. 13A and FIG. 13B, the microlens array 65 has two types of unit optical elements 66. Each type of the unit optical elements 66 is arrayed at constant pitches in the second direction D2 and two directions inclined by ±60° as to the second direction. That is to say, the two types of unit optical elements 66 are each arrayed at constant pitches in each of three directions inclined by 60° to each other. The shown array of the unit optical elements 66 is also referred to as a honeycomb array. The array pitches in each of the directions may be the same or may be different. In the shown example, the array pitches of the unit optical elements 66 in the three directions are the same as each other. The shapes of the bottom faces of the two types of unit optical elements 66 are the same. The shapes of the bottom faces are equilateral triangles. The orientations of the bottom faces of the two types of unit optical elements 66 are different. When one unit optical element 66 is rotated by 60°, the orientation of the bottom face of the one unit optical element 66 matches the orientation of the bottom face of the other unit optical element 66. In the example shown in FIG. 13A and FIG. 13B, the unit optical elements 66 each have a shape of a triangular pyramid of which the bottom face is an equilateral triangle. In the shown example, the height of the bottom faces of the unit optical elements 66 is 0.1 mm in an example. Also, the height of the unit optical elements 66 is, in an example, 0.08 mm. The unit optical elements 66 may have shapes of regular triangular pyramids.

Figure 14A:
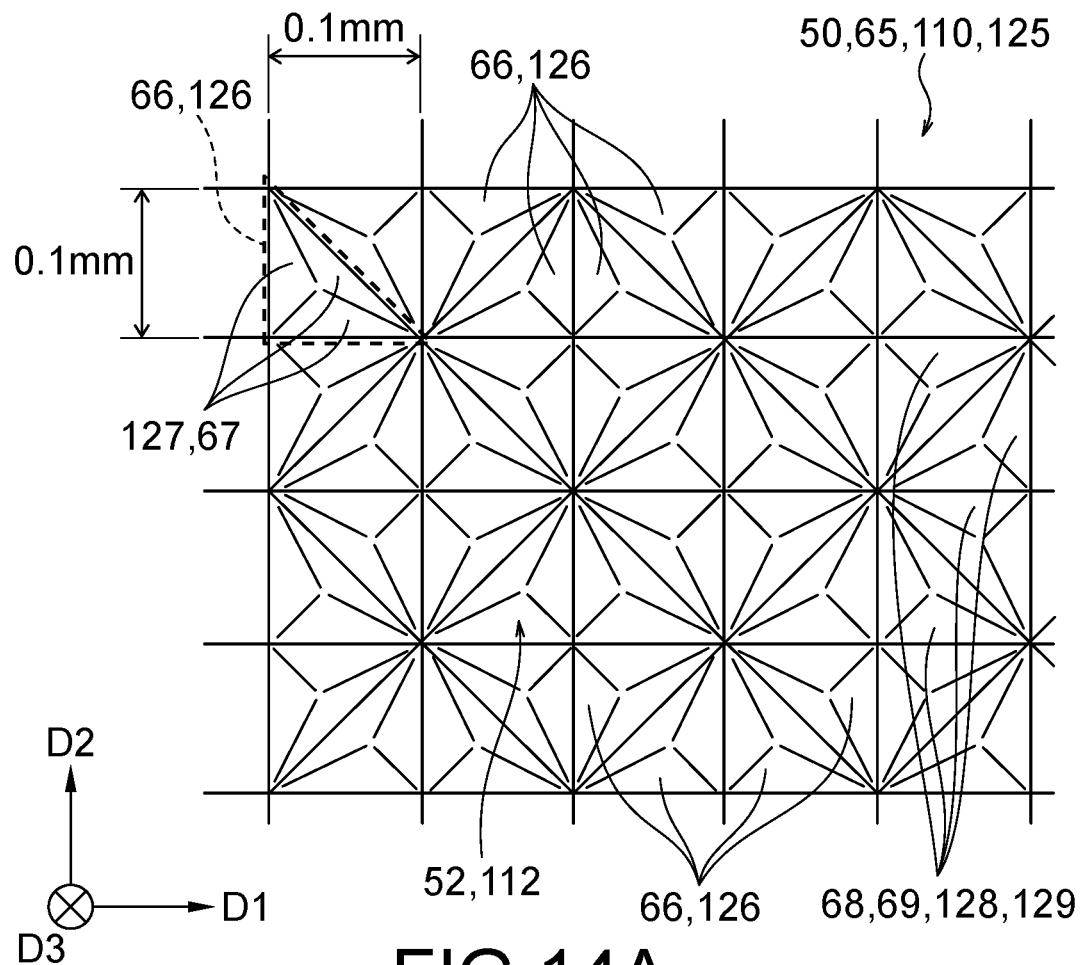
FIG. 14A is a plan view showing an example of a specific configuration of the microlens array that can be included in the planar light source device in FIG. 2.
Figure 14B:
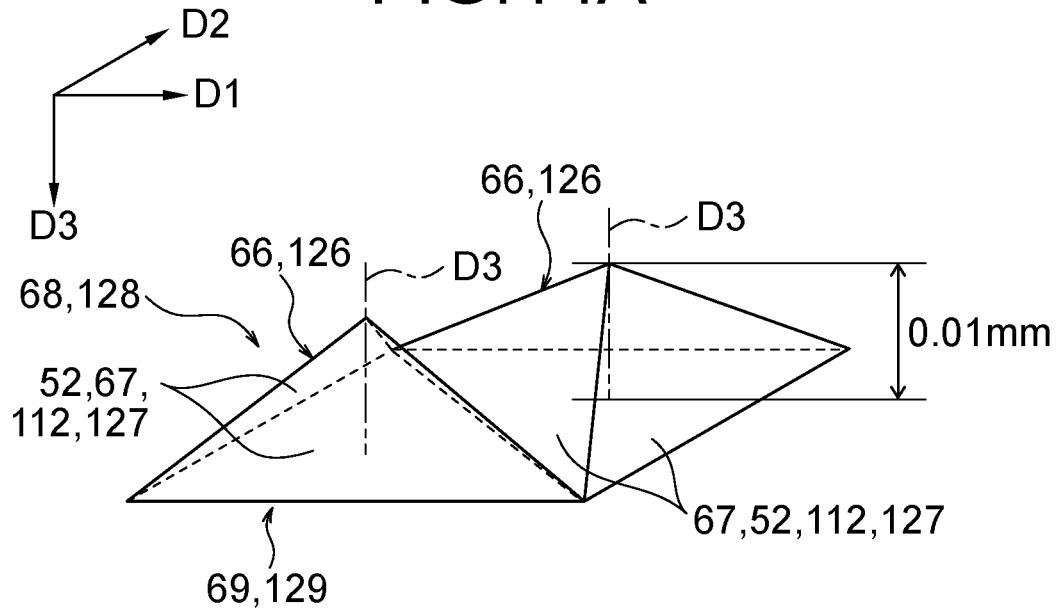
FIG. 14B is a perspective view showing a unit optical element of the microlens array in FIG. 14A.

Next, in an example shown in FIG. 14A and FIG. 14B, unit optical elements 66 of which shapes of the bottom faces are the same are arrayed in four orientations. As a result, the plurality of unit optical elements 66 of which the shapes and orientations of the bottom faces are the same are each arrayed at constant pitches in the first direction D1 and the second direction D2. The array pitches in the two directions may be the same or may be different. In the shown example, the array pitches in each of the two directions are the same. The unit optical elements 66 have a shape of a triangular pyramid of which the bottom face is an isosceles right triangle. In the shown example, the length of the equal length legs of the isosceles right triangle making up the bottom face is 0.1 mm in an example. The height of the unit optical elements 66 is, in an example, 0.01 mm.

In the four specific examples shown in FIG. 11A to FIG. 14B, the perpendiculars from the apices of the conic solids making up the unit optical elements 66 to the bottom faces thereof may each pass through the center of gravity of the bottom faces. In the four specific examples shown in FIG. 11A to FIG. 14B, the unit optical elements 66 protrude to the light source 22 side in the stacking direction D3. That is to say, the unit optical elements 66 are the convex portions 68 protruding out from the main unit portion 58. However, the unit optical elements 66 may be the concave portions 69 formed in the main unit portion 58 as already described above.

Now, when the dimensions of the unit optical elements 66 as observed from the stacking direction D3 are large, unevenness of brightness due to the shapes of the unit optical elements 66 is visually recognizable. From a perspective of preventing this trouble, the greatest length of the unit optical elements 66 in the directions perpendicular to the stacking direction D3 preferably is 1.5 mm or smaller, more preferably is 1 mm or smaller, and even more preferably is 0.5 mm or smaller.

Also, when the dimensions of the unit optical elements 66 as observed from the stacking direction D3 are large, there arises a need to position the unit optical elements 66 as to the light sources 22. Specifically, there arises a need to perform positioning of relative positions of the light sources 22 and the unit optical elements 66 in the directions perpendicular to the stacking direction D3, in the first direction D1 and the second direction D2, for example. Such positioning work is troublesome and is a burden with regard to manufacturing. From the perspective of doing away with the need for this positioning, a single unit optical element 66 preferably has a dimension smaller than three times the dimension of the light sources 22 in each of the two directions perpendicular to each other, when observing from the stacking direction D3. As described above, the length of one sides WL1 and WL2 of the light sources 22 having square shapes in observation from the stacking direction D3 shown in FIG. 3 preferably is 0.5 mm or smaller, and more preferably is 0.2 mm or smaller. From this point, the unit optical elements 66 preferably have dimensions smaller than squares 1.5 mm each way, and more preferably have dimensions smaller than squares 0.6 mm each way in observation from the stacking direction D3. Now, to say that dimensions of one are smaller than dimensions of another means that an outline of one is situated on the outline of the other or on the inner side of the outline of the other in at least one orientation. Even more preferably, the dimension of the unit optical elements 66 in an optional direction is three times or smaller than the dimension of the light sources 22 in this direction in observation from the stacking direction D3. Exiting light from the diffusing member 40 using these unit optical elements 66 has constant light distribution properties, without being dependent on the relative positions of the diffusing member 40 and the light sources 22 in the directions D1 and D2 perpendicular to the stacking direction D3. That is to say, the planar light source device 20 can be assembled without performing positioning of the diffusing member 40 and the light sources 22 in the directions D1 and D2 perpendicular to the stacking direction D3. This means that the diffusing member 40 can be disposed upon the light sources 22 alignment-free.

The array pitch of the unit optical elements 66 having such dimensions may be 0.01 mm or greater and 1.5 mm or smaller. From the perspective of effectively making the in-plane distribution of illuminance uniform on the light-exiting side face 40b of the diffusing member 40 when applying to the planar light source device 20, the array pitch of the unit optical elements 66 preferably is 0.05 mm or greater and 1 mm or smaller, and more preferably is 0.1 mm or greater and 0.5 mm or smaller.

Also, the microlens array 65 diffuses light in the normal direction ND to the element faces 67 as observed from the stacking direction D3, which can be understood from FIG. 7 to FIG. 10 and is verified from results of sample 3 in particular, in later-described simulation. In other words, the microlens array 65 guides light in the normal direction ND of the element faces 67 in observation from the stacking direction D3. On the other hand, the layout intervals of the plurality of light sources 22 are shorter in the array directions of the light sources 22, but are longer in directions non-parallel to the array directions of the light sources 22, which can be understood from FIG. 3. Accordingly, from the perspective of making the in-plane distribution of illuminance uniform, the unit optical elements 66 preferably include element faces 67 having a normal direction ND non-parallel to the array directions of the plurality of light sources 22, in observation from the stacking direction D3. More preferably, the unit optical elements 66 include element faces 67 having a normal direction ND inclined by an angle of 35° or greater and 55° or smaller with respect to the array directions of the plurality of light sources 22, in observation from the stacking direction D3. According to such a layout, light can be effectively diffused in directions non-parallel to the array directions of the plurality of light sources 22, by reflection and refraction at the unit optical elements 66. Thus, in-plane distribution of illuminance can be made uniform more effectively.

For example, in the example shown in FIG. 12A and FIG. 12B, the unit optical elements 66 have four element faces 67. In a case of observing from the stacking direction D3, the normal directions ND of the four element faces 67 are each inclined with respect to the first direction D1 and the second direction D2, which are the array directions of the light sources 22, by 45°. In a case of a square layout of the light sources 22 as shown in FIG. 3, a position CP at the center among four adjacent light sources 22 (see FIG. 3) tends to be the darkest. The four light sources 22 include two light sources 22A that are adjacent in one array direction D1, and two other light sources 22B that each are adjacent to these two light sources 22A on one side thereof in another array direction D2. In the example shown in FIG. 12A and FIG. 12B, light is efficiently guided toward this position CP that tends to be the darkest, and the in-plane distribution of illuminance can be effectively made uniform.

As described above, adjusting the sizes of the dimensions of the unit optical elements 66 and the dimensions of the light sources 22 enables positioning of the light sources 22 and the microlens array 65 in directions perpendicular to the stacking direction D3 to be made unnecessary. On the other hand, as described immediately above, positioning the normal direction ND to the element faces 67 included in the unit optical elements 66 so as to be non-parallel to the array directions of the light sources 22 is effective. From this point, an indicator 42 (see FIG. 1) that indicates the direction in which the diffusing member 40 is to be disposed may be provided on the diffusing member 40. The indicator 42 functions as a so-called alignment mark. The indicator 42 provided on the diffusing member 40 may display the direction of the normal direction ND of the element faces 67. Alternatively, the indicator 42 may display a preferable direction in which the diffusing member 40 is to be disposed with respect to the light sources 22 or the support substrate 25. Alternatively, the indicator 42 may display array directions of the light sources 22 that are preferable with respect to the diffusing member 40, as shown in FIG. 1. Also, an indicator relating to the array directions of the light sources 22 may be provided on the support substrate 25, with the diffusing member 40 positioned at an appropriate orientation as to the array of the light sources 22 on the basis of the indicator on the support substrate 25 and the indicator 42 on the diffusing member 40.

Also, the light diffusing portion 50 may include the microlens array 65 having a plurality of the unit optical elements 66 that are arrayed in directions non-parallel to the array directions of the plurality of light sources 22. That is to say, the array directions of the plurality of unit optical elements 66 may be non-parallel to the array directions of the plurality of light sources 22. According to such a layout, moiré due to overlaying the array of unit optical elements 66 and the array of light sources 22 can be effectively made to be inconspicuous.

The diffractive optical element 60 and the microlens array 65 that can be used in the light diffusing portion 50 have been described above. However, the diffractive optical element 60 and the microlens array 65 are only exemplary, and other elements or the like that have both light transmissivity and light diffusivity may be used as the light diffusing portion 50. In particular, elements having specific properties regarding light transmissivity and light diffusivity may be suitably used as the light diffusing portion 50. As an example of another light diffusing portion 50, an optical sheet or the like that has a base material that has light transmissivity, and particles that have light diffusivity and that are dispersed in the base material, may be used as the light diffusing portion 50.

Next, the light reflecting portion 70 will be described. The light reflecting portion 70 is situated on the side of the light diffusing portion 50 opposite to the light sources 22 in the stacking direction D3. The light reflecting portion 70 has light reflectivity of reflecting visible light. The reflectance and transmittance of the light reflecting portion 70 change depending on the angle of incidence.

The transmittance of the light reflecting portion 70 with respect to light of a particular wavelength entering at a angle of incidence of 0° is smaller than transmittance of the light reflecting portion 70 with respect to light of a particular wavelength entering at an certain angle of incidence greater than 0°. That is to say, the transmittance of the light reflecting portion 70 with respect to light of a particular wavelength that is perpendicularly incident is smaller than the transmittance of the light reflecting portion 70 with respect to light of a particular wavelength entering from at least a certain oblique direction. The reflectance of the light reflecting portion 70 with respect to light of a particular wavelength entering at an angle of incidence of 0° is greater than the reflectance of the light reflecting portion 70 with respect to light of a particular wavelength entering at a certain angle of incidence greater than 0°. That is to say, the reflectance of the light reflecting portion 70 with respect to light of a particular wavelength that is perpendicularly incident is greater than the reflectance of the light reflecting portion 70 with respect to light of a particular wavelength entering from at least a certain oblique direction. The light reflecting portion 70 can also be written as selective light reflecting portion, light transmitting portion, or selective light transmitting portion.

As an example, the light reflecting portion 70 reflects light of a particular wavelength entering at an angle of incidence of 0° with a reflectance of 80% or higher. The light reflecting portion 70 transmits light of a particular wavelength entering at an angle of incidence of 0° with a transmittance of lower than 20%. Also, the light reflecting portion 70 reflects at least part of light of a particular wavelength entering at an angle of incidence of which the absolute value is greater than 45° with a reflectance of lower than 50%. The light reflecting portion 70 transmits at least part of light of a particular wavelength entering at an angle of incidence of which the absolute value is greater than 45° with a transmittance of 50% or higher. The light reflecting portion 70 has incident angle dependency with respect to reflectance. Also, the light reflecting portion 70 has incident angle dependency with respect to transmittance.

Figure 15:
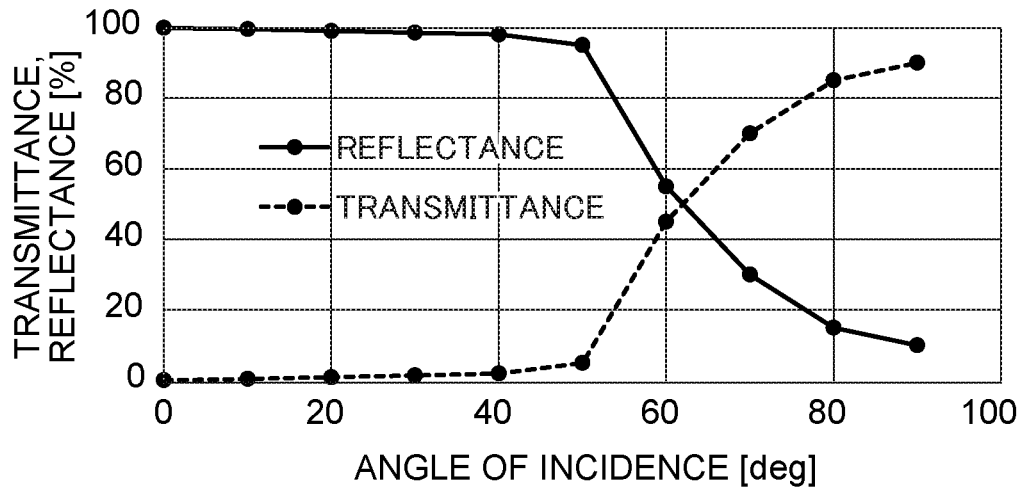
FIG. 15 is a graph showing an example of optical properties of a light reflecting portion of the diffusing member that can be included in the planar light source device in FIG. 2, and is a graph for describing reflection angle dependency regarding reflectance and transmittance.

FIG. 15 is a graph showing an example of reflection properties and transmission properties that the light reflecting portion 70 has, in accordance with the angle of incidence. In the properties of the light reflecting portion 70 shown in FIG. 15, the reflectance of the light reflecting portion 70 with respect to light of a particular wavelength becomes greater as the absolute value of angle of incidence to the light reflecting portion 70 becomes smaller. The reflectance of the light reflecting portion 70 with respect to light of the particular wavelength entering at an angle of incidence of which the absolute value is 70° or greater and smaller than 90° may be lower than 70%, or may be lower than 60%, or may be lower than 50%. The reflectance of the light reflecting portion 70 with respect to light of a particular wavelength entering at an angle of incidence of which the absolute value is 60° or smaller may be 50% or higher and lower than 100%, or may be 80% or higher and lower than 100%, or may be 90% or higher and lower than 100%. The reflectance of the light reflecting portion 70 with respect to light of a particular wavelength entering at an angle of incidence of 0° may be 80% or more and lower than 100%, or may be 90% or more and lower than 100%, or may be 95% or more and lower than 100%.

In the properties of the light reflecting portion 70 shown in FIG. 15, the transmittance of the light reflecting portion 70 with respect to light of the particular wavelength becomes smaller as the absolute value of the angle of incidence to the light reflecting portion 70 becomes smaller. The transmittance of the light reflecting portion 70 with respect to light of the particular wavelength entering at an angle of incidence of which the absolute value is 70° or greater and smaller than 90° may be 30% or higher, or may be 40% or higher, or may be 50% or higher. The transmittance of the light reflecting portion 70 with respect to light of the particular wavelength entering at an angle of incidence of which the absolute value is 60° or smaller may be 0% or higher and lower than 50%, or may be 0% or higher and lower than 20%, or may be 0% or higher and lower than 10%. The transmittance of the light reflecting portion 70 with respect to light of the particular wavelength entering at an angle of incidence of 0° may be 0% or higher and lower than 20%, or may be 0% or higher and lower than 10%, or may be 0% or higher and lower than 5%.

The light of the particular wavelength can be set as appropriate in accordance with the usage of the planar light source device 20 and the diffusing member 40. Typically, light output from the light sources 22 or light used for light emission by the planar light source device 20 may be the light of the particular wavelength. The light of the particular wavelength may be visible light. "Visible light" means light of a wavelength of 380 nm or higher and a wavelength of 780 nm or lower. The reflectance of the light reflecting portion is a value measured using the goniophotometer GP-200 manufactured by Murakami Color Research Laboratory. The transmittance of the light reflecting portion is the total light transmittance measured conforming to JIS K7361-1:1997. The transmittance of the light reflecting portion is a value measured using the goniophotometer GP-200 manufactured by Murakami Color Research Laboratory.

Figure 16:
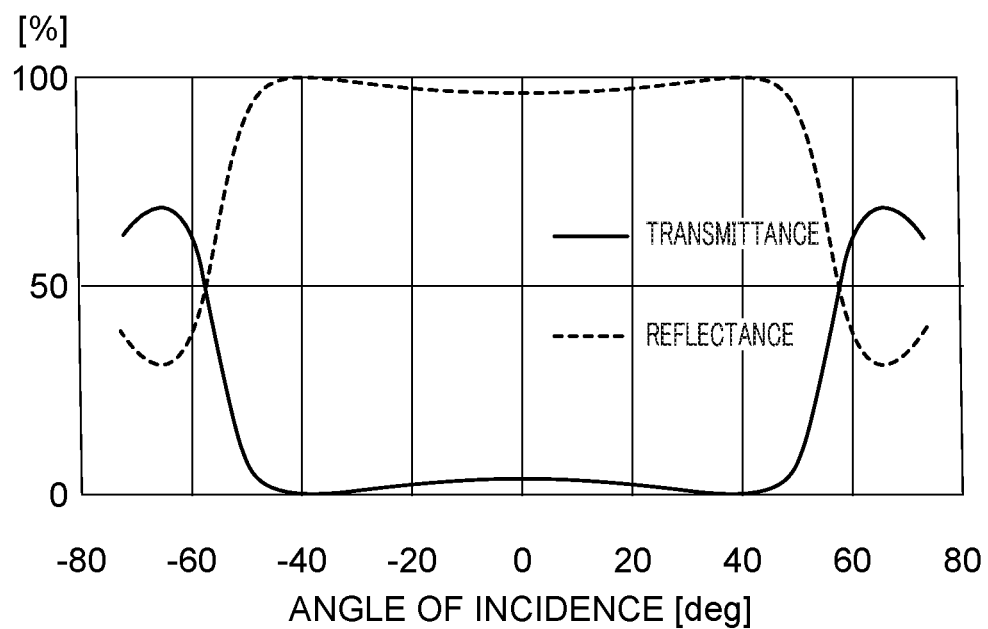
FIG. 16 is a graph showing another example of optical properties of the light reflecting portion of the diffusing member that can be included in the planar light source device in FIG. 2.

FIG. 16 is a graph showing another example of optical properties of the light reflecting portion. The light reflecting portion having the optical properties shown in FIG. 16 is different from the light reflecting portion having the optical properties shown in FIG. 15. FIG. 16 is a graph showing reflection properties and transmission properties of the light reflecting portion with respect to light having a wavelength of 450 nm, which is blue light.

As shown in FIG. 16, the reflectance of the light reflecting portion 70 with respect to light of the particular wavelength entering at an angle of incidence of which the absolute value is 0° or greater and 30° or smaller may be 80% or higher, or may be 90% or higher, or may be 95% or higher. The reflectance of the light reflecting portion 70 with respect to light of the particular wavelength entering at an angle of incidence of which the absolute value is 0° or greater and 45° or smaller may be 80% or higher, or may be 85% or higher, or may be 90% or higher. According to such reflection properties, illuminance can be effectively prevented from becoming excessively high in regions directly above the light sources 22, in combination with the light diffusing portion 50, and in-plane distribution of illuminance can be effectively made uniform.

As shown in FIG. 16, the transmittance of the light reflecting portion 70 with respect to light of the particular wavelength entering at an angle of incidence of which the absolute value is 0° or greater and 30° or smaller may be lower than 20%, or may be lower than 10%, or may be lower than 5%. The transmittance of the light reflecting portion 70 with respect to light of the particular wavelength entering at an angle of incidence of which the absolute value is 0° or greater and 45° or smaller may be lower than 20%, or may be lower than 15%, or may be lower than 10%. According to such transmission properties, illuminance can be effectively prevented from becoming excessively high in regions directly above the light sources 22, in combination with the light diffusing portion 50, and in-plane distribution of illuminance can be effectively made uniform.

As shown in FIG. 16, the reflectance of the light reflecting portion 70 with respect to light of the particular wavelength entering at a certain angle of incidence of which the absolute value is 45° or greater and 75° or smaller, may be 50%. The reflectance of the light reflecting portion 70 with respect to light of the particular wavelength entering at a certain angle of incidence of which the absolute value is 50° or greater and 60° or smaller, may be 50%. The reflectance of the light reflecting portion with respect to light of the particular wavelength may become smaller in accordance with increase within a range in which the absolute value of the angle of incidence is 50° or greater and 60° or smaller. In regions distanced from the light sources 22 in directions perpendicular to the stacking direction D3, there is a relatively greater quantity of light traveling in directions inclined with respect to the stacking direction D3. Thus, according to such reflection properties, illuminance can be raised at regions distanced from the light sources 22, in combination with the diffusing properties of the light diffusing portion 50, and in-plane distribution of illuminance can be effectively made uniform.

As shown in FIG. 16, the transmittance of the light reflecting portion 70 with respect to light of the particular wavelength entering at a certain angle of incidence of which the absolute value is 45° or greater and 75° or smaller, may be 50%. The transmittance of the light reflecting portion 70 with respect to light of the particular wavelength entering at a certain angle of incidence of which the absolute value is 50° or greater and 60° or smaller, may be 50%. The transmittance of the light reflecting portion with respect to light of the particular wavelength may become greater in accordance with increase within a range in which the absolute value of the angle of incidence is 50° or greater and 60° or smaller. In regions distanced from the light sources 22 in directions perpendicular to the stacking direction D3, there is a relatively greater quantity of light traveling in directions inclined with respect to the stacking direction D3. Thus, according to such transmission properties, illuminance can be raised at regions distanced from the light sources 22, in combination with the diffusing properties of the light diffusing portion 50, and in-plane distribution of illuminance can be effectively made uniform.

Figure 17:
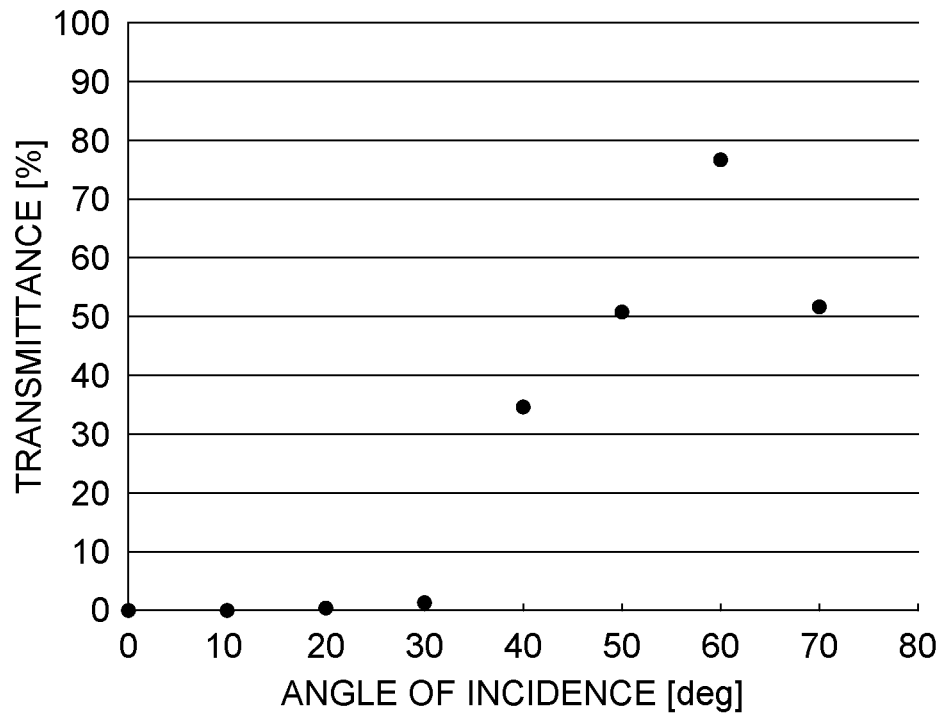
FIG. 17 is a graph showing yet another example of optical properties of the light reflecting portion that can be included in the planar light source device in FIG. 2.
Figure 18:
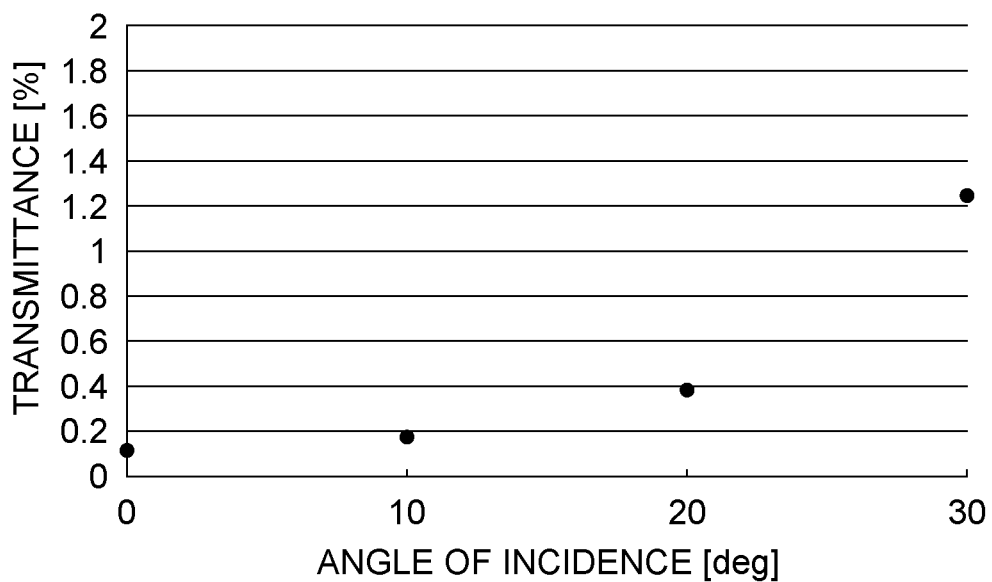
FIG. 18 is a graph in which part of the graph in FIG. 17 is enlarged.

FIG. 17 and FIG. 18 are graphs showing yet another example of optical properties of the light reflecting portion. The light reflecting portion having the optical properties shown in FIG. 17 and FIG. 18 differs from the light reflecting portion having the optical properties shown in FIG. 15, and differs from the light reflecting portion having the optical properties shown in FIG. 16 as well. FIG. 17 and FIG. 18 are graphs showing transmission properties of the light reflecting portion with respect to light having a wavelength of 450 nm, which is blue light.

As shown in FIG. 17 and FIG. 18, the transmittance of the light reflecting portion 70 with respect to light of the particular wavelength entering at an angle of incidence of which the absolute value is 0° or greater and 30° or smaller may be lower than 15%, or may be lower than 8%, or may be lower than 3%. The transmittance of the light reflecting portion 70 with respect to light of the particular wavelength entering at an angle of incidence of which the absolute value is 0° or greater and 45° or smaller may be lower than 50%, or may be lower than 40%, or may be lower than 30%. According to such transmission properties, illuminance can be effectively prevented from becoming excessively high in regions directly above the light sources 22, in combination with the diffusing properties of the light diffusing portion 50, and in-plane distribution of illuminance can be effectively made uniform.

The reflectance of the light reflecting portion 70 with respect to light of the particular wavelength entering at an angle of incidence of which the absolute value is 0° or greater and 30° or smaller may be 85% or higher, or may be 92% or higher, or may be 97% or higher. The reflectance of the light reflecting portion 70 with respect to light of the particular wavelength entering at an angle of incidence of which the absolute value is 0° or greater and 45° or smaller may be 50% or higher, or may be 60% or higher, or may be 70% or higher. According to such reflection properties, illuminance can be effectively prevented from becoming excessively high in regions directly above the light sources 22, in combination with the diffusing properties of the light diffusing portion 50, and in-plane distribution of illuminance can be effectively made uniform.

As shown in FIG. 17 and FIG. 18, the transmittance of the light reflecting portion 70 with respect to light of the particular wavelength entering at a certain angle of incidence of which the absolute value is 40° or greater and 60° or smaller, may be 50%. The transmittance of the light reflecting portion 70 with respect to light of the particular wavelength entering at a certain angle of incidence of which the absolute value is 45° or greater and 55° or smaller, may be 50%. The transmittance of the light reflecting portion with respect to light of the particular wavelength may become greater in accordance with increase within a range in which the absolute value of the angle of incidence is 30° or greater and 60° or smaller. The transmittance of the light reflecting portion with respect to light of the particular wavelength may become greater in accordance with increase within a range in which the absolute value of the angle of incidence is 50° or smaller. In regions distanced from the light sources 22 in directions perpendicular to the stacking direction D3, there is a relatively greater quantity of light traveling in directions inclined with respect to the stacking direction D3. Thus, according to the reflection properties of the light reflecting portion 70 having such reflection properties, illuminance can be raised at regions distanced from the light sources 22, in combination with the diffusing properties of the light diffusing portion 50, and in-plane distribution of illuminance can be effectively made uniform.

The reflectance of the light reflecting portion 70 with respect to light of the particular wavelength entering at a certain angle of incidence of which the absolute value is 40° or greater and 60° or smaller, may be 50%. The reflectance of the light reflecting portion 70 with respect to light of the particular wavelength entering at a certain angle of incidence of which the absolute value is 45° or greater and 55° or smaller, may be 50%. The reflectance of the light reflecting portion with respect to light of the particular wavelength may become smaller in accordance with increase within a range in which the absolute value of the angle of incidence is 30° or greater and 60° or smaller. The reflectance of the light reflecting portion with respect to light of the particular wavelength may become smaller in accordance with increase within a range in which the absolute value of the angle of incidence is 50° or smaller. In regions distanced from the light sources 22 in directions perpendicular to the stacking direction D3, there is a relatively greater quantity of light traveling in directions inclined with respect to the stacking direction D3. Thus, according to the reflection properties of the light reflecting portion 70 having such reflection properties, illuminance can be raised at regions distanced from the light sources 22, in combination with the diffusing properties of the light diffusing portion 50, and in-plane distribution of illuminance can be effectively made uniform.

The light reflecting portion 70 is overlaid on the light diffusing portion 50 in the stacking direction D3. In a case in which the light reflecting portion 70 and the light diffusing portion 50 are not joined by bonding or adhesion or the like, e.g., in a case in which the light reflecting portion 70 and the light diffusing portion 50 are simply stacked in place, the light reflecting portion 70 may have a matte face facing the light diffusing portion 50. That is to say, the light-entering side face of the light reflecting portion 70 may be a matte face. Imparting a matte face to the light reflecting portion 70 can suppress the light reflecting portion 70 and the light diffusing portion 50 may become stuck to each other. Also, the light scattering nature of the matte face can effectively smooth change in angular distribution of radiant intensity.

The light reflecting portion 70 is not limited in particular, as long as the light reflecting portion 70 has incident angle dependency in reflectance and incident angle dependency in transmittance. A reflecting-type volume hologram, a cholesteric liquid crystal structure layer, a retroreflective film, or a reflecting-type diffractive optical element, may be used as the light reflecting portion 70. In particular, a dielectric multilayer film that has a relatively high degree of freedom in design of reflection properties and transmission properties is suitable as the light reflecting portion 70. Also, a reflecting structure that is structurally imparted with incident angle dependency in reflectance and incident angle dependency in transmittance is suitable as the light reflecting portion 70, due to low wavelength dependency.

A multilayer film of inorganic compounds, in which inorganic layers of different refractive indices are alternately stacked, may be used as the dielectric multilayer film making up the light reflecting portion 70. A multilayer film of resins, in which resin layers of different refractive indices are alternately stacked, may be used as the dielectric multilayer film making up the light reflecting portion 70.

Out of the resin layers having different refractive indices, the difference in in-plane average refractive indices between a high-refractive-index resin layer of which the refractive index is high and a low-refractive-index resin layer of which the refractive index is low preferably may be 0.03 or more, more preferably may be 0.05 or more, and even more preferably may be 0.1 or more. When the above difference in in-plane average refractive indices is great, the desired reflectance and transmittance can be readily realized.

The difference between the in-plane average refractive index and thickness-direction refractive index of the high-refractive-index resin layer preferably may be 0.03 or more. The difference between the in-plane average refractive index and the thickness-direction refractive index of the low-refractive-index resin layer preferably may be 0.03 or less. According to this example, decrease of reflectance at a reflection peak does not readily occur even when the angle of incidence is great.

The number of stacked layers of the high-refractive-index resin layer and the low-refractive-index resin layer is adjusted in accordance with the reflection properties and the transmission properties required of the light reflecting portion 70. For example, 30 layers or more of each of the high-refractive-index resin layer and the low-refractive-index resin layer may be alternately stacked, and 200 layers or more of each of them may be alternately stacked. The total number of the high-refractive-index resin layer and the low-refractive-index resin layer stacked may be 600 layers or more, for example. There are cases in which sufficient reflectance cannot be obtained when the number of stacked layers is excessively small. Also, desired reflectance and transmittance can be easily obtained by the number of stacked layers being in the above range.

The multilayer film of resin making up the dielectric multilayer film may have a surface layer that is 3 μm or more in thickness and that contains polyethylene terephthalate or polyethylene naphthalate, on one side or both sides thereof. The thickness of the surface layer may be 5 μm or more. This surface layer can protect the surface of the above multilayer film of resin.

Co-extrusion or the like may be employed as the manufacturing method of the multilayer film of resin making up the dielectric multilayer film. Specifically, a manufacturing method of a laminate film described in Japanese Unexamined Patent Application Publication No. 2008-200861 may be employed.

A commercially-available laminate film may be used as the multilayer film of resin making up the dielectric multilayer film. Examples include PICASUS (a registered trademark) manufactured by TORAY INDUSTRIES, INC., ESR manufactured by the 3M Company, and so forth.

Next, operations at the time of generating planar light by the planar light source device 20 using the diffusing member 40 having the above configuration will be described with reference primarily to FIG. 19 to FIG. 22. Note that in FIG. 19 to FIG. 22, the light quantity of light traveling in the direction of the arrows is indicated by the width of these arrows.

Figure 19:
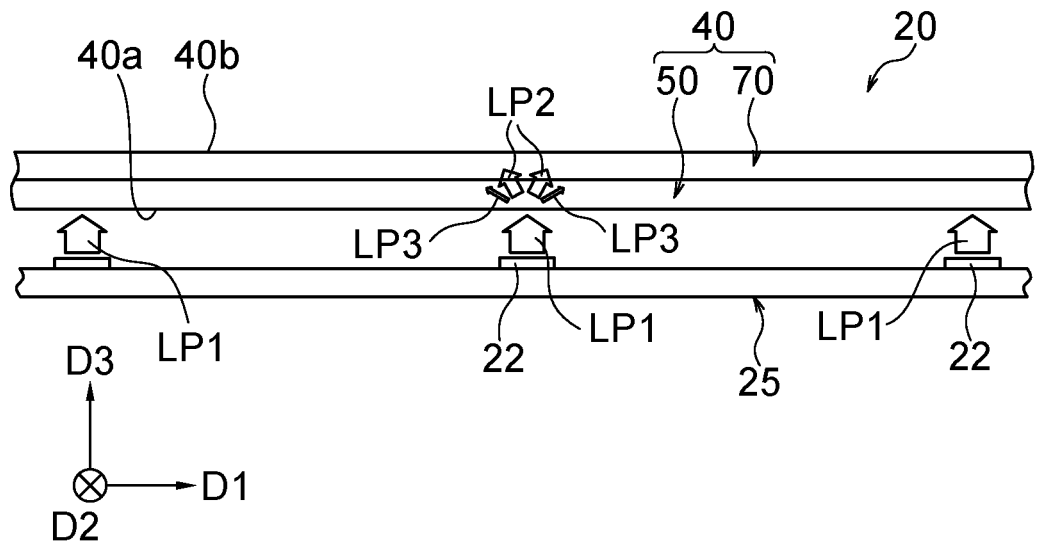
FIG. 19 is a longitudinal-sectional view showing the planar light source device, and is a diagram for describing operations of the diffusing member and the planar light source device.

As shown in FIG. 19, light LP1 is first output from the light sources 22. In the examples shown in FIG. 19 to FIG. 22, the light sources 22 output the light LP1 that has the 450 nm wavelength and that is blue light, and the light reflecting portion 70 has the above-described reflection properties with respect to the light output from the light sources 22. In a case of using general light sources 22, a great quantity of light LP1 is output in the stacking direction D3. This light LP1 enters the light diffusing portion 50 of the diffusing member 40. The light diffusing portion 50 has light transmissivity and light diffusivity. The light LP1 is transmitted through the light diffusing portion 50 and is diffused.

Note that in a case of the light diffusing portion 50 having the diffusing properties shown in FIG. 5 and FIG. 6, a great part of the light LP1 traveling in the stacking direction D3 is made to travel in directions inclined with respect to the stacking direction D3.

Figure 20:
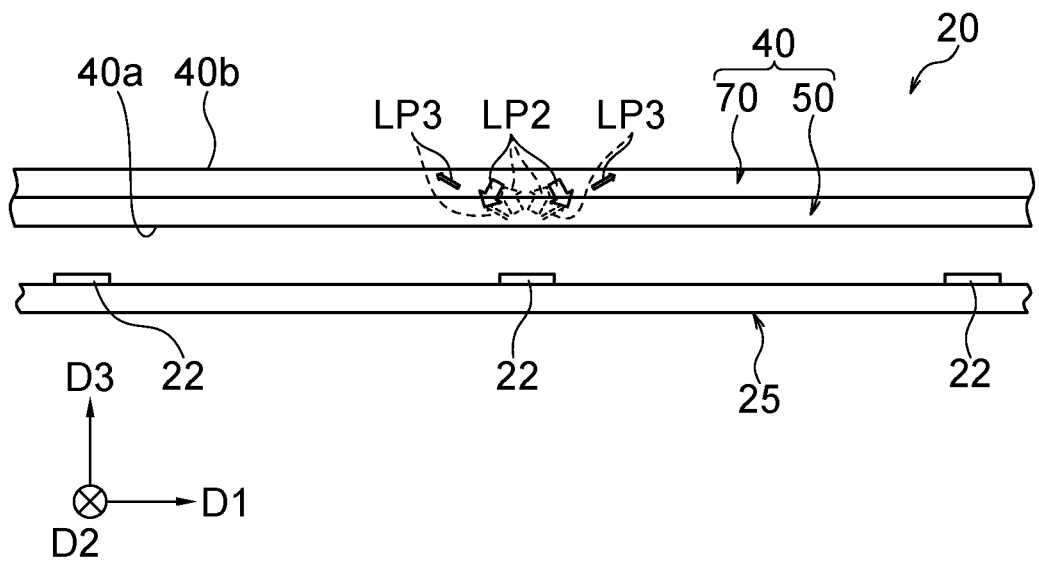
FIG. 20 is a longitudinal-sectional view of the planar light source device corresponding to FIG. 2, and is a diagram for describing operations of the diffusing member and the planar light source device.

Next, as shown in FIG. 20, light LP2 and LP3 diffused at the light diffusing portion 50 heads toward the light reflecting portion 70 of the light diffusing portion 50. For example, the light reflecting portion 70 can reflect incident light of an angle of incidence of 0° with a reflectance of 80% or higher. On the other hand, the light reflecting portion 70 can reflect at least part of incident light of an angle of incidence of which the absolute value is greater than 45° with a reflectance of 50%. That is to say, the light reflecting portion 70 transmits only the light LP3 that is greatly inclined with respect to the stacking direction D3, and reflects the other light LP2. In regions including a position confronting the light sources 22 and the surroundings thereof, i.e., in regions directly above the light sources 22, there is a tendency for a great quantity of light traveling in a direction not greatly inclined with respect to the stacking direction D3. Due to the reflection properties of this light reflecting portion 70, a situation in which a great quantity of light with a small angle of incidence is transmitted through the light reflecting portion 70 can be suppressed.

In particular, in a case of the light reflecting portion 70 reflecting the light LP2 entering the light reflecting portion 70 at a peak angle at which the radiant intensity peak of the light diffused at the light diffusing portion 50 appears with a reflectance of 80% or higher, a situation in which directly above the light sources 22 becomes bright, i.e., in which images of the light sources 22 are sensed, can be suppressed. For example, in a case of using the light diffusing portion 50 having the diffusing properties shown in FIG. 6, a great quantity of light travels in directions of angles of exit of 20° to 50°. The light reflecting portion 70 having the reflection properties shown in FIG. 15 and FIG. 16 reflects the light exiting from the light diffusing portion 50 in the directions of angles of exit of 20° to 50° with a reflectance of 90% or higher. That is to say, a great part of the light LP1 that is output from the light sources 22 and travels through the diffusing member 40 is reflected at the light reflecting portion 70 at least once. Accordingly, a situation in which the regions directly above the light sources 22 become bright can be suppressed extremely effectively.

Figure 21:
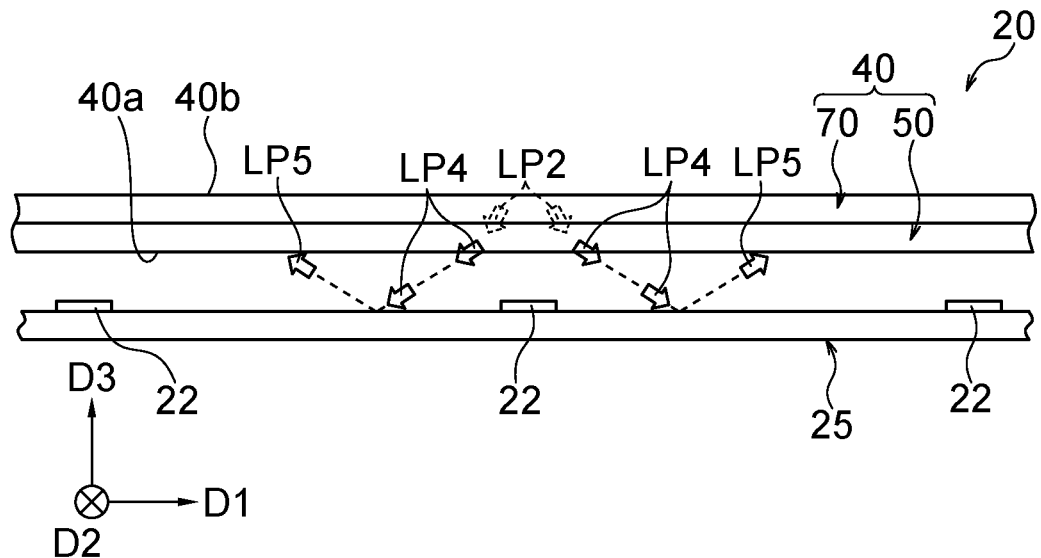
FIG. 21 is a longitudinal-sectional view of the planar light source device corresponding to FIG. 2, and is a diagram for describing operations of the diffusing member and the planar light source device.

Next, as shown in FIG. 21, the light LP2 reflected at the light reflecting portion 70 travels in a direction greatly inclined with respect to the stacking direction D3, as a result of diffuse transmission through the light diffusing portion 50 again. That is to say, as a result of diffuse transmission through the light diffusing portion 50 twice, the light LP2 reflected at the light reflecting portion 70 travels in a direction greatly inclined with respect to the stacking direction D3. As a result, light LP4 subjected to diffuse transmission through the light diffusing portion 50 twice travels in a perpendicular direction to the stacking direction D3. In the shown example, the light LP4 travels in the first direction D1 away from the light source 22. Thereafter, as shown in FIG. 21, the light LP4 subjected to diffuse transmission through the light diffusing portion 50 twice is reflected at the support substrate 25 that supports the light source 22. Next, light LP5 travels so as to be further distanced from the light source 22 in directions perpendicular to the stacking direction D3, and heads toward the diffusing member 40 in the stacking direction D3 again.

Figure 22:
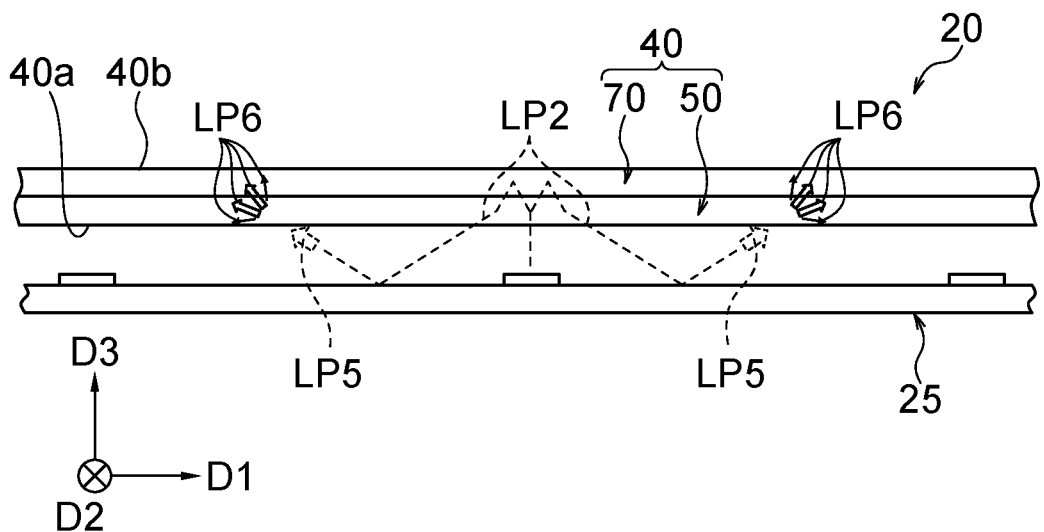
FIG. 22 is a longitudinal-sectional view of the planar light source device corresponding to FIG. 2, and is a diagram for describing operations of the diffusing member and the planar light source device.

As shown in FIG. 22, the light LP5 heading toward the diffusing member 40 again is subjected to diffuse transmission through the light diffusing portion 50 and is diffused. A great part of light LP6 diffused at the light diffusing portion 50 heads toward the light reflecting portion 70 thereafter. Out of such light LP6, light of which the angle of incidence with respect to the light reflecting portion 70 is great is transmitted through the light reflecting portion 70. On the other hand, light of which the angle of incidence with respect to the light reflecting portion 70 is small is reflected at the light reflecting portion 70 again.

As described above, light output from the light sources 22 can be effectively spread in directions orthogonal to the stacking direction D3 by the combination of the light diffusive transmissivity at the light diffusing portion 50 and the light reflectivity at the light reflecting portion 70, without being greatly limited by the light distribution properties of the light sources 22. Accordingly, unevenness in brightness due to the presence of the light sources 22 can be effectively resolved, i.e., images of the light sources 22 can be effectively made inconspicuous. Such light diffusivity at the diffusing member 40 enables the planar light source device 20 to be made markedly thinner. As a result, the illuminance at each position of the face on the light-exiting side of the light reflecting portion 70 can be effectively made uniform, i.e., in-plane distribution of illuminance can be effectively made uniform, while making the planar light source device 20 thinner.

Now, results of simulations carried out by the present inventors will be described. The objects of simulation were planar light source devices according to samples 1 to 7. Ray tracing simulation using LightTools from Synopsys was carried out as the simulation.

The planar light source device 20 shown in FIG. 19 to FIG. 22 was used for samples 1 to 5. The planar light source devices 20 according to sample 1 to 5 had the light source 22, the support substrate 25 supporting the light source 22, and the diffusing member 40 disposed while facing the light source 22 and the support substrate 25 in the stacking direction D3. One light-emitting diode was disposed on the support substrate 25 as the light source 22. Reflection at the surface of the support substrate 25 was diffused reflection with a reflectance of 95%.

In the planar light source devices 20 according to samples 1 to 5, the diffusing member 40 had the light diffusing portion 50 and the light reflecting portion 70 in that order from the light source side. The light reflecting portion 70 was the dielectric multilayer film having the reflection properties and the transmission properties shown in FIG. 15, in common among the planar light source devices 20 according to samples 1 to 5. In the planar light source device 20 according to sample 1, the light diffusing portion 50 was the diffractive optical element 60 having the diffusing properties shown in FIG. 6. In the planar light source device 20 according to sample 2, the light diffusing portion 50 was the microlens array 65 having the configuration of the shape, dimensions, array, and so forth, described with reference to FIG. 11A and FIG. 11B. In the planar light source device 20 according to sample 3, the light diffusing portion 50 was the microlens array 65 having the configuration of the shape, dimensions, array, and so forth, described with reference to FIG. 12A and FIG. 12B. In the planar light source device 20 according to sample 4, the light diffusing portion 50 was the microlens array 65 having the configuration of the shape, dimensions, array, and so forth, described with reference to FIG. 13A and FIG. 13B. In the planar light source device 20 according to sample 5, the light diffusing portion 50 was the microlens array 65 having the configuration of the shape, dimensions, array, and so forth, described with reference to FIG. 14A and FIG. 14B.

In the planar light source devices 20 according to samples 1 to 5, the thickness of the diffusing member 40 in the stacking direction D3 was 200 μm. Also, in the planar light source devices 20 according to samples 1 to 5, the distance DX (see FIG. 2) between the face of the light source 22 facing the diffusing member 40 to the light-entering side face of the diffusing member 40 facing the light source 22, in the stacking direction D3, was 0.5 mm.

Sample 6 was the same as samples 1 to 5, except for the point that the diffusing member 40 according to samples 1 to 5 was replaced with a light diffusion sheet "OPALUS B910" manufactured by Keiwa Inc. In the planar light source device according to sample 6, the distance between the face of the light source facing the diffusing member to the light-entering side face of the light diffusing sheet facing the light source, in the stacking direction, was 0.5 mm. The thickness of the light diffusing sheet was 100 μm.

Sample 7 was the same as samples 1 to 5 except for the point that the diffusing member 40 in samples 1 to 5 was omitted. That is to say, the planar light source device according to sample 7 had only the support substrate 25 and the light source 22 supported on the support substrate 25.

With regard to samples 1 to 5, a light-receiving face was set as a virtual face extending in the first direction D1 and the second direction D2 at a position distanced from the face of the support substrate 25 facing the diffusing member 40 by 1 mm, in a state of the light source 22 emitting light, and illuminance at each position on this light-receiving face was simulated. Calculation of illuminance was performed for a region on the light-receiving face having lengths of 6 mm in the first direction D1 and 6 mm in the second direction D2, with the light source 22 at the center. That is to say, the light source 22 was positioned at the center of the light-receiving face having an area of 6 mm by 6 mm (6 mm×6 mm), in projection in the stacking direction D3. The in-plane distributions of illuminance on the light-receiving faces that were calculated for the planar light source devices 20 according to samples 1 to 5 are shown in FIG. 23A to FIG. 23E, respectively.

Figure 23A:
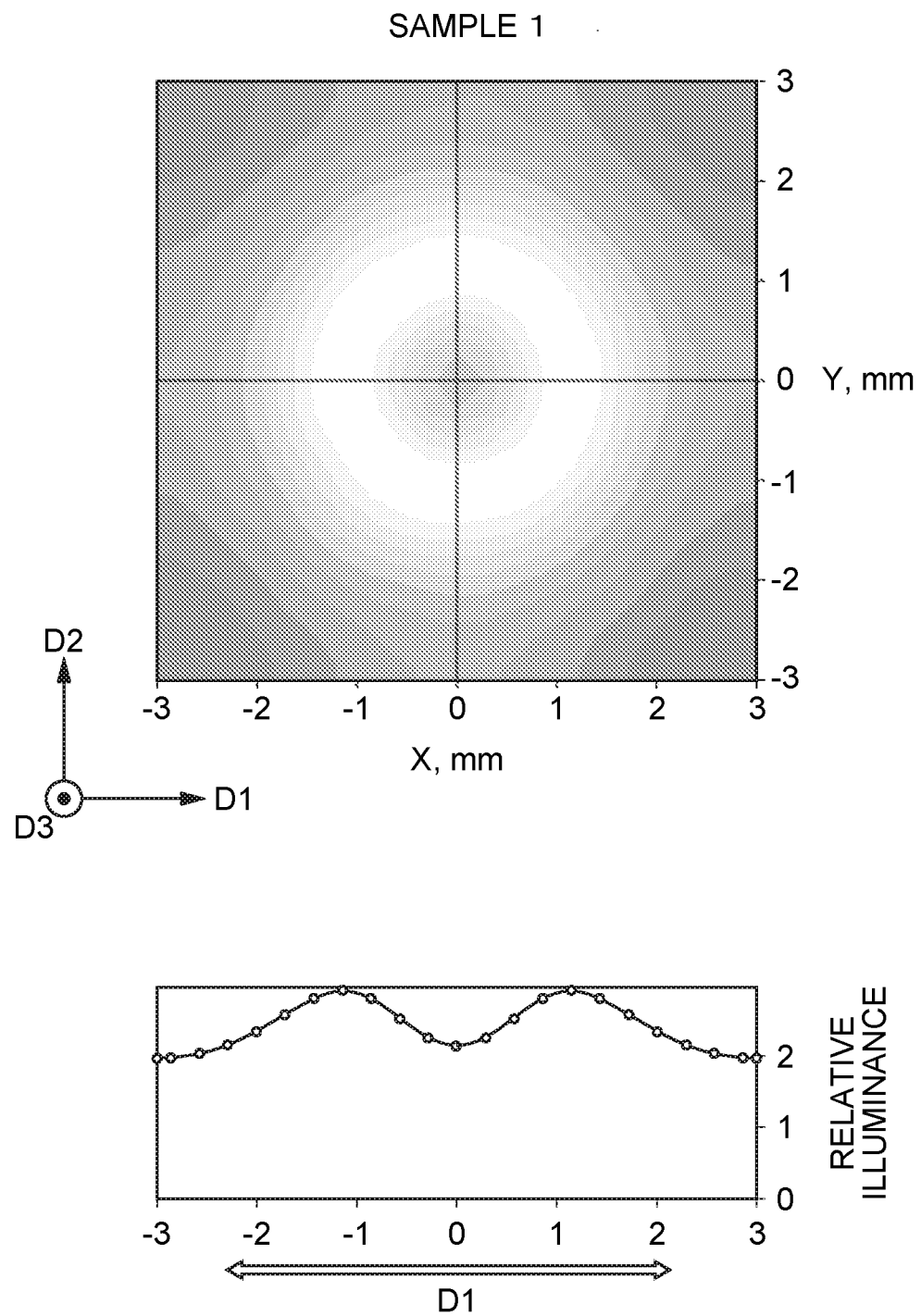
FIG. 23A is simulation results of calculating in-plane distribution of illuminance of the planar light source device according to Sample 1.
Figure 23B:
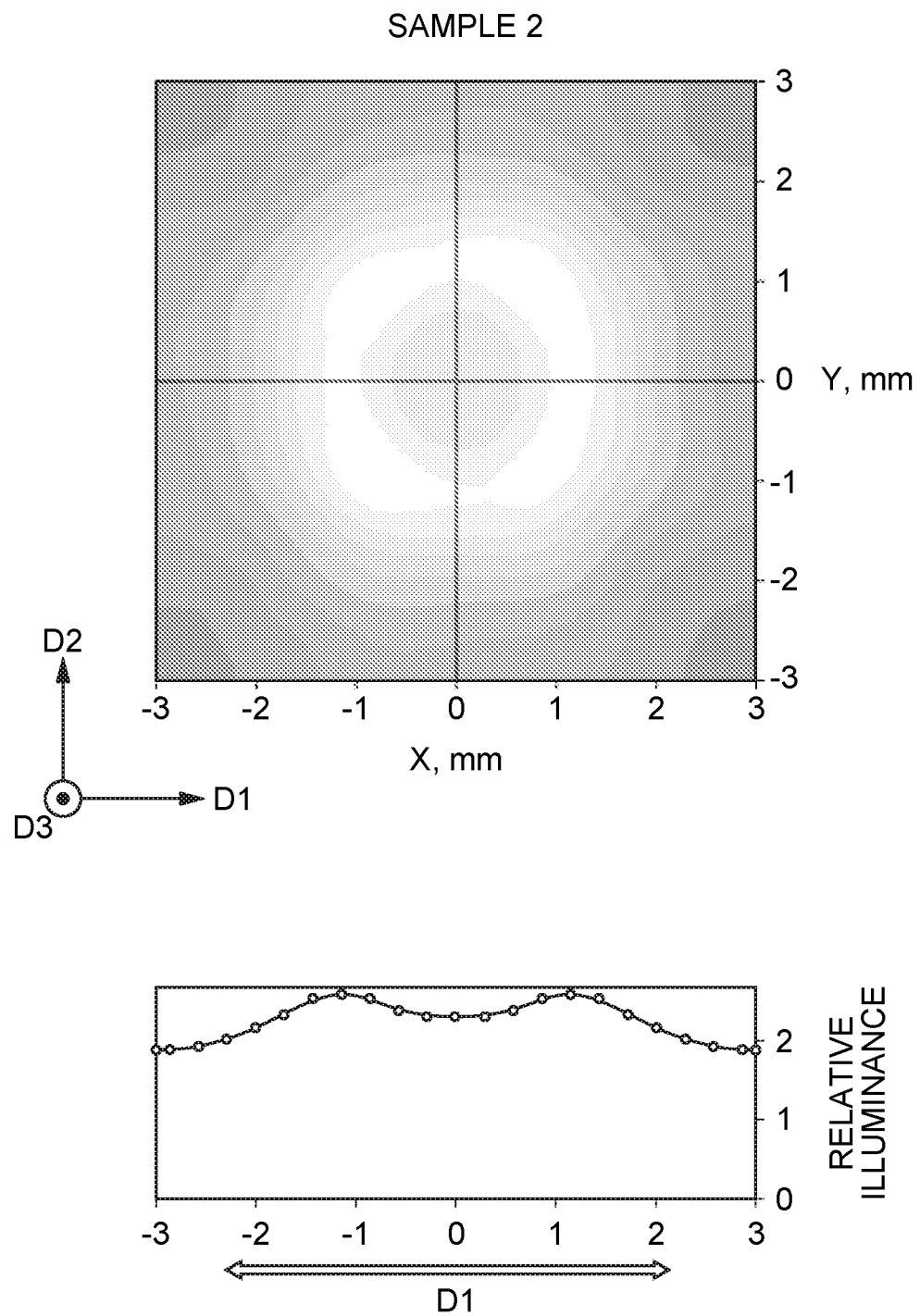
FIG. 23B is simulation results of calculating in-plane distribution of illuminance of the planar light source device according to Sample 2.
Figure 23C:
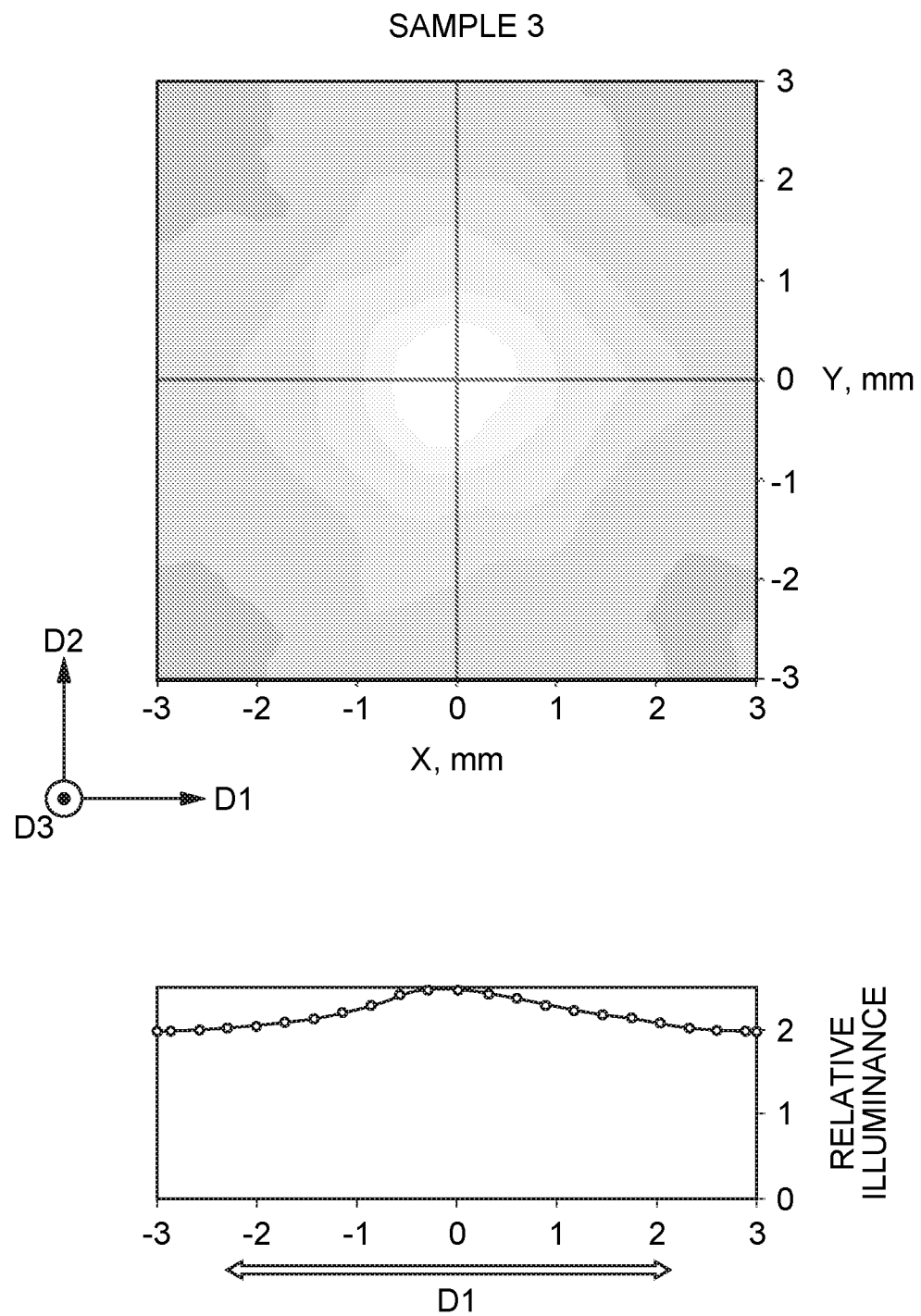
FIG. 23C is simulation results of calculating in-plane distribution of illuminance of the planar light source device according to Sample 3.
Figure 23D:
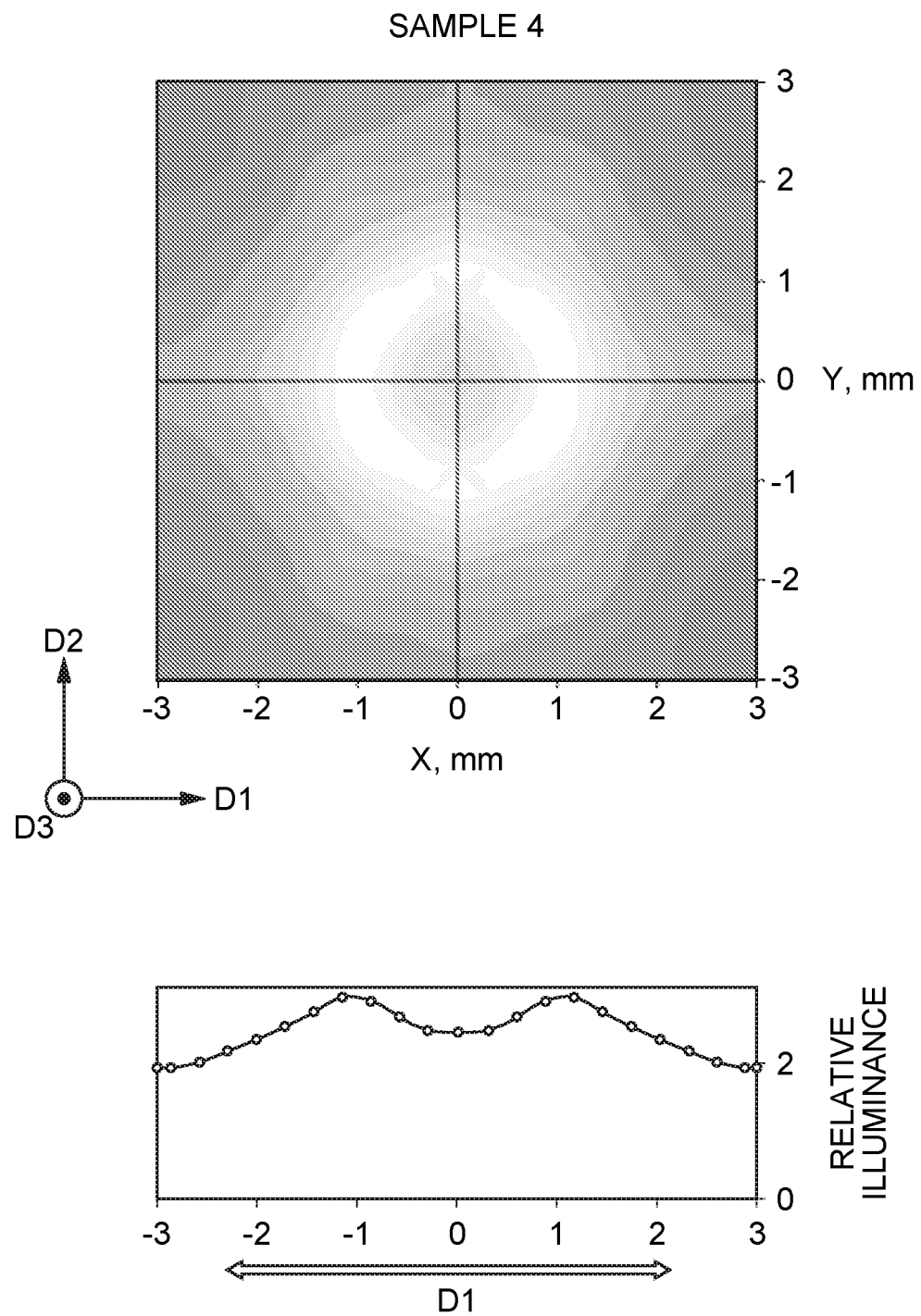
FIG. 23D is simulation results of calculating in-plane distribution of illuminance of the planar light source device according to Sample 4.
Figure 23E:
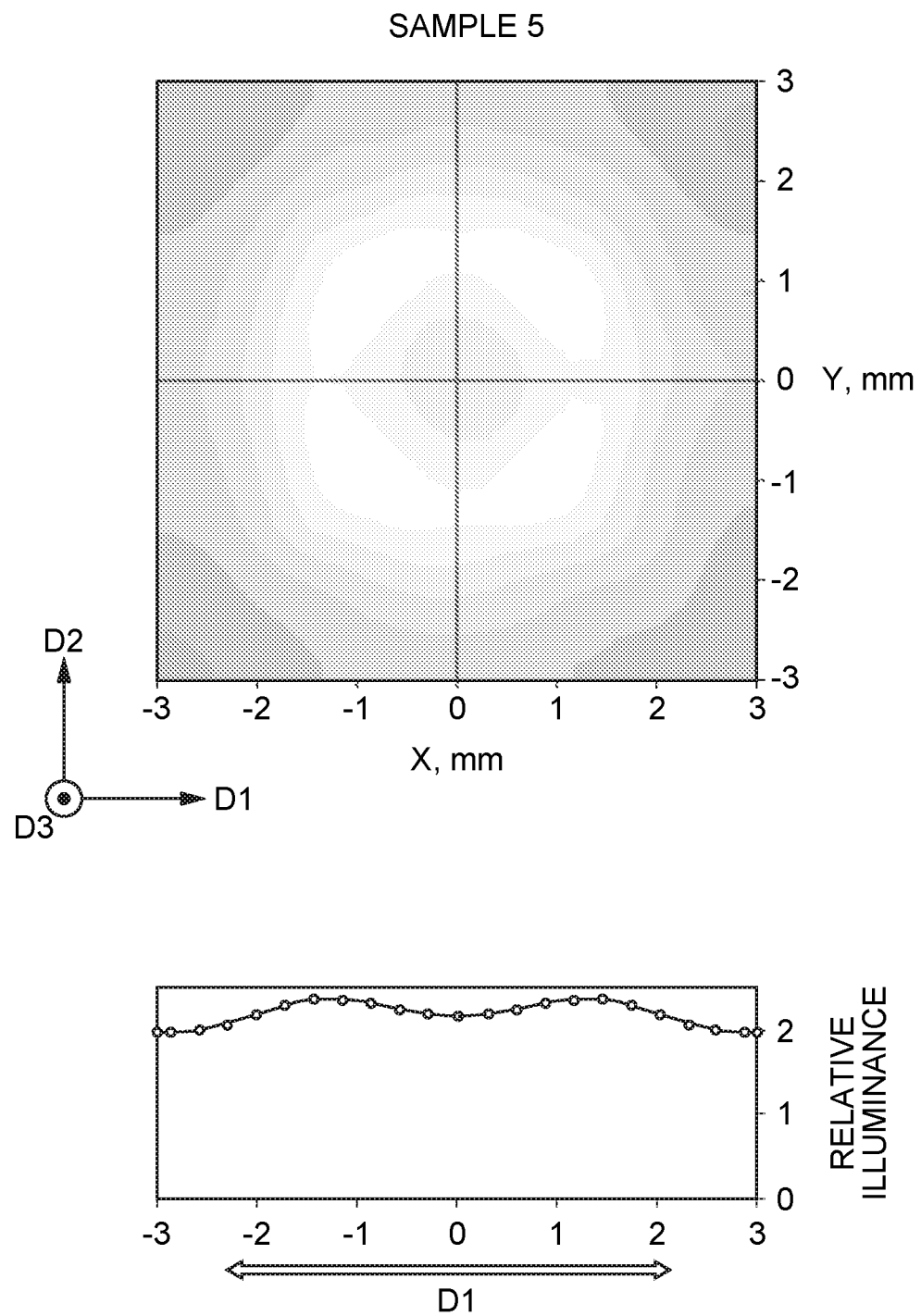
FIG. 23E is simulation results of calculating in-plane distribution of illuminance of the planar light source device according to Sample 5.
Figure 23F:
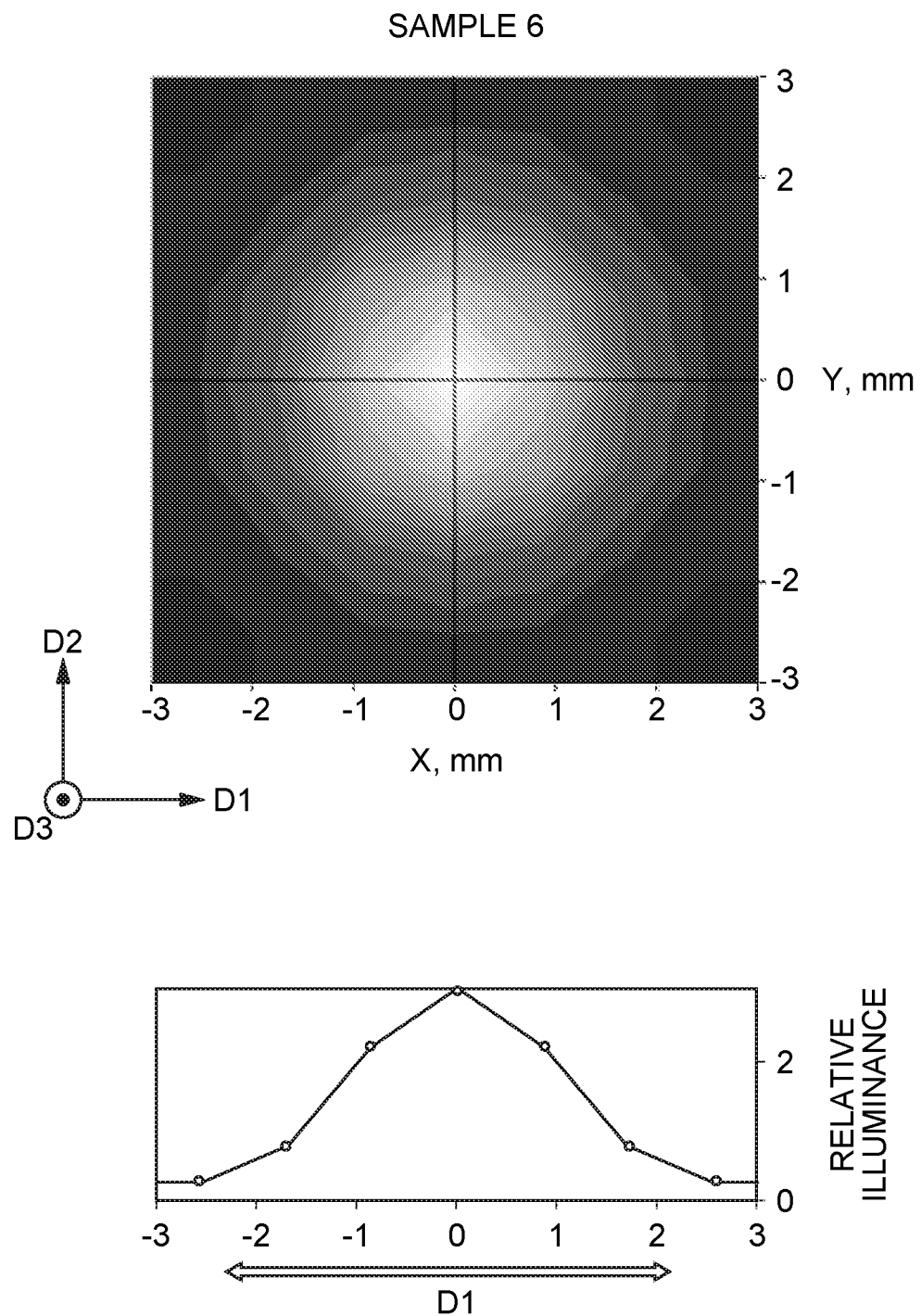
FIG. 23F is simulation results of calculating in-plane distribution of illuminance of the planar light source device according to Sample 6.
Figure 23G:
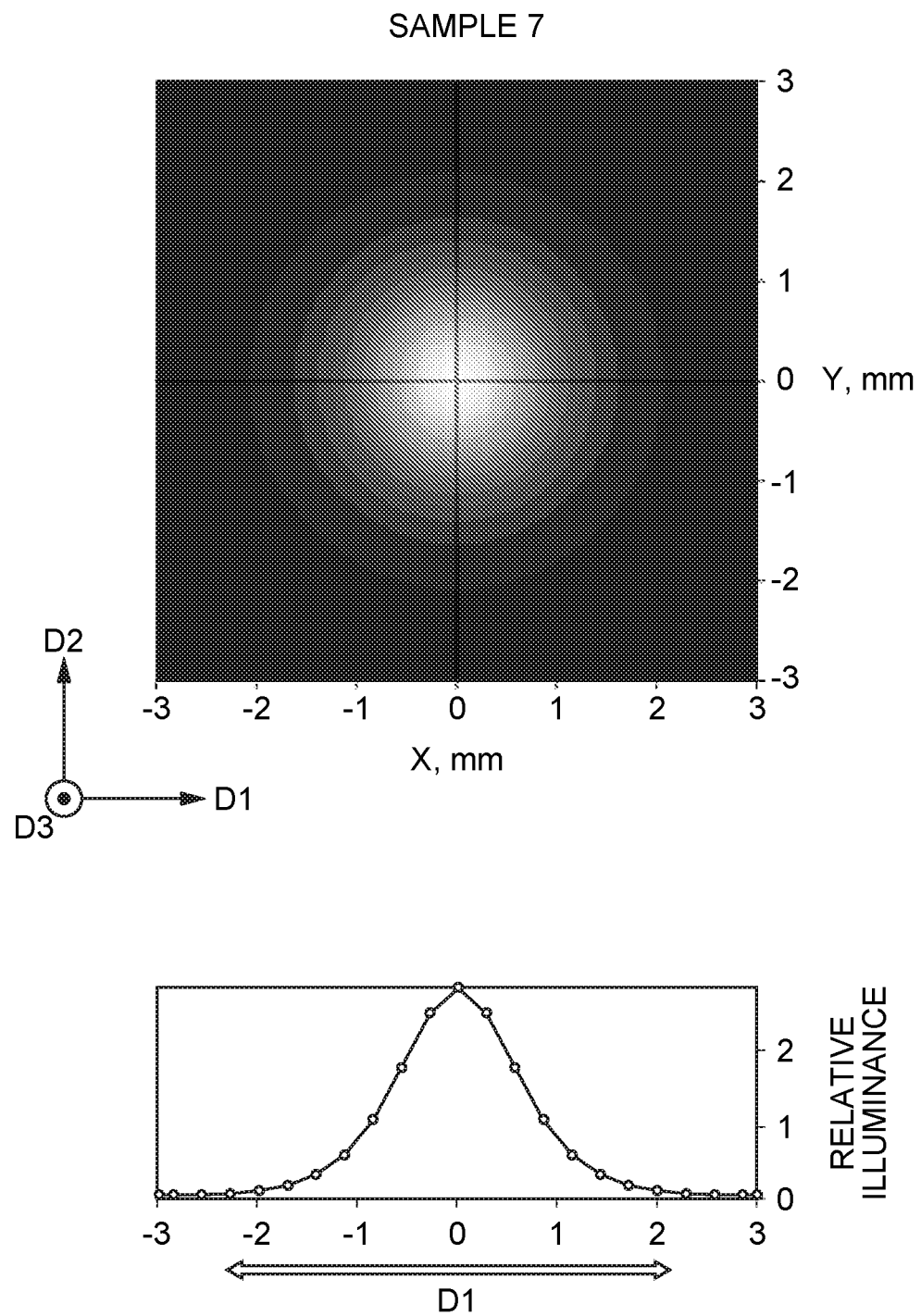
FIG. 23G is simulation results of calculating in-plane distribution of illuminance of the planar light source device according to Sample 7.

Light-receiving faces the same as those of samples 1 to 5 were also set with regard to the planar light source devices according to samples 6 and 7, under the same conditions, and in-plane distributions of illuminance on the light-receiving faces were calculated. The in-plane distributions of illuminance on the light-receiving faces that were calculated for the planar light source devices according to samples 6 and 7 are shown in FIG. 23F and FIG. 23G, respectively.

FIG. 23A to FIG. 23G show diagrams indicating in-plane distribution of illuminance on the light-receiving faces having the area of 6 mm by 6 mm (6 mm×6 mm), and also show graphs indicating illuminance at each position on a straight line in the first direction D1, passing through a position on the light-receiving face facing the light source 22 in the third direction D3. In the diagrams indicating the in-plane distribution, the illuminance at each position on the light-receiving face is expressed by color. The illuminance was high at positions where the color is light. The results shown in FIG. 23A to FIG. 23G show the relative illuminance at each position within the samples, and illuminance was not compared among different samples.

According to the simulation results, in samples 1 to 5, in-plane distribution of illuminance was suitably made uniform within the region 3 mm distanced in each of the first direction D1 and the second direction D2 from the light source, regardless of the gap between the light sources 22 and the diffusing member 40 being 0.5 mm, which is extremely short in comparison with the approximately 2.5 mm in Patent Document 1 (JP 6299811 B). From this point, confirmation was made that in a case of applying the diffusing member 40 according to the present embodiment to the planar light source device 20, the planar light source device 20 can be made markedly thinner while making the in-plane distribution of illuminance sufficiently uniform. It was also confirmed that in the planar light source devices 20 according to samples 2 to 5 using the microlens array 65, light can be effectively guided in directions along the normal direction ND of the element faces 67, in the direction of observation from the stacking direction D3.

In the embodiment described above, the diffusing member 40 has the light diffusing portion 50 and the light reflecting portion 70 in this order. In a case of applying the diffusing member according to this embodiment to the planar light source device, light output from the light sources 22 can be effectively spread in directions orthogonal to the stacking direction D3 by the combination of the light transmissivity and light diffusivity at the light diffusing portion 50 and the reflection properties at the light reflecting portion 70. Accordingly, unevenness in brightness due to the presence of the light sources 22 can be effectively resolved, i.e., images of the light sources 22 can be effectively made inconspicuous, while making the planar light source device 20 thinner. As a result, the illuminance at each position on the light-exiting side face 40b serving as the light-exiting side of the diffusing member 40 can be effectively made uniform, i.e., in-plane distribution of illuminance can be effectively made uniform, while making the planar light source device 20 thinner.

In the first specific example of the embodiment described above, the radiant intensity, at the light-exiting side face of the light diffusing portion 50 that faces the light reflecting portion 70 in a case of the light ray entering the light diffusing portion 50 at an angle of incidence of 0°, has a radiant intensity peak at a peak angle that is an angle of exit other than 0°. The reflectance of the light reflecting portion 70 with respect to light of the particular wavelength entering the light reflecting portion 70 at an angle of incidence of which the absolute value is 0° or greater and the peak angle or smaller is 50% or higher, and more preferably is 80% or higher. According to this example, a great part of the light that is incident to the light diffusing portion 50 at an angle of incidence of 0° and diffused at the light diffusing portion 50 is reflected at the light reflecting portion 70 without being transmitted through the light reflecting portion 70. That is to say, a great part of the light output from the light sources 22 is reflected one time or more at the light reflecting portion 70 and the direction of travel thereof is turned back in the stacking direction D3. Thus, traveling of the light output from the light sources 22 in directions orthogonal to the stacking direction D3 is promoted. Promoting reflection at the light reflecting portion 70 in this way enables the distance DX between the light sources 22 and the diffusing member 40 in the stacking direction D3 to be shortened, while making the in-plane distribution of illuminance uniform. That is to say, unevenness in brightness due to the presence of the light sources 22 can be effectively resolved and the in-plane distribution of illuminance can be effectively made uniform, while making the planar light source device 20 thinner.

As one specific example of the embodiment described above, the particular wavelength can be 450 nm. In this example, light-emitting diodes that emit blue light with great output can be used as the light sources 22. Also, fluorescent material or the like can be used to generate white light.

The first specific example of the embodiment has been described above. Next, a second specific example of the embodiment will be described with reference to FIG. 24 to FIG. 27. The second specific example differs from the first specific example in that the diffusing member 40 has the optical element portion 110. In the second specific example, the same configurations as those of the above-described first specific example can be employed for configurations other than the optical element portion 110. The optical element portion 110 will primarily be described in the description below. In the description regarding the second specific example below, and in the drawings used for description below, portions that can be configured the same as with the first specific example described above are denoted with the same signs as the signs used for the corresponding portions in the above-described specific example, and also repetitive description will be omitted.

Figure 24:
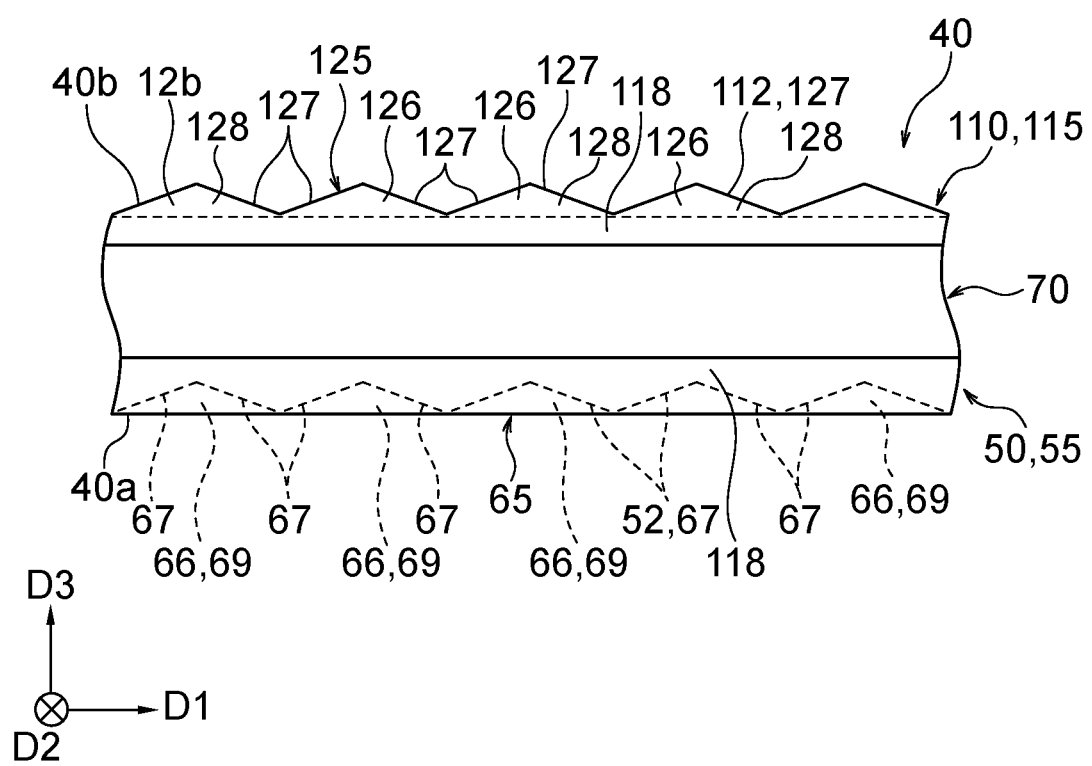
FIG. 24 is a diagram for describing a second specific example of the embodiment, and is a longitudinal-sectional view showing an example of the diffusing member that can be included in the planar light source device in FIG. 2.

As shown in FIG. 24, the optical element portion 110 is situated, with the light reflecting portion 70 as a reference, on the light-exiting side of light to be diffused by the diffusing member 40. The optical element portion 110 forms the light-exiting side face 40b of the diffusing member 40.

As described above, the reflection properties and the transmission properties of the light reflecting portion 70 have incident angle dependency. The light reflecting portion 70 reflects light with low angles of incidence, and turns back the direction of travel of this light in the stacking direction D3. The direction of travel of light transmitted through the light reflecting portion 70 is primarily a direction within an angular range greatly inclined with respect to the stacking direction D3, due to the reflection properties and the transmission properties of the light reflecting portion 70. The optical element portion 110 reinforces the reflection properties and the transmission properties of the light reflecting portion 70. The optical element portion 110 reflects part of the incident light from the light reflecting portion 70. The in-plane distribution of illuminance can be made more uniform through the collaboration of this light reflecting portion 70 and the optical element portion 110.

As a specific configuration, as shown in FIG. 24 the optical element portion 110 has an uneven face 112. The uneven face 112 faces the opposite side from the light reflecting portion 70 in the stacking direction D3. In other words, the uneven face 112 is facing the light-exiting side in the stacking direction D3. The direction of travel of light can be changed by refraction and reflection at the uneven face 112. The optical element portion 110 may include an optical sheet 115 simply overlaid with another member or joined by bonding or adhesion with another member, or may be the optical sheet 115, or may be part of the optical sheet 115, member, and a structure or the like, and further may be a face of the optical sheet 115, member, and structure or the like. In the example shown in FIG. 24, the optical element portion 110 is joined to the light reflecting portion 70. In the example shown in FIG. 24, the light diffusing portion 50, the light reflecting portion 70, and the optical element portion 110 are joined, and can be integrally handled.

Note that in order to distinguish from the uneven face 52 in the above-described light diffusing portion 50, the uneven face of the light diffusing portion 50 may be referred to as a first uneven face 52, and the uneven face of the optical element portion 110 may be referred to as a second uneven face 112. The light reflecting portion 70 and the optical element portion 110 include portions and elements of which the names are the same, besides the uneven face. With regard to such portions and elements, portions, and elements of the light diffusing portion 50 may be preceded by "first", and portions and elements of the optical element portion 110 may be preceded by "second".

The optical element portion 110 has light transmissivity. Regarding the light transmissivity that the optical element portion 110 has, for example, the total light transmittance of the optical element portion 110 is preferably 50% or higher, more preferably is 70% or higher, and even more preferably is 90% or higher. Setting the total light transmittance of the optical element portion 110 within the above range improves the usage efficiency of light from the light sources 22. In addition, the in-plane distribution of illuminance on the light-exiting side face 40b of the diffusing member 40 when applying the optical element portion 110 to the planar light source device 20 can be effectively made uniform. Accordingly, the optical element portion 110 is fabricated using a material that has high transmissivity with respect to light output from the light sources 22 or light used for light emission by the planar light source device 20. Note that the total light transmittance is a value measured by a method conforming to JIS K7361-1:1997.

Figure 25A:
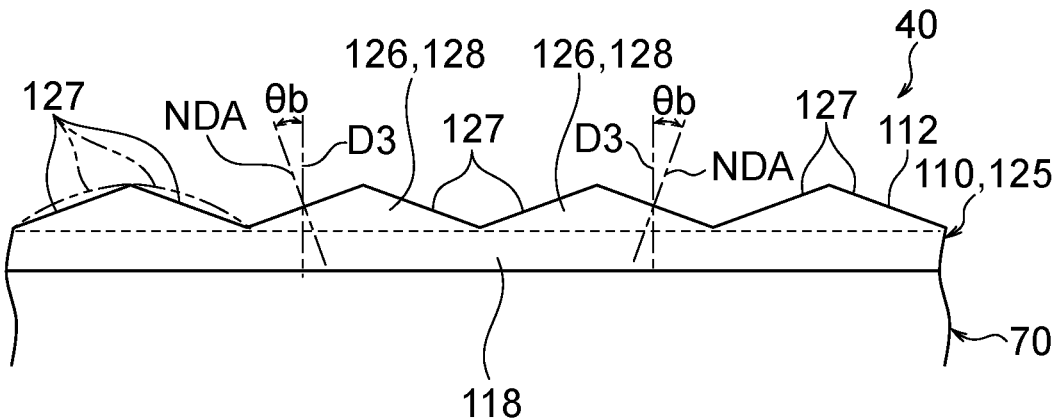
FIG. 25A is a longitudinal-sectional view showing an example of a microlens array that can be included in an optical element portion of the diffusing member in FIG. 24.
Figure 25A:
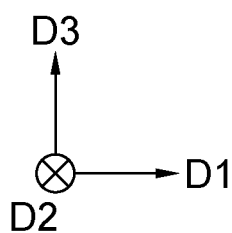
Figure 25B:
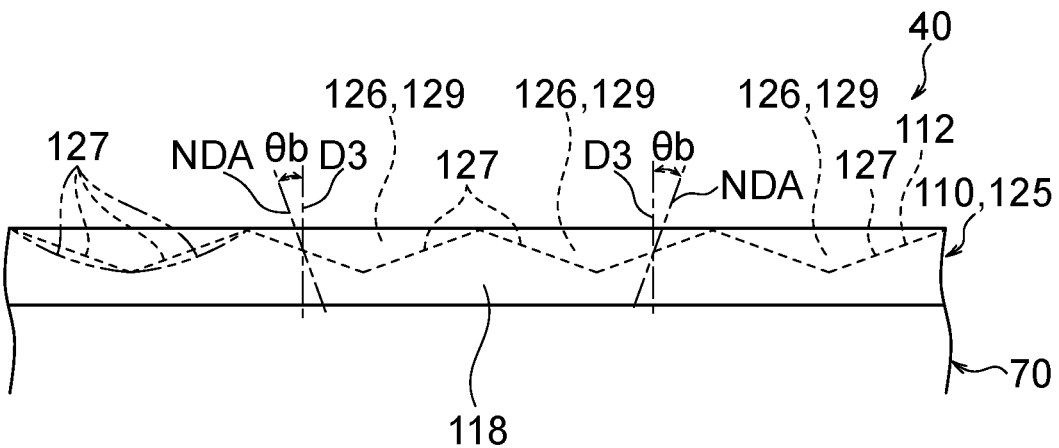
FIG. 25B is a longitudinal-sectional view showing another example of the microlens array that can be included in the optical element portion of the diffusing member in FIG. 24.
Figure 25B:
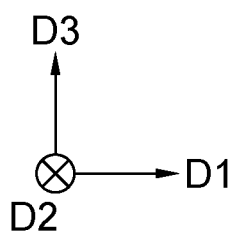

Various configurations having the uneven face 112 may be employed for the optical element portion 110, without being limited in particular. As shown in FIG. 25A and FIG. 25B, the optical element portion 110 may include a microlens array 125. In this example, the microlens array 125 forms the uneven face 112. Unit optical elements 126 are a concept including elements referred to as unit form elements, unit prisms, and unit lenses. The unit optical elements 126 may be configured as convex portions 128, as shown in FIG. 25A. The unit optical elements 126 may be configured as concave portions 129, as shown in FIG. 25B.

In the examples shown in FIG. 25A and FIG. 25B, the optical element portion 110 has a base portion 118. The base portion 118 is sheet-like. The base portion 118 extends in the first direction D1 and the second direction D2 perpendicular to the stacking direction D3. In the examples shown in FIG. 25A and FIG. 25B, the base portion 118 is joined to the light reflecting portion 70. In the example shown in FIG. 25A, the unit optical elements 126 serving as the convex portions 128 are provided on the base portion 118. In the example shown in FIG. 25B, the unit optical elements 126 serving as the concave portions 129 are formed on the base portion 118.

As shown in FIG. 25A and FIG. 25B, the unit optical elements 126 have element faces 127 inclined with respect to the stacking direction D3. The unit optical elements 126 are defined by the element faces 127. The microlens array 125 has the uneven face 112 formed by the element faces 127 of the unit optical elements 126. The microlens array 125 is capable of bending the direction of travel of incident light by the uneven face 112.

Optical properties of the uneven face 112 are affected by an inclination angle θb of the element faces 127 of the unit optical elements 126. Accordingly, the cross-sectional shapes of the unit optical elements 126 can be adjusted as appropriate on the basis of optical properties required of the planar light source device 20 and the optical element portion 110. For example, the inclination angle θb of a plurality of the element faces 127 included in a single unit optical element 126 may be different from each other, or may be the same. The configurations of a plurality of the unit optical elements 126 included in the microlens array 125, such as shapes, orientations, sizes, and so forth, may be different from each other. The plurality of unit optical elements 126 included in the microlens array 125 may have the same configurations as each other.

As described above, the direction of travel of light transmitted through the light reflecting portion 70 primarily is a direction within an angular range greatly inclined with respect to the stacking direction D3 due to the reflection properties and the transmission properties of the light reflecting portion 70. The optical element portion 110 reinforces the reflection properties and the transmission properties of the light reflecting portion 70. The optical element portion 110 reflects part of the incident light from the light reflecting portion 70. The in-plane distribution of illuminance can be made more uniform through the collaboration of the light reflecting portion 70 and the optical element portion 110. From a perspective of making such functions of the optical element portion 110 more effective, the inclination angle θb that a normal direction NDA of the element faces 127 forms with respect to the stacking direction D3 may be 25° or smaller, or may be 20° or smaller, or may be 15° or smaller. The inclination angle θb may be greater than 0°. From the perspective of securing the above functions of the optical element portion 110, the inclination angle θb may be 3° or greater, or may be 5° or greater, or may be 8° or greater.

Note that arrangements can be assumed in which the element faces 127 are not flat. The inclination angle θb of the element faces 127 is to be identified at a center position of the element faces 127 in the stacking direction D3. With regard to element faces 127 serving as the convex portions 128, the inclination angle θb is identified at a position that is a center position in the stacking direction D3 between a basal end portion of the element faces 127 that connects to the base portion 118 and a distal end portion most distanced from the base portion 118 in the stacking direction D3. With regard to element faces 127 serving as the concave portions 129, the inclination angle θb is identified at a position that is a center position in the stacking direction D3 between a basal end portion (deepest portion) of the element faces 127 closest to the light reflecting portion 70 in the stacking direction D3 and a distal end portion most distanced from the light reflecting portion 70 in the stacking direction D3.

Further, the element faces 127 may be somewhat curved, as indicated by the chain double-dashed lines in FIG. 25A and FIG. 25B. The unit optical elements 126 may have an external shape that is part of a sphere, such as a hemispherical shape or the like, or may have an external shape that is part of a spheroid. In a case in which the unit optical elements 126 include curved element faces 127, the optical paths of light that is transmitted through the microlens array 125 are bent in various directions by reflection and refraction. Accordingly, the in-plane distribution of illuminance can be more effectively made uniform. Also, the change in angular distribution of radiant intensity can be made smooth effectively.

From generally the same reason as the curved element faces 127, the unit optical elements 126 may include element faces 127 formed as matte faces. Element faces 127 serving as matte faces scatter light in various directions. Accordingly, the in-plane distribution of illuminance can be more effectively made uniform. Also, the change in angular distribution of radiant intensity can be made smooth effectively.

The plurality of unit optical elements 126 may be two-dimensionally arrayed. That is to say, the plurality of unit optical elements 126 may be arrayed in two or more directions that are non-parallel to each other. Accordingly, the element faces 127 of the unit optical elements 126 face in various directions. As a result, the unit optical elements 126 that are two-dimensionally arrayed are capable of guiding light in various directions. The plurality of unit optical elements 126 may be irregularly arrayed, or may be orderly arrayed. Orderly arraying the plurality of unit optical elements 126 facilitates design of the microlens array 125, and also the unit optical elements 126 can be easily laid out with no spaces therebetween.

With regard to the configurations of the array, shapes, and so forth, of the second unit optical elements 126 of the optical element portion 110, the configurations of the array, shapes, and so forth, of the first unit optical elements 66 included in the light diffusing portion 50, such as shown in the already-described FIG. 11A to FIG. 14B, may be employed. For example, the configurations shown in the already-described FIG. 11A to FIG. 14B may be employed as configurations of the unit optical elements 126. In each of the four specific examples shown in FIG. 11A to FIG. 14B, the perpendiculars from the apices of the conic solids making up the unit optical elements 126 to the bottom faces thereof may pass through the center of gravity of the bottom faces. Note that in the four specific examples shown in FIG. 11A to FIG. 14B, the unit optical elements 126 are the concave portions 129 formed in the base portion 118. However, in the four specific examples shown in FIG. 11A to FIG. 14B, the unit optical elements 126 may be the convex portions 128 protruding from the base portion 118 to the opposite side from the light sources 22 in the stacking direction D3.

When the dimensions of the unit optical elements 126 as observed from the stacking direction D3 are large, unevenness of brightness due to the shapes of the unit optical elements 126 is visually recognizable. From a perspective of preventing this trouble, the greatest length of the unit optical elements 126 in the directions perpendicular to the stacking direction D3 preferably is 1.5 mm or smaller, more preferably is 1 mm or smaller, and even more preferably is 0.5 mm or smaller.

Also, when the dimensions of the unit optical elements 126 as observed from the stacking direction D3 are large, there arises a need to position the unit optical elements 126 as to the light sources 22. This point is the same as the above-described need to position the unit optical elements 66 of the light diffusing portion 50 with respect to the light sources 22. Accordingly, the unit optical elements 126 of the optical element portion 110 are preferably configured in the same way as the unit optical elements 66 of the light diffusing portion 50. That is to say, a single unit optical element 126 preferably has a dimension smaller than three times the dimension of the light sources 22 in each of the two directions perpendicular to each other, when observing from the stacking direction D3. For example, the unit optical elements 126 preferably have dimensions smaller than squares 1.5 mm each way, and more preferably have dimensions smaller than squares 0.6 mm each way in observation from the stacking direction D3. Even more preferably, the dimension of the unit optical elements 126 in an optional direction may be three times or smaller than the dimension of the light sources 22 in this direction in observation from the stacking direction D3.

The array pitch of the unit optical elements 126 having such dimensions may be 0.01 mm or larger and 1.5 mm or smaller. From the perspective of effectively making the in-plane distribution of illuminance uniform on the light-exiting side face 40b of the diffusing member 40 when applying to the planar light source device 20, the array pitch of the unit optical elements 126 preferably is 0.05 mm or larger and 1 mm or smaller, and more preferably is 0.1 mm or larger and 0.5 mm or smaller.

The uneven face 112 of the optical element portion 110 guides light in the normal direction NDA of the element faces 127 in observation from the stacking direction D3. Accordingly, from the perspective of making the in-plane distribution of illuminance uniform, the uneven face 112 preferably includes element faces 127 having a normal direction NDA non-parallel to the array directions of the plurality of light sources 22, in observation from the stacking direction D3. More preferably, the unit optical elements 126 include element faces 127 having a normal direction ND inclined by an angle of 35° or greater and 55° or smaller with respect to the array directions of the plurality of light sources 22, in observation from the stacking direction D3. According to such a layout, light can be guided in directions non-parallel to the array directions of the plurality of light sources 22, by reflection and refraction at the unit optical elements 126. Thus, in-plane distribution of illuminance can be made uniform more effectively. For example, in the array of the unit optical elements 126 shown in FIG. 12A and FIG. 12B, the in-plane distribution of illuminance can be effectively made uniform in combination with the light sources 22 of the array shown in FIG. 3. The above-described display 42 may display the direction of the normal direction NDA of the element faces 127.

Also, the optical element portion 110 may include the plurality of unit optical elements 126 that are arrayed in directions non-parallel to the array directions of the plurality of light sources 22. That is to say, the array directions of the plurality of unit optical elements 126 may be non-parallel to the array directions of the plurality of light sources 22. According to such a layout, moiré due to overlaying the array of unit optical elements 126 and the array of light sources 22 can be effectively made to be inconspicuous.

Figure 26:
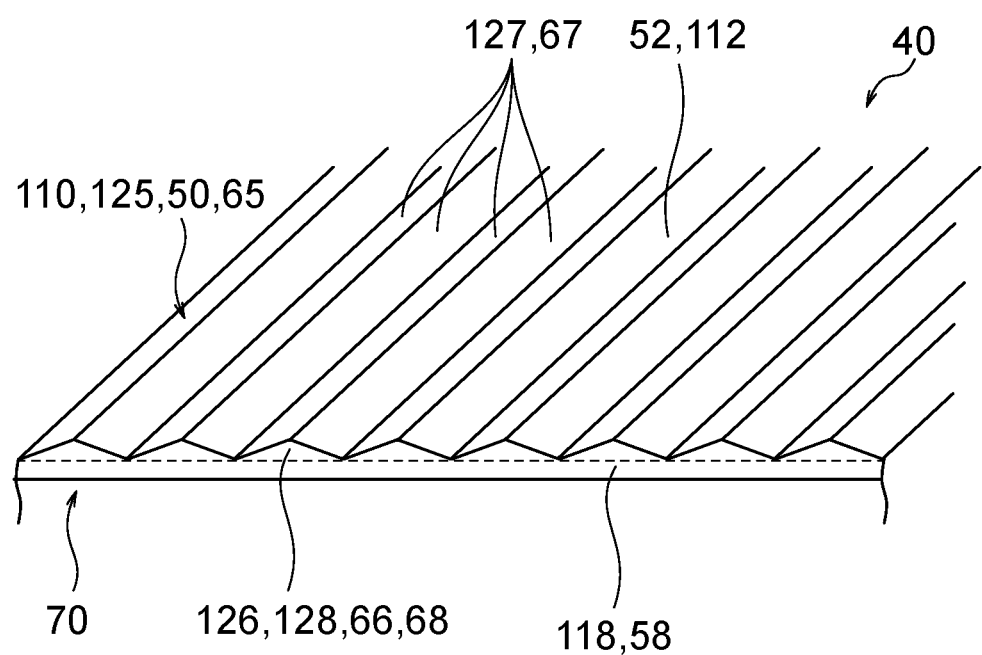
FIG. 26 is a perspective view showing another example of the optical element portion of the diffusing member in FIG. 24.

Further, as shown in FIG. 26, the plurality of unit optical elements 126 may be arrayed one-dimensionally. In this example, the plurality of unit optical elements are arrayed in one direction, and the unit optical elements 126 may extend linearly in another direction that is non-parallel to the one direction. For example, as shown in FIG. 26, the unit optical elements 126 may extend in another direction perpendicular to the one direction. The unit optical elements 126 may extend linearly in another direction. The array direction of the unit optical elements 126 may be the first direction D1, or may be the second direction D2, or may be a direction that is non-parallel to both the first direction D1 and the second direction D2. For example, the array direction of the unit optical elements 126 may be inclined with respect to both the first direction D1 and the second direction D2 by 25° or greater and 65° or smaller, or may be inclined with respect to both the first direction D1 and the second direction D2 by 35° or greater and 55° or smaller.

Cross-sectional shapes of the linear unit optical elements 126 along a cross-section that is orthogonal to the longitudinal direction thereof are not limited in particular, and may be polygonal shapes, such as triangular shapes, pentagonal shapes, or the like, and may be shapes in which one or more corners of polygonal shapes are chamfered. The array pitch of the linear unit optical elements 126 may be set as already described above, and specifically may be 0.01 mm or larger and 1.5 mm or smaller, or may be 0.05 mm or larger and 1 mm or smaller, and more preferably may be 0.1 mm or larger and 0.5 mm or smaller. As for other configurations of linear unit optical elements 126, configurations of the unit optical elements 126 making up the above-described microlens array 125 can be employed. For example, the inclination angle θb of the element faces 127 of the linear unit optical elements 126 may be 25° or smaller, or may be 20° or smaller, or may be 15° or smaller. The inclination angle θb may be greater than 0°. The inclination angle θb may be 3° or greater, or may be 5° or greater, or may be 8° or greater. The element faces 127 of the linear unit optical elements 126 may be curved faces. The element faces 127 of the linear unit optical elements 126 may be matte faces. The unit optical elements 126 may include element faces 127 that have a normal direction ND inclined by an angle of 35° or greater and 55° or smaller as to the array directions of the plurality of light sources 22 in observation from the stacking direction D3.

Next, operations at the time of generating planar light by the planar light source device 20 using the diffusing member 40 having the above configuration will be described. The light sources 22 output the light LP1 that has the 450 nm wavelength and that is blue light. The light reflecting portion 70 has the properties shown in FIG. 17 and FIG. 18 with respect to the light output from the light sources 22.

The optical operations up to being transmitted through the light reflecting portion 70 are the same as the optical operations described in the above first specific example with reference to FIG. 19 to FIG. 22. That is to say, light output from the light sources 22 can be effectively spread in the directions D1 and D2 perpendicular to the stacking direction D3, without being greatly limited by the light distribution properties of the light sources 22, due to the combination of the light diffusive transmissivity at the light diffusing portion 50 and the reflectivity at the light reflecting portion 70. Accordingly, unevenness in brightness due to the presence of the light sources 22 can be effectively resolved, i.e., images of the light sources 22 can be effectively made inconspicuous. Such light diffusivity at the diffusing member 40 enables the planar light source device 20 to be made markedly thinner. As a result, the illuminance at each position on the face of the light-exiting side of the light reflecting portion 70 can be effectively made uniform, i.e., in-plane distribution of illuminance can be effectively made uniform, while making the planar light source device 20 thinner.

Figure 27:
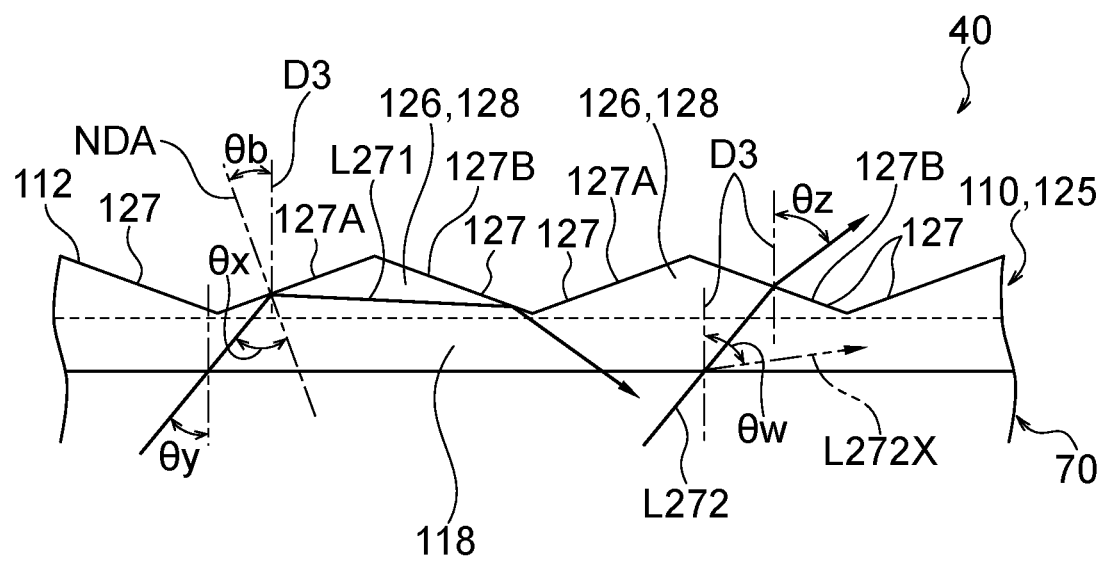
FIG. 27 is a longitudinal-sectional view of the optical element portion corresponding to FIG. 25A, and is a diagram for describing operations of the optical element portion.
Figure 27:
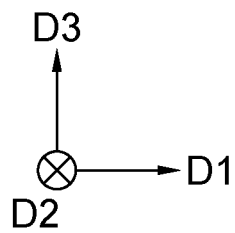

Next, light transmitted through the light reflecting portion 70 enters the optical element portion 110 of the diffusing member 40. As shown in FIG. 27, the optical element portion 110 has the uneven face 112 on the light-exiting side that is away from the light sources 22 in the stacking direction D3. Part L271 of incident light to the optical element portion 110 is reflected at the uneven face 112. The direction of travel of the reflected light L271 from the uneven face 112 is turned back in the stacking direction D3, and heads toward the light source 22 side in the stacking direction D3. This reflected light L271 is transmitted through the light reflecting portion 70 and diffusely transmitted through the light diffusing portion 50, and is reflected at the support substrate 25. The reflected light at the support substrate 25 can reenter the diffusing member 40 at positions distanced from the light sources 22 in directions perpendicular to the stacking direction D3, in the same way as the above-described reflected light LP2. Accordingly, light output from the light sources 22 can be effectively spread in directions perpendicular to the stacking direction D3, by reflection at the optical element portion 110. Thus, brightness at regions distanced from the light sources 22, at which brightness readily becomes insufficient, can be sufficiently secured. That is to say, reflection properties of the light reflecting portion 70 are reinforced by reflection at the optical element portion 110, and making in-plane distribution of illuminance uniform can be further promoted.

Another part L272 of incident light to the optical element portion 110 is transmitted through the uneven face 112. The light L272 exits the light-exiting side face 40b of the diffusing member 40 formed by the uneven face 112 of the optical element portion 110.

As described above, unevenness in brightness due to the presence of the light sources 22 can be effectively resolved, and the illuminance on the light-emitting face 20a can be effectively made uniform. In particular, light can be guided in directions perpendicular to the stacking direction D3 while making the planar light source device 20 thinner, by reinforcing reflection properties of the light reflecting portion 70 with the optical element portion 110. As a result, the illuminance at each position on the light-exiting side face 40b of the diffusing member 40 can be effectively made uniform, i.e., in-plane distribution of illuminance can be effectively made uniform, while making the planar light source device 20 thinner.

Now, optical functions of the optical element portion 110 will be described in further detail with reference to FIG. 27. As shown in FIG. 27, the optical element portion 110 according to the present embodiment has the uneven face 112 on the opposite side thereof from the light reflecting portion 70. As shown in FIG. 27, the light L271 and L272 traveling through the optical element portion 110 travels in a direction greatly inclined with respect to the stacking direction D3, due to the optical properties of the light reflecting portion 70. In a cross-section of the optical element portion 110 taken along the stacking direction D3, the uneven face 112 includes same-side element faces 127A inclined to the same side as the direction of travel of light, with the stacking direction D3 as a reference, and reverse-side element faces 127B inclined to the reverse side as the direction of travel of light, with the stacking direction D3 as a reference. As shown in FIG. 27, an angle of incidence ex of the light L271 entering the same-side element faces 127A is greater than an angle of incidence θy of the light L271 entering a flat face perpendicular to the stacking direction D3. Accordingly, the light L271 is readily reflected at the same-side element faces 127A. Thus, due to the optical element portion 110 having the uneven face 112 on the opposite side from the light reflecting portion 70 in the stacking direction D3, part of the light transmitted through the light reflecting portion 70 is reflected, and the optical properties of the light reflecting portion 70 can be reinforced. Accordingly, the illuminance at each position on the light-exiting side face 40b of the diffusing member 40 can be effectively made uniform, i.e., in-plane distribution of illuminance can be effectively made uniform.

Note that from the perspective of promotion of making in-plane distribution of illuminance uniform, the reflection at the uneven face 112 preferably is total reflection. Taking into consideration the refractive index of the transparent resin material widely used in optical usages, the total reflection phenomenon readily occurs when the angle of incidence of the light L271 to the element faces 127 becomes as great as around 40°. In light of the reflection properties and the transmission properties at the light reflecting portion 70, the inclination angle θb that the normal direction NDA of the element faces 127 forms with respect to the stacking direction D3 preferably is 25° or smaller, more preferably is 20° or smaller, and even more preferably is 15° or smaller. Adjusting the inclination angle θb of the element faces 127 to this range enables the illuminance at each position on the light-exiting side face 40b of the diffusing member 40 to be made more uniform.

Also, when the inclination angle θb is great, light does not readily enter the same-side element faces 127A that brings about reflection. From this point as well, the inclination angle θb that the normal direction NDA of the element faces 127 forms with respect to the stacking direction D3 preferably is 25° or smaller, more preferably is 20° or smaller, and even more preferably is 15° or smaller. Adjusting the inclination angle θb of the element faces 127 to this range enables the illuminance at each position on the light-exiting side face 40b of the diffusing member 40 to be made more uniform.

In the example shown in FIG. 27, the unit optical elements 126 are the convex portions 128. In the unit optical elements 126 serving as the convex portions 128, a great part of the area of the element faces 127 is situated on the light reflecting portion 70 side in the stacking direction D3. Accordingly, light traveling through the optical element portion 110 readily enters not only the above-described reverse-side element faces 127B, but the above-described same-side element faces 127A as well. Thus, according to the optical element portion 110 having the unit optical elements 126 serving as the convex portions 128, reflection at the optical element portion 110 is promoted, and illuminance at each position on the light-exiting side face 40b of the diffusing member 40 can be made uniform even further.

Setting the lower limit of the inclination angle θb enables a situation to be realized in which, out of light traveling through the optical element portion 110, light traveling in directions greatly inclined with respect to the stacking direction D3 does not readily enter the above-described same-side element faces 127A. Accordingly, by setting the lower limit of the inclination angle θb, the uneven face 112 exhibits selective reflection properties of selectively reflecting, out of the light traveling through the optical element portion 110, light traveling in directions of which the inclination angle with respect to the stacking direction D3 is relatively small. Thus, the reflection properties and the transmission properties of the light reflecting portion 70 can be reinforced by reflection at the optical element portion 110. That is to say, light entering the optical element portion 110 travels in directions greatly inclined with respect to the stacking direction D3 due to the optical properties at the light reflecting portion 70. The optical element portion 110 then selectively reflects, out of the light traveling through the light reflecting portion 70, light traveling in directions of which the inclination angle with respect to the stacking direction D3 is relatively small. Conversely, the optical element portion 110 selectively transmits, out of the light traveling through the light reflecting portion 70, light traveling in directions of which the inclination angle with respect to the stacking direction D3 is relatively great. Accordingly, illuminance at each position on the light-exiting side face 40b of the diffusing member 40 can be made even more uniform. From such a perspective, the inclination angle θb that the normal direction NDA of the element faces 127 forms with respect to the stacking direction D3 preferably is 3° or greater, more preferably is 5° or greater, and even more preferably is 8° or greater.

In a combination with the optical element portion 110 including the second uneven face 112 of which the inclination angle θb has the above-described lower limit value, the first uneven face 52 of the light diffusing portion 50 may include first element faces 67 having the normal direction ND inclined at the inclination angle θa that is 25° or smaller with respect to the stacking direction D3. As a result of diligent experimentation by the present discloser, the inclination angle θa of the normal direction ND of the first element faces 67 with respect to the stacking direction D3 preferably is 25° or smaller, more preferably is 20° or smaller, and even more preferably is 15° or smaller. Also, this inclination angle θa preferably is 3° or greater, more preferably is 5° or greater, and even more preferably is 8° or greater. By combining the light diffusing portion 50 having such first element faces 67, and the optical element portion 110 having the second element faces 127 of which the above-described inclination angle θb is 25° or smaller, illuminance at each position on the light-exiting side face 40b of the diffusing member 40 can be made even more uniform.

As shown in FIG. 27, when passing through the above-described reverse-side element face 127B, the light L272 is refracted at the reverse-side element face 127B. An angle of exit θz of this light L272 is smaller than an angle of exit Ow of light L272X in a case of assuming passing through and exiting a flat face perpendicular to the stacking direction D3. That is to say, the uneven face 112 of the optical element portion 110 exhibits light concentrating functions with respect to exiting light. The burden of optical path correction with respect to light transmitted through the diffusing member 40 is reduced by the light concentrating functions of the optical element portion 110. As a result, the usage efficiency of light transmitted through the diffusing member 40 can be improved. Also, the count of members and the thickness of members assembled into the planar light source device 20 can be reduced, which can contribute to making the planar light source device 20 thinner.

In the second specific example of the embodiment described above, the diffusing member 40 has the light diffusing portion 50 that has light transmissivity and light diffusivity, the light reflecting portion 70 in which the transmittance with respect to light of the particular wavelength entering at an angle of incidence of 0° is smaller than the transmittance with respect to light of the particular wavelength entering at a certain angle of incidence greater than 0°, and the optical element portion 110 that has the uneven face 112 on the side thereof opposite to the light reflecting portion 70, in this order. In a case of applying the diffusing member 40 according to this embodiment to a planar light source device, light output from the light sources 22 can be effectively spread in directions perpendicular to the stacking direction D3, by the combination of light transmissivity and light diffusivity at the light diffusing portion 50, and the reflection properties at the light reflecting portion 70. In addition, the light can be effectively spread in directions perpendicular to the stacking direction D3, by the uneven face 112 of the optical element portion 110 reinforcing the reflection properties of the light reflecting portion 70. Thus, unevenness in brightness due to the presence of the light sources 22 can be effectively resolved, i.e., images of the light sources 22 can be effectively made inconspicuous, while making the planar light source device thinner. As a result, the illuminance at each position on the light-exiting side face 40b serving as the light-exiting side of the diffusing member 40 can be effectively made uniform, i.e., in-plane distribution of illuminance can be effectively made uniform, while making the planar light source device 20 thinner.

Although the embodiment has been described above with reference to specific examples, these specific examples do not limit the embodiment. The above-described embodiment may be carried out through various other specific examples, and various types of omissions, substitutions, alterations, additions, and so forth, may be made, without departing from the essence thereof.

An example of a modification will be described below with reference to the drawings. In the description below and in the drawings used in the description below, portions that can be configured in the same way as the above-described specific examples are denoted with the same signs as the signs used for the corresponding portions in the above-described specific example, and also repetitive description will be omitted.

The planar light source device 20 can further include, in addition to the light sources 22, the support substrate 25, and the diffusing member 40, other members, as indicated by chain double-dashed lines in FIG. 2. Examples of other members added to the planar light source device 20 include a wavelength conversion sheet 76, a light diffusion sheet 77, a reflecting-type polarizing plate 78, and so forth. The wavelength conversion sheet 76 has fluorescent material, for example, absorbs light from the light sources 22, and outputs light of a different wavelength from the wavelength of the light that is absorbed. For example, the light sources 22 may output blue light, and the wavelength conversion sheet 76 may convert part of the blue light into red light and green light. According to this example, the reflection properties of the light reflecting portion 70 can be adjusted with respect to light of a limited wavelength region. Accordingly, white planar light can be generated by the planar light source device 20, while imparting the light reflecting portion 70 with ideal reflection properties corresponding to the diffusive transmission properties of the light diffusing portion 50. The light diffusion sheet 77 can smoothly change the angular distribution of the radiant intensity at the light-emitting face 20a of the planar light source device 20. The reflecting-type polarizing plate 78 transmits only light of a linearly-polarized light component that is usable by the display panel 15, and reflects light of a linearly-polarized light component that is unusable by the display panel 15. The polarized light component of light reflected at the reflecting-type polarizing plate can be converted into a polarized light component that is usable by the display panel 15, by reflection and so forth in a downstream optical path.

Figure 28:
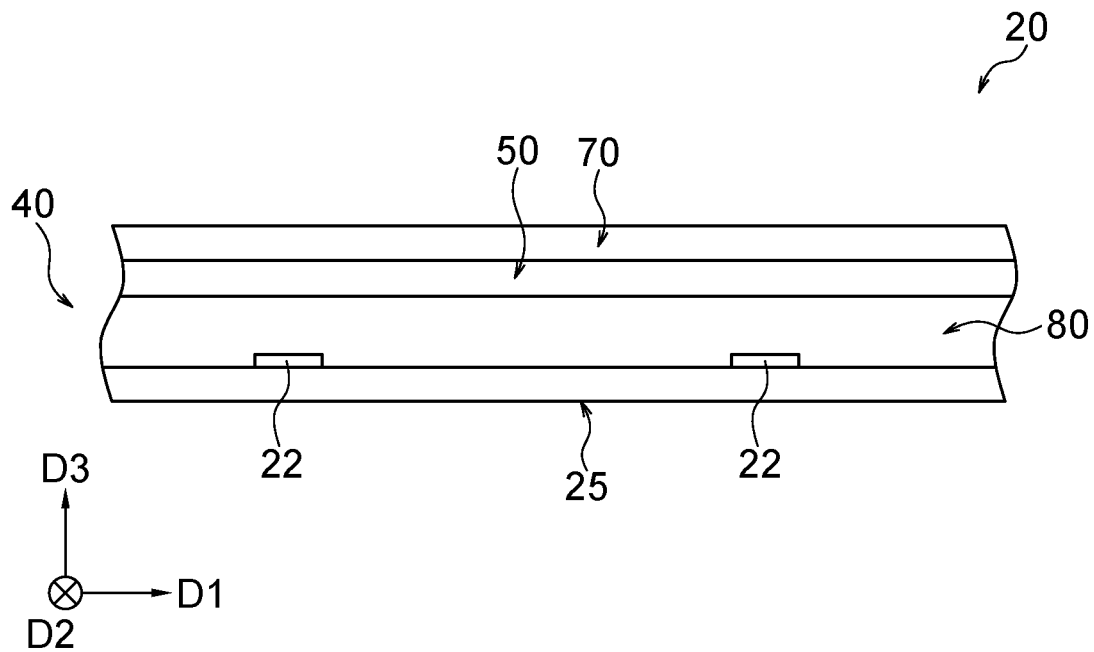
FIG. 28 is a longitudinal-sectional view of the planar light source device corresponding to FIG. 2, and is a diagram for describing an example in which the diffusing member includes a thermoplastic resin layer.

Also, as shown in FIG. 28, the diffusing member 40 may further have a thermoplastic resin layer 80 that is on the side of the light diffusing portion 50 opposite to the light reflecting portion 70 in the stacking direction D3. Providing the thermoplastic resin layer 80 enables the relative positions of the support substrate 25 that supports the light sources 22 and the diffusing member 40 in the stacking direction D3 to be positioned. The thermoplastic resin layer 80 functions as a spacer. Also, the thermoplastic resin layer 80 may be joined to at least one of the support substrate 25 and the diffusing member 40. In this case, the thermoplastic resin layer 80 can function as a sealant that covers and protects the light sources 22, and also, the relative positional relation of the support substrate 25 and the diffusing member 40 in the stacking direction D3 can be effectively stabilized.

As for the material thereof, the thermoplastic resin layer 80 may be fabricated using a thermoplastic resin such as an olefine-based resin having light transmissivity or the like, for example. Also, the thermoplastic resin layer 80 may include a base material made of a thermoplastic resin, and particles that are dispersed in the base material. In this example, the diffusing member 40 has light diffusivity in the thermoplastic resin layer 80 as well. Further, in a case in which the thermoplastic resin layer 80 has diffusivity and functions as the light diffusing portion 50, the diffusing member 40 may have this thermoplastic resin layer 80, the light reflecting portion 70, and the optical element portion 110.

Figure 29:
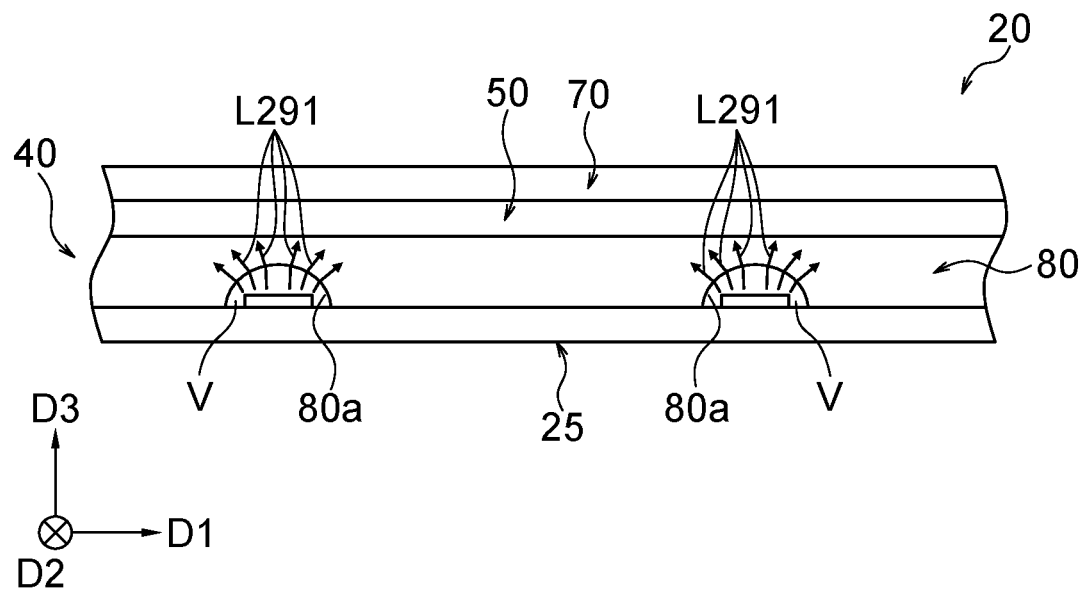
FIG. 29 is a longitudinal-sectional view of the planar light source device corresponding to FIG. 2, and is a diagram for describing an example in which the diffusing member includes the thermoplastic resin layer.

Further, as shown in FIG. 29, the thermoplastic resin layer 80 may have concave portions 80a formed on the side thereof facing the support substrate 25. According to the example shown in FIG. 29, light L291 output from the light sources 22 is refracted at interfaces between air gaps V situated between the thermoplastic resin layer 80 and the light sources 22, and the thermoplastic resin layer 80. Accordingly, light L291 from the light sources 22 can be effectively diffused, and in-plane distribution of illuminance can be effectively made more uniform. Light from the light sources 22 can be diffused more effectively by adjusting the shapes of the recessed portions 80a.

Figure 30:
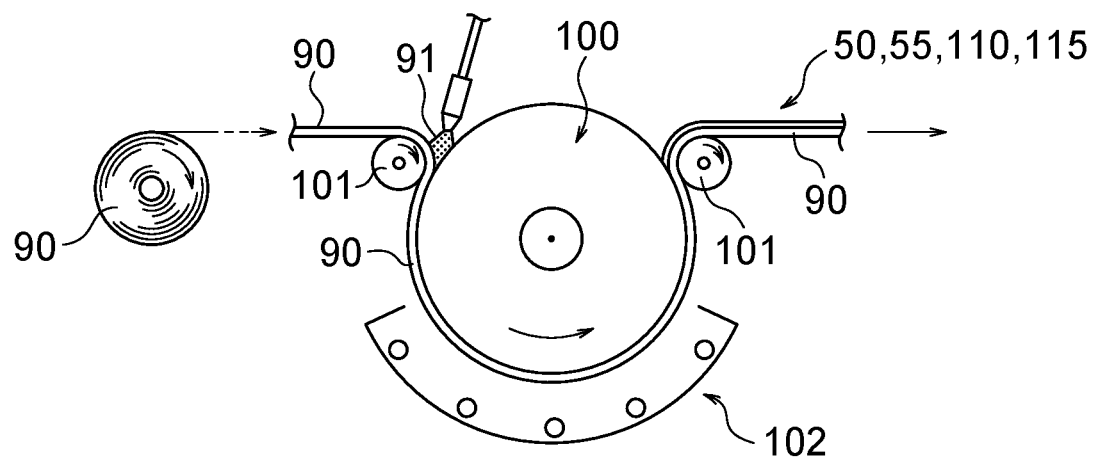
FIG. 30 is a side view for describing an example of a manufacturing method of the light diffusing portion and the optical element portion that can be included in the diffusing member in FIG. 2 or FIG. 24.

The light diffusing portion 50 of the above-described diffusing member 40 may have the uneven face 52 for manifesting light diffusivity. As an example, the light diffusing portion 50 may be fabricated by forming processing using ionizing-radiation-curable resin or the like, as shown in FIG. 30. An example of a manufacturing method of the light diffusing portion 50 will be described below, as shown in FIG. 30.

As shown in FIG. 30, a base material 90 that is wound up is fed out, and is transported by guide rollers 101 to a position facing a mold 100. A resin composition 91 is supplied between the mold 100 and the base material 90. The resin composition 91 contains uncured ionizing-radiation-curable resin. Next, the resin composition 91 situated between the mold 100 and the base material 90 is irradiated by ionizing radiation such as, for example, ultraviolet rays, electron beams, or the like, using an exposing device 102, thereby curing the resin composition 91. Thereafter, the light diffusing portion 50 that is made of cured matter of the resin composition 91 and is stacked on the base material 90, is peeled away from the mold 100, guided by the guide rollers 101. Thus, the optical sheet 55 that has the base material 90, and the light diffusing portion 50 formed on the base material 90, is obtained, as shown in FIG. 30. According to this manufacturing method, the diffractive optical element 60 and the microlens array 65 having the above-described uneven face 52 can be fabricated as the light diffusing portion 50.

In the manufacturing method shown in FIG. 30, the light diffusing portion 50 is continuously fabricated by roll-to-roll. However, this example is not limiting, and the light diffusing portion 50 may be formed and fabricated as sheets.

Note that the optical element portion 110 of the diffusing member 40 has the second uneven face 112. The optical element portion 110 having the second uneven face 112 may be fabricated in the same way as the light diffusing portion 50 having the first uneven face 52. In the manufacturing method described above with reference to FIG. 30, forming the optical element portion 110 made of cured matter of the resin composition 91 on the base material 90 yields the optical sheet 115 having the base material 90 and the optical element portion 110 formed on the base material 90. According to this manufacturing method, the microlens array 125 having the second uneven face 112 formed of the element faces 127 of the unit optical elements 126 described above can be fabricated as the optical element portion 110.

The diffusing member 40 may be fabricated using the optical sheet 55 shown in FIG. 30. The base material 90 used for the optical sheet 55 is not limited in particular, and a wide range of sheet-like materials may be used. From the perspective of adhesion to the light diffusing portion 50, a resin film may be used as the base material 90. If the base material 90 is to be used as part of the diffusing member 40 without change, a material having light transmissivity may be used for the base material 90.

Figure 31:
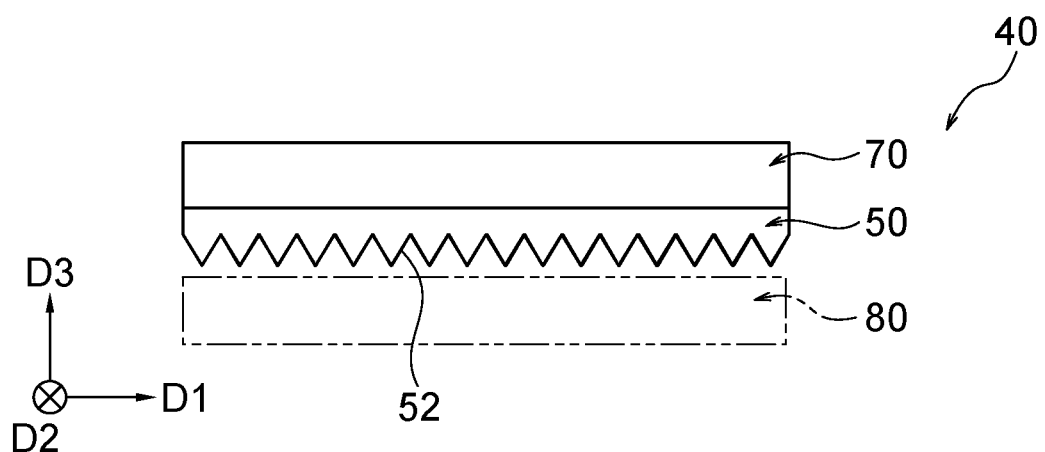
FIG. 31 is a diagram for describing an example of a layer configuration of the light diffusing portion that can be included in the diffusing member in FIG. 2 or FIG. 24.

Further, the light reflecting portion 70, a dielectric multilayer film for example, may be used as the base material 90. The dielectric multilayer film preferably is a multilayer film of resin layers that is relatively flexible. In this case, as shown in FIG. 31, the light diffusing portion 50 included in the diffusing member 40 has the uneven face 52 facing the opposite side from the light reflecting portion 70 in the stacking direction D3, and is joined to the light reflecting portion 70. In this diffusing member 40, the light diffusing portion 50 and the light reflecting portion 70 are joined, and accordingly handleability of the diffusing member 40 is improved. Accordingly, assembly of the diffusing member 40 to the planar light source device 20 can be facilitated. Also, the light diffusing portion 50 and the light reflecting portion 70 are joined, and accordingly the planar light source device 20 can be stably installed.

In the same way, the light reflecting portion 70, a dielectric multilayer film for example, may be used as the base material 90, and the optical element portion 110 may be fabricated on this base material 90. In this case, the optical element portion 110 included in the diffusing member 40 has the uneven face 112 facing the opposite side from the light reflecting portion 70 in the stacking direction D3, and is joined to the light reflecting portion 70, as shown in FIG. 25A to FIG. 26. In this diffusing member 40, the light reflecting portion 70 and the optical element portion 110 are joined, and accordingly handleability of the diffusing member 40 is improved. Accordingly, assembly of the diffusing member 40 to the planar light source device 20 can be facilitated. Also, the light reflecting portion 70 and the optical element portion 110 are joined, and accordingly the planar light source device 20 can be stably installed.

Further, using the light reflecting portion 70 as the base material 90, the light diffusing portion 50 may be formed on one side of the base material 90 by the fabrication method described with reference to FIG. 30, and the optical element portion 110 may further be formed on the other side of the base material 90 by the fabrication method described with reference to FIG. 30. Either of the light diffusing portion 50 and the optical element portion 110 may be fabricated first. According to this example, as shown in FIG. 24, the diffusing member 40 in which the light diffusing portion 50, the light reflecting portion 70, and the optical element portion 110 are stacked in the stacking direction D3 in this order and joined to each other, is obtained. In this diffusing member 40, the light diffusing portion 50, the light reflecting portion 70, and the optical element portion 110 are joined, and accordingly handleability of the diffusing member 40 is improved. Accordingly, assembly of the diffusing member 40 to the planar light source device 20 can be facilitated. Also, the light diffusing portion 50, the light reflecting portion 70, and the optical element portion 110 are joined, and accordingly the planar light source device 20 can be stably installed.

Figure 32:
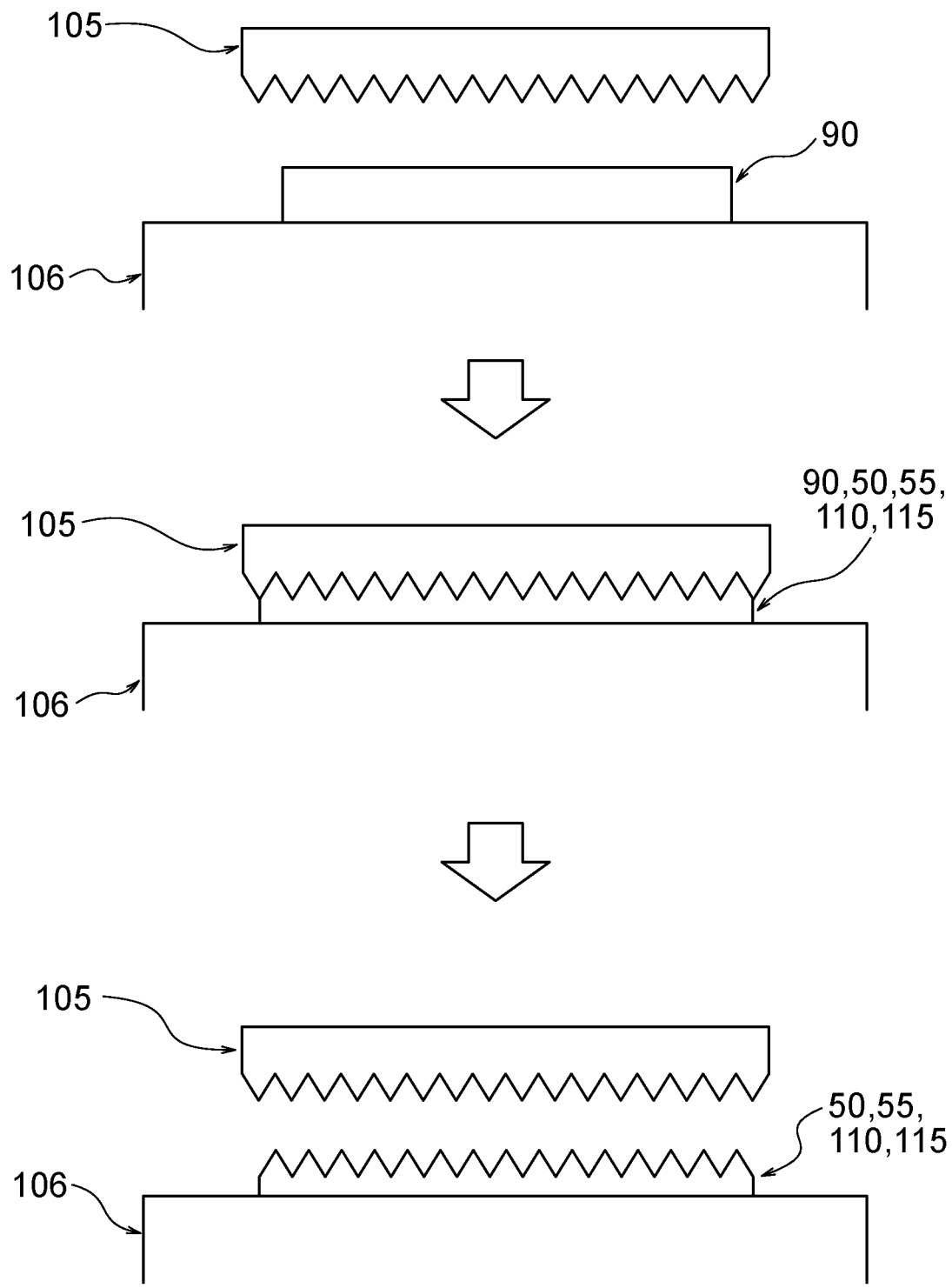
FIG. 32 is a diagram for describing another example of the manufacturing method of the light diffusing portion and the optical element portion that can be included in the diffusing member in FIG. 2 or FIG. 24.

As shown in FIG. 32, the light diffusing portion 50 can be manufactured by embossing. In the manufacturing method shown in FIG. 32, first, the base material 90 including at least a thermoplastic resin layer serving as a forming face is placed upon a supporting stand 106. Next, a die 105 that is heated is pressed against the base material 90, thereby transferring the uneven forms of the die 105 onto the base material 90. Thereafter, the die 105 is distanced from the formed base material 90, thereby obtaining the optical sheet 55 as the light diffusing portion 50 made of the base material 90 to which the form of the die 105 is transferred. In the same way, the optical element portion 110 made of the base material 90 to which the form of the die 105 is transferred may be manufactured as the optical sheet 115, by embossing.

Figure 33:
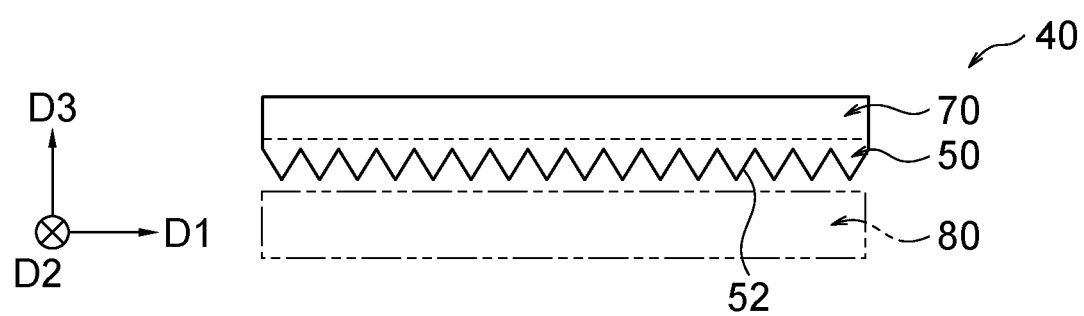
FIG. 33 is a diagram for describing an example of a layer configuration of the light diffusing portion that can be included in the diffusing member in FIG. 2 or FIG. 24.
Figure 34:
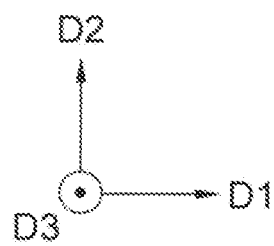
FIG. 34 is a diagram showing in-plane distribution of radiant intensity on a light-emitting face of a planar light source device according to Example 1.
Figure 34:
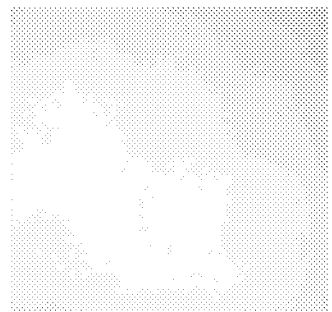
Figure 35:
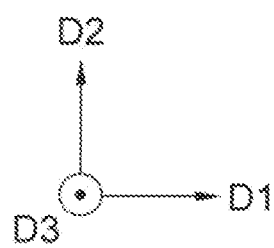
FIG. 35 is a diagram showing in-plane distribution of radiant intensity on a light-emitting face of a planar light source device according to Example 2.
Figure 35:
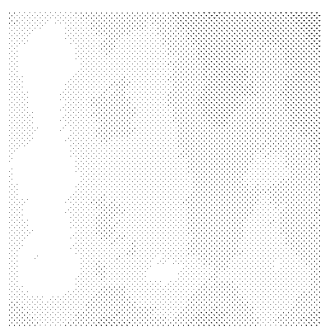
Figure 36:
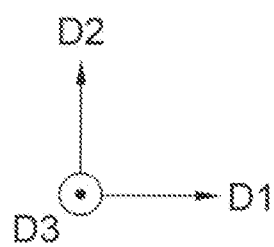
FIG. 36 is a diagram showing in-plane distribution of radiant intensity on a light-emitting face of a planar light source device according to Example 3.
Figure 36:
Figure 37:
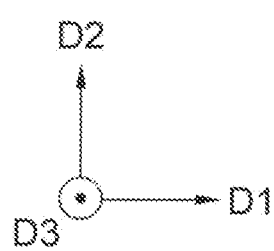
FIG. 37 is a diagram showing in-plane distribution of radiant intensity on a light-emitting face of a planar light source device according to Example 4.
Figure 37:
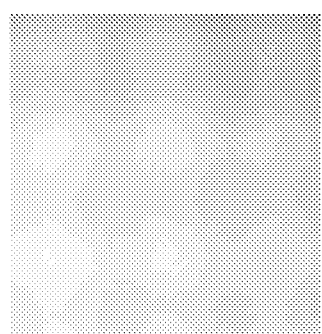
Figure 38:
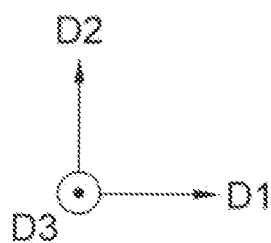
FIG. 38 is a diagram showing in-plane distribution of radiant intensity on a light-emitting face of a planar light source device according to Example 5.
Figure 38:
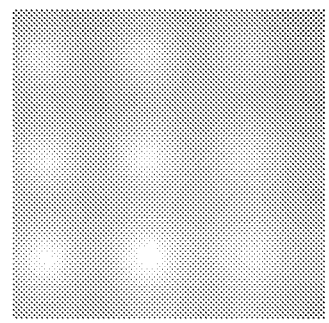
Figure 39:
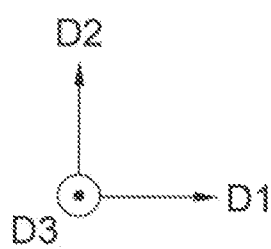
FIG. 39 is a diagram showing in-plane distribution of radiant intensity on a light-emitting face of a planar light source device according to Example 6.
Figure 39:
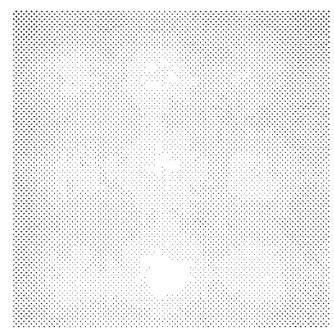

Note that in a case of fabricating the light diffusing portion 50 or the optical element portion 110 by the embossing shown in FIG. 32, a dielectric multilayer film having a thermoplastic resin layer on the outermost layer thereof can be used as the base material 90. For example, as shown in FIG. 33, the light diffusing portion 50 included in the diffusing member 40 may be formed as the uneven face 52 making up the surface of the light reflecting portion 70. In the same way, as shown in FIG. 25A to FIG. 26, the optical element portion 110 included in the diffusing member 40 may be formed as the uneven face 112 making up the surface of the light reflecting portion 70. Further, an arrangement may be made in which the light reflecting portion 70 is used as the base material 90, the light diffusing portion 50 is formed on one side of the base material 90 by the embossing shown in FIG. 32, and further the optical element portion 110 is formed on the other side of the base material 90 by the embossing shown in FIG. 32. Either of the light diffusing portion 50 and the optical element portion 110 may be fabricated first. Accordingly, the light diffusing portion 50 is formed to serve as one surface of the light reflecting portion 70, and the optical element portion 110 is formed to serve as the other surface of the light reflecting portion 70. The outermost layer of the light reflecting portion 70, and at least one of the light diffusing portion 50 and the optical element portion 110, are integrally formed as the diffusing member 40 obtained in this way. According to such a diffusing member 40, the diffusing member 40 and the planar light source device 20 can be made thinner. According to this diffusing member 40, the light reflecting portion 70, and at least one of the light diffusing portion 50 and the optical element portion 110, can be seamlessly and integrally formed. Accordingly, the planar light source device 20 can be stably installed.

Also, an example has been shown with reference to FIG. 26, in which the optical element portion 110 includes linear unit optical elements 126 arrayed in one direction. An arrangement may be made in which the light diffusing portion 50 includes linear unit optical elements 66 arrayed in one direction. The plurality of unit optical elements 66 of the light diffusing portion 50 that are arrayed one-dimensionally can be configured in the same way as the above-described plurality of unit optical elements 126 of the optical element portion 110 that are arrayed one-dimensionally. Also, the array direction of the plurality of unit optical elements 66 included in the light diffusing portion 50 with respect to the array direction of the plurality of unit optical elements 126 included in the optical element portion 110 may be parallel, or may be non-parallel, or may be inclined, or may be perpendicular.

EXAMPLES

The embodiment described above will be described below in further detail by way of Examples, but it should be noted that the above-described embodiment is not limited to these Examples.

Planar light source devices according to Examples 1 to 6 and Comparative Example 1 were manufactured as follows.

Example 1

A planar light source device according to Example 1 had the configuration shown in FIG. 2. In addition to light sources, a support substrate, and a diffusing member, the planar light source device according to Example 1 included a wavelength conversion sheet, a light diffusion sheet, and a reflecting-type polarizing plate. The support substrate had a white reflecting layer containing titanium oxide. Reflection at the reflecting layer of the support substrate was diffused reflection with a reflectance of 95%. The light sources were arrayed in a square array on the support substrate, as shown in FIG. 3. An array pitch of the light sources in a first direction was 6 mm. The array pitch of the light sources in a second direction perpendicular to the first direction was 6 mm. Light-emitting diodes that output blue light of which 450 nm is the central wavelength were used as the light sources. Planar shapes of these light-emitting diodes were rectangular shapes what were 0.2 mm×0.4 mm. The light-emitting diodes were disposed upon the support substrate 25 such that the sides of the light-emitting diodes followed the first direction and the second direction.

In the planar light source device according to Example 1, the diffusing member had a light diffusing portion, a light reflecting portion, and an optical element portion, in that order from the light source side in the stacking direction D3, as shown in FIG. 2. A dielectric multilayer film obtained from TORAY INDUSTRIES, INC. was used as the light reflecting portion. This light reflecting portion had the transmission properties shown in FIG. 17 and FIG. 18 with respect to light of 450 nm. The optical element portion was formed on one face of this light reflecting portion. Thereafter, the light diffusing portion was formed on the other face of the light reflecting portion. The optical element portion and the light diffusing portion were formed by supplying an uncured ultraviolet-curable resin composition between a form and the light reflecting portion, and curing between the form and the light reflecting portion, as described with reference to FIG. 30. As a result, the diffusing member was obtained, in which the light diffusing portion, the light reflecting portion, and the optical element portion were joined in this order in the stacking direction. Note that manufacturing of the diffusing member according to Example 1 was manufacturing in the form of sheets, unlike the roll-to-roll manufacturing method shown in FIG. 30.

The optical element portion of the diffusing member was situated on the opposite side of the light reflecting portion from the light sources. The optical element portion had a base portion that was sheet-like and that was joined to the light reflecting portion, and second unit optical elements serving as convex portions arrayed on the base portion. The optical element portion had the second unit optical elements having the configuration of the shapes, arrays, and so forth, described with reference to FIG. 14A and FIG. 14B. The optical element portion had second unit optical elements of the same shape, laid out with no spaces therebetween on a face of the base portion, with the orientations of bottom faces thereof changed in four ways, as shown in FIG. 14A. Each of the second unit optical elements had a shape of a triangular pyramid, having three second element faces. A second microlens array was formed as a collection of the second element faces of the second unit optical elements. The bottom faces of the second unit optical elements had shapes of isosceles right triangles. The element faces of the second unit optical elements included equal length leg element faces extending from the equal length legs of the isosceles right triangle making up the bottom face, and a base element face extending from the base of the isosceles right triangle making up the bottom face. The lengths of the two sides making up the equal length legs of the isosceles right triangle making up the bottom face were each 0.1 mm.

The inclination angle θb that the normal direction NDA of each of the equal length leg element faces formed with respect to the stacking direction D3 was 16.5°. The inclination angle θb that the normal direction NDA of the base element face formed with respect to the stacking direction D3 was 16.5°.

The light diffusing portion of the diffusing member was situated on the light source side of the light reflecting portion. The optical element portion had a sheet-like main unit portion joined to the light reflecting portion, and first unit optical elements serving as concave portions arrayed on the main unit portion. The light diffusing portion had the first unit optical elements having the configuration of the shapes, arrays, and so forth, described with reference to FIG. 14A and FIG. 14B. The light diffusing portion had first unit optical elements of the same shape, laid out with no spaces therebetween on a face of the main unit portion, with the orientations of bottom faces thereof changed in four ways, as shown in FIG. 14A. Each of the first unit optical elements had a shape of a triangular pyramid, having three first element faces. A first microlens array was formed as a collection of the first element faces of the first unit optical elements. The bottom faces of the first unit optical elements had shapes of isosceles right triangles. The element faces of the second unit optical elements included equal length leg element faces extending from the equal length legs of the isosceles right triangle making up the bottom face, and a base element face extending from the base of the isosceles right triangle making up the bottom face. The lengths of the two sides making up the equal length legs of the isosceles right triangle making up the bottom face were each 0.1 mm. The inclination angle θb that the normal direction ND of each of the equal length leg element faces formed with respect to the stacking direction D3 was 16.5°. The inclination angle θb that the normal direction ND of the base element face formed with respect to the stacking direction D3 was 16.5°. As a result, a first uneven face of the light diffusing portion was configured in the same way as a second uneven face of the optical element portion, except for the point that the protruding and recessed forms were reversed.

For the wavelength conversion sheet, QF-6000 that is available from Showa Denko Materials Co., Ltd. was used. For the light diffusion sheet, two sheets of brightness enhancement film BEF (a registered trademark) available from the 3M Company were used. The longitudinal direction of prisms of one sheet of the brightness enhancement film BEF extended in the first direction. The longitudinal direction of prisms of the other sheet of the brightness enhancement film BEF extended in the second direction. For the reflecting-type polarizing plate, a dual brightness enhancement film DBEF (a registered trademark) available from the 3M Company was used.

In the planar light source device according to Example 1, the thickness of the diffusing member in the stacking direction was 70 μm. Also, in the planar light source device according to Example 1, the distance DX (see FIG. 2) from the faces of the light sources facing the diffusing member to the light-entering side face of the diffusing member facing the light sources in the stacking direction was 0.5 mm.

Example 2

A planar light source device according to Example 2 differed from the planar light source device according to Example 1 with respect to the inclination angle θa of the first element faces, and otherwise had the same configuration. The inclination angle θa that the normal direction ND of each of the equal length leg element faces included in the first element faces of the light diffusing portion formed with respect to the stacking direction D3 was 30°. The inclination angle θa that the normal direction ND of the base element face included in the first element faces formed with respect to the stacking direction D3 was 40°.

Example 3

A planar light source device according to Example 3 differed from the planar light source device according to Example 1 with respect to the inclination angle θa of the first element faces, and otherwise had the same configuration. The inclination angle θa that the normal direction ND of each of the equal length leg element faces included in the first element faces of the light diffusing portion formed with respect to the stacking direction D3 was 40°. The inclination angle θa that the normal direction ND of the base element face included in the first element faces formed with respect to the stacking direction D3 was 45°.

Example 4

A planar light source device according to Example 4 differed from the planar light source device according to Example 1 with respect to the inclination angle θb of the second element faces, and otherwise had the same configuration. The inclination angle θb that the normal direction ND of each of the equal length leg element faces included in the second element faces of the optical element portion formed with respect to the stacking direction D3 was 30°. The inclination angle θb that the normal direction NDA of the base element face included in the second element faces formed with respect to the stacking direction D3 was 40°.

Example 5

A planar light source device according to Example 5 differed from the planar light source device according to Example 1 with respect to the inclination angle θb of the second element faces, and otherwise had the same configuration. The inclination angle θb that the normal direction ND of each of the equal length leg element faces included in the second element faces of the optical element portion formed with respect to the stacking direction D3 was 40°. The inclination angle θb that the normal direction NDA of the base element face included in the second element faces formed with respect to the stacking direction D3 was 45°.

Example 6

A planar light source device according to Example 6 differed from the planar light source device according to Example 1 with respect to the diffusing member, and otherwise had the same configuration. The diffusing member according to Example 6 was made up of the light diffusing portion and the light reflecting portion. The diffusing member according to Example 6 did not have the optical element portion. The light reflecting portion according to Example 6 was the same as the light reflecting portion according to Example 1. In the planar light source device according to Example 6, the thickness of the diffusing member in the stacking direction was 55 μm.

Example 7

A planar light source device according to Example 7 differed from the planar light source device according to Example 1 with respect to the inclination angle θb of the second element faces, and otherwise had the same configuration. The inclination angle θb that the normal direction ND of each of the equal length leg element faces included in the first element faces of the light diffusing portion formed with respect to the stacking direction D3 was 5.5°. The inclination angle θb that the normal direction ND of the base element face included in the first element faces formed with respect to the stacking direction D3 was 5.5°.

Comparative Example 1

A planar light source device according to Comparative Example 1 was the same as the planar light source device according to Example 1, except for the point that the diffusing member was replaced with a light diffusing plate HBS222 manufactured by Keiwa Inc. The light diffusing plate was situated on the light source side of the wavelength conversion sheet. In the planar light source device according to Comparative Example 1, the light sources and the support substrate faced the light diffusing plate in the stacking direction. In the planar light source device according to Comparative Example 1, the distance from the faces of the light sources facing the light diffusing plate to the light-entering side face of the light diffusing plate facing the light sources in the stacking direction was 0.5 mm.

<Evaluation>

Distributions of radiant intensity at the light-emitting faces of the planar light source devices, in a state with the light sources emitting light, were measured for the planar light source devices according to Examples 1 to 7 and Comparative Example 1. The measurement range of radiant intensity was a square evaluation region having a length on the light-emitting faces of the planar light source devices 18 mm in the first direction and 18 mm in the second direction. The evaluation region was set such that one light source was situated in the center of the evaluation region, in observation from a third direction. FIG. 34 to FIG. 40 respectively show the in-plane distribution of radiant intensity on the light-emitting faces of the planar light source devices according to Examples 1 to 6 and Comparative Example 1. FIG. 34 to FIG. 40 are plan views showing the evaluation regions having the area of 18 mm×18 mm. FIG. 34 to FIG. 40 show the magnitude of radiant intensity at each position within the respective evaluation regions by darkness of color at these positions. Positions where the radiant intensity is low are indicated by dark color.

Figure 40:
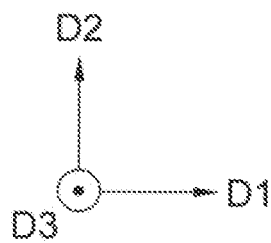
FIG. 40 is a diagram showing in-plane distribution of radiant intensity on a light-emitting face of a planar light source device according to Comparative Example 1.
Figure 40:
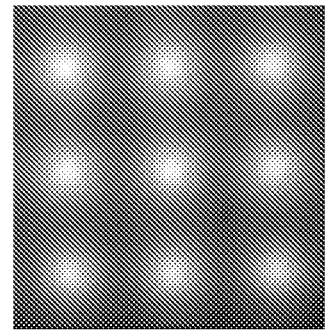

There was unevenness in radiant intensity distribution that corresponded to the array of the light sources in the planar light source device according to Comparative Example 1 shown in FIG. 40, and the positions of the light sources could be clearly visually recognized. As opposed to the in-plane distribution of radiant intensity in the planar light source device according to Comparative Example 1, the in-plane distribution of radiant intensity in the planar light source devices according to Examples 1 to 7 was successfully made sufficiently uniform. Of these, the distribution of brightness was made uniform in Example 1 and Example 7 in particular, and the positions of the light sources were difficult to discern. The ratio of the smallest value of radiant intensity as to the largest value of radiant intensity in the evaluation region of each of the planar light source devices 20 (=smallest value of radiant intensity/largest value of radiant intensity) was 97% in Example 1, was 95% in Example 2, was 94% in Example 3, was 93% in Example 4, was 92% in Example 5, was 90% in Example 6, was 96% in Example 7, and was 50% in Comparative Example 1.

REFERENCE SIGNS LIST

10 display device
20 planar light source device
22 light source
40 diffusing member
42 display
50 light diffusing portion
52 uneven face
53 diffusing main unit portion
53a uneven face
54 reflection cover portion
58 main unit portion
65 microlens array
66 unit optical element
67 element face
68 convex portion
69 concave portion
70 light reflecting portion
110 optical element portion
112 uneven face
115 optical sheet
118 base portion
125 microlens array
126 unit optical element
127 element face
128 convex portion
129 concave portion

The invention claimed is:
1. A diffusing member comprising:
a light diffusing portion including unit optical elements, wherein:
each of the unit optical elements includes a convex portion or concave portion that has a shape of a triangular pyramid of which a bottom face is an isosceles right triangle,
the bottom face includes a base facing a vertex forming a right angle of the isosceles right triangle,
a pair of the unit optical elements is arrayed such that the bases of the pair of the unit optical elements are overlapped,
a plurality of pairs of the unit optical elements are arranged in a first direction and a second direction,
the unit optical elements are arrayed such that:
an orientation of the overlapped bases of a first pair of the unit optical elements is different from an orientation of the overlapped bases of a second pair of the unit optical elements, and
the bottom faces of the unit optical elements are arrayed in four orientations, and
an in-plane distribution of radiant intensity of light that enters the diffusing member is uniform.
2. The diffusing member according to claim 1, wherein
an orientation of the overlapped bases of the first pair of the unit optical elements is different from an orientation of the overlapped bases of the second pair of the unit optical elements, which is adjoined to the first pair of the unit optical elements in the first direction, and
the orientation of the overlapped bases of the first pair of the unit optical elements is also different from an orientation of the overlapped bases of a third pair of the unit optical elements, which is adjoined to the first pair of the unit optical elements in the second direction.

3. The diffusing member according to claim 1, wherein each of the unit optical elements is arrayed such that two equal sides other than the base of the isosceles right triangle at the bottom surface extend the first direction or the second direction.

4. A planar light source device, comprising:
the diffusing member according to any one of claim 1; and
a light source that outputs light that enters the diffusing member.

5. A display device, comprising: the planar light source device according to claim 4.

\* \* \* \* \*